United States Patent
Taketomi et al.

(10) Patent No.: US 6,377,370 B1
(45) Date of Patent: Apr. 23, 2002

(54) OPTICAL DISPLAY APPARATUS

(75) Inventors: Yoshinao Taketomi; Toshihiro Kubota, both of Kyoto; Yoshihiko Tanji; Zenrou Hayashi, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/657,797

(22) Filed: Sep. 8, 2000

Related U.S. Application Data

(62) Division of application No. 09/381,528, filed as application No. PCT/JP98/01148 on Mar. 18, 1998.

(30) Foreign Application Priority Data

Mar. 18, 1997 (JP) .............................................. 9-64071
Oct. 13, 1997 (JP) .............................................. 9-278402

(51) Int. Cl.$^7$ ............................ G02B 5/32; G03H 1/26; G03H 1/22; G03H 1/00
(52) U.S. Cl. .............................. 359/15; 359/32; 359/22; 359/33; 359/13
(58) Field of Search ............................... 359/13, 14, 15, 359/16, 19, 22, 32, 33; 353/69, 7, 8

(56) References Cited

U.S. PATENT DOCUMENTS

| | | | |
|---|---|---|---|
| 4,458,977 A | | 7/1984 | Arns et al. |
| 5,037,166 A | * | 8/1991 | Malcolm et al. ............... 359/15 |
| 5,187,597 A | * | 2/1993 | Kato et al. ..................... 359/22 |
| 5,214,425 A | | 5/1993 | Wreede |
| 5,589,956 A | * | 12/1996 | Morishima et al. ............ 359/13 |
| 5,622,417 A | * | 4/1997 | Conner et al. ................. 353/69 |

FOREIGN PATENT DOCUMENTS

| | | |
|---|---|---|
| JP | 61-144690 | 7/1986 |
| JP | 62-63983 | 3/1987 |
| JP | 63-265741 | 11/1988 |
| JP | 2-186319 | 7/1990 |

(List continued on next page.)

OTHER PUBLICATIONS

International Search Report dated Jul. 28, 1998 for related application PCT/JP98/01148.

Yoshinao Taketomi et al., "Reflection hologram for reconstructing deep images", Optics Letters, vol. 22, No. 22, Nov. 15, 1997.

Yoshinao Taketomi et al., "Deep image reconstruction of a reflection hologram using a fluorescent lamp", 9 pages.

"Report on Research and Study on Development of Large–Scale Hologram System (in Japanese)", Tokyo, Issued by Japan Society for the Promotion of Machine Industry Shin–Kikai System Center, Mar. 1978, p. 116, lines 7–9; Figs 4.4.4.

Yoshinao Taketomi et al., A hologram that can reconstruct deep images, Optics Japan 97, Oct. 1, 1997.

Primary Examiner—Audrey Chang
(74) Attorney, Agent, or Firm—Ratner & Prestia

(57) ABSTRACT

An optical display apparatus is provided that can utilize a low intensity point light source and that requires a small physical profile. The optical display apparatus comprises an image display apparatus including at least one point light source to form an image to be displayed for viewing, a hologram screen that defracts and reflects light from the point light source, and an imaging optical system arranged to adjust a focus in one direction of the image so that the point light source of the optical display apparatus is focused to a line on the hologram screen. The optical display apparatus reconstructs and images the image displayed on the image display apparatus on a virtual display plane.

16 Claims, 61 Drawing Sheets

FOREIGN PATENT DOCUMENTS

| | | |
|---|---|---|
| JP | 3-174572 | 7/1991 |
| JP | 3-188480 | 8/1991 |
| JP | 5-53493 | 3/1993 |
| JP | 6-51239 | 2/1994 |
| JP | 6-228921 | 8/1994 |
| JP | 6-69964 | 9/1994 |
| JP | 7-129108 | 5/1995 |
| JP | 7-140912 | 6/1995 |
| JP | 8-6513 | 1/1996 |
| JP | 8-158322 | 6/1996 |
| JP | 8-160894 | 6/1996 |
| JP | 9-6935 | 1/1997 |
| JP | 9-16061 | 1/1997 |
| JP | 2598406 | 1/1997 |
| JP | 9-106258 | 4/1997 |
| WO | WO 96/34322 | 10/1996 |

\* cited by examiner

Change in observation position
‖
Change in color

Image not seen

Horizontal direction

Vertical direction

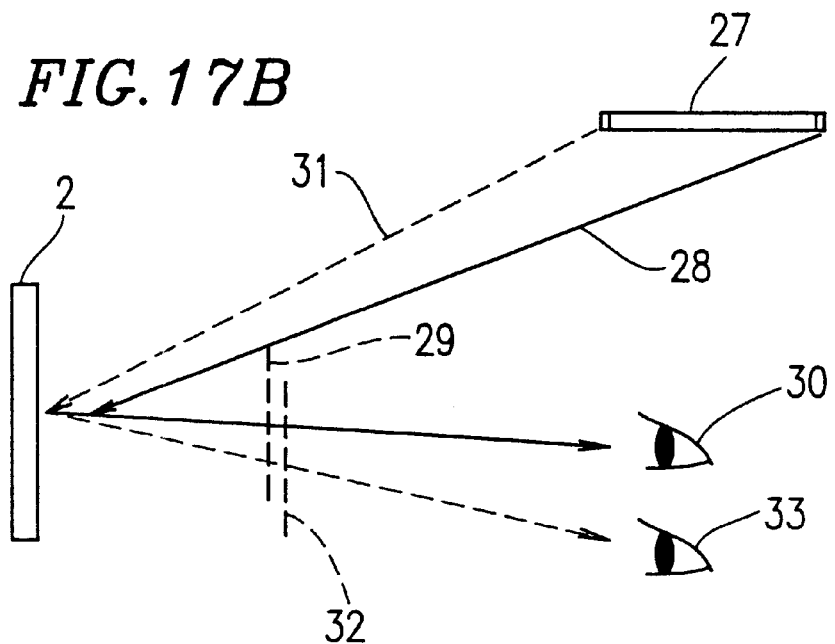
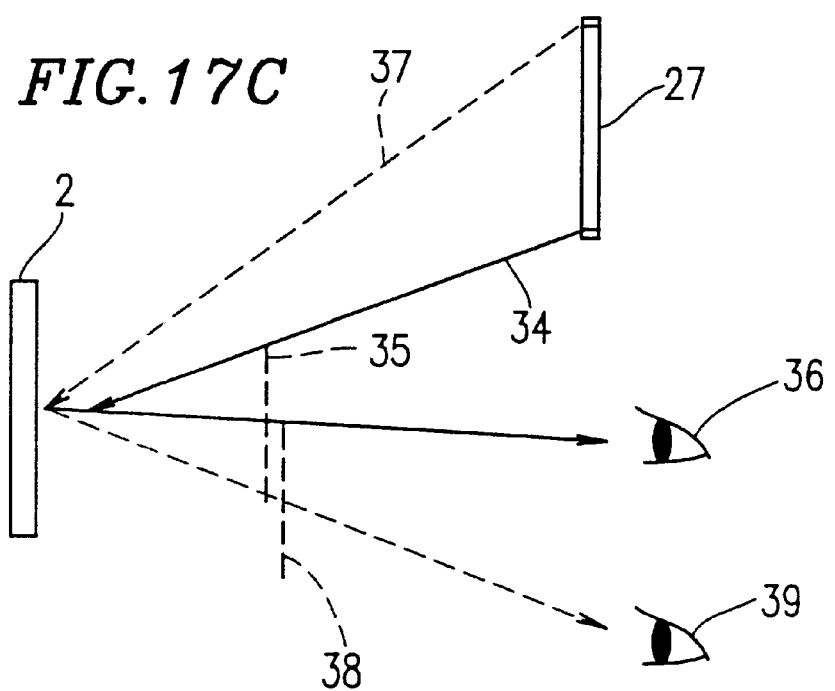

FIG.31B
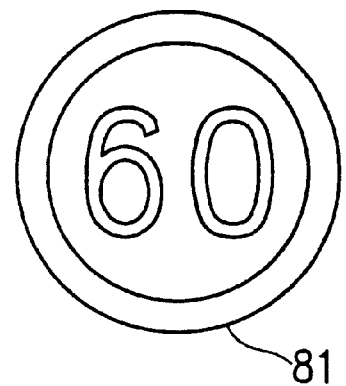
81
FIG.31C
82
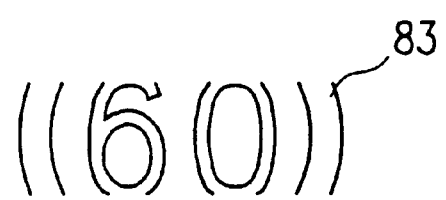
83
84

FIG.45
Original picture
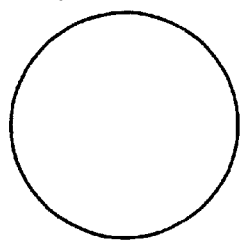
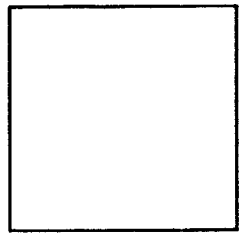
Shape projected on hologram screen 202
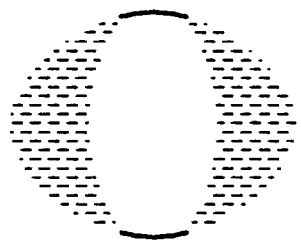
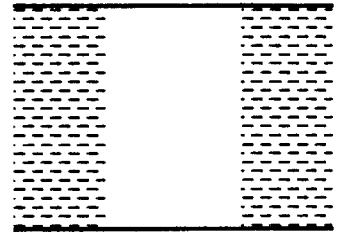
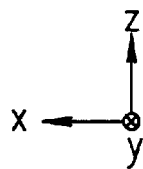

216  217

202  203  204

FIG.63A
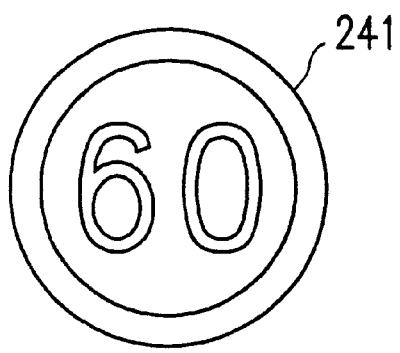
FIG.63B
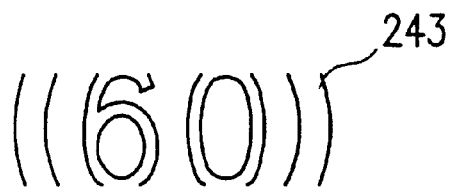

OPTICAL DISPLAY APPARATUS

This application is a divisional application of U.S. patent Ser. No. 09/381,528, filed Jan. 4, 2000, which is a U.S. National Phase Application of PCT International Application PCT/JP98/01148 filed Mar. 18, 1998.

TECHNICAL FIELD

The present invention relates to an optical display apparatus for displaying image information and character information.

BACKGROUND ART

In recent years, an optical display apparatus for displaying image information and character information has been used in various fields. An example of such an optical display apparatus is an electronic optical display apparatus widely used in a traffic information display board, a direction board or a billboard. Related techniques are disclosed in, for example, Japanese Laid-Open Publication Nos. 6-228921, 7-129108, 7-140912, 8-6513, 8-158322, 8-160894, etc. First, one of the most typical examples of such an optical display apparatus, an optical traffic sign incorporating a fluorescent lamp therein, will be described below with reference to the figures. However, various other conventional structures are known in the art, such as those incorporating an LED or an EL device for producing a self-luminous display, and those using an optical fiber or a light guide plate for guiding light from a light source.

FIG. 1A is a side view illustrating a structure of a conventional optical traffic sign, and FIG. 1B is a front view illustrating the same. Specifically, reference numeral 156 denotes a sign display board, 157 a ring-shaped fluorescent tube, 158 a sign body, and 159 a sign pole.

The sign display board 156 includes a semi-transparent resin on which a sign pattern is printed. The sign can be recognized even at night by illuminating the pattern from the inside of the sign with light from the ring-shaped fluorescent tube 157. The sign body 158, supporting the ring-shaped fluorescent tube 157 and the sign display board 156, is installed on a side wall beside a road or on a tunnel ceiling by being supported by the sign pole 159.

However, the above-described conventional structure has the following problems.

First, since the sign pattern is either printed on the semi-transparent resin or is made of a color resin, a large portion of light emitted by the ring-shaped fluorescent tube 157, as a light source, is absorbed by the resin, whereby the display is not sufficiently bright.

Second, since the display section, including the sign display board 156 and the fluorescent tube (light source) 157, is supported by the sign body 158, the portion including the display section is large and heavy. Moreover, since the sign pole 159 supporting the same must also be robust, the overall structure is even larger and heavier.

Third, the structure must be installed so that it substantially projects from the installation surface, i.e., a road side wall or a tunnel ceiling. Therefore, it may be hit for some reasons by a moving object such as a person, a car or a load, thereby damaging the display apparatus body while also damaging the moving object. To avoid such an accident requires a large installation space, which is not economical.

The above-described problems arise not only from the optical traffic sign incorporating a fluorescent lamp therein, illustrated in FIGS. 1A and 1B as a conventional example, but also from those of a self-luminous type such as an LED or those using an optical fiber or a light guide plate for guiding light from the light source. Moreover, the problems are not limited to the above-described traffic sign, but are common to a general class of optical display apparatuses where a pattern to be displayed is illuminated with light from a light source.

Those using a hologram are possible alternatives which may solve the above-described problems.

First, a principle of producing a hologram based on a commonly-employed conventional technique and a principle of displaying (reconstructing) image information using such a conventional hologram will be described below.

FIG. 2A is a diagram schematically illustrating a typically-employed principle of producing a hologram.

In particular, an object O is illuminated with object illumination light IL emitted from a laser light source, thereby forming object light OL having information relating to the shape, etc., of the object O, and making the object light OL be incident upon a hologram dry plate H1. At the same time, reference light RL1, formed by splitting light emitted from the same laser light source as the object illumination light IL by means of a beam splitter, or the like, is directed to be incident upon the hologram dry plate H1 from an inclined direction. Thus, interference fringes between the object light OL and the reference light RL1 are recorded on the hologram dry plate H1. The hologram dry plate H1 on which such interference fringes (having information of the object O) are recorded will hereinafter be referred to also as the "hologram plate H1".

FIG. 2B is a diagram schematically illustrating a principle of reconstructing the hologram plate H1 which is provided according to FIG. 2A.

In particular, the reconstruction illumination light RI1, which is light from the same laser light source as that used for producing the hologram plate H1, is directed to propagate through the same path as that for the reference light RL1 (see FIG. 2A) so as to irradiate the hologram plate H1. Thus, light (reconstruction light) R1, having information of the object recorded on the hologram plate H1, is reconstructed, so that a reconstructed image I1 is observed at a position where the object was originally located.

The above-described method, however, requires the use of a laser light source as a light source when producing and reconstructing the hologram plate H1, and thus has such problems that the cost cannot be reduced and the handling thereof is complicated.

On the other hand, in a reflection-type hologram to be described below, a hologram image can be reconstructed using white light.

To produce a reflection-type hologram, the hologram plate H1 is first produced by the method as illustrated in FIG. 2A, and then irradiated with reconstruction illumination light (laser light) RI21, as illustrated in FIG. 3A, in a direction opposite to that of the reconstruction illumination light RI1 illustrated in FIG. 2B. Thus, reconstruction light R21, directed from the hologram plate H1 to the position where the object was located, is reconstructed, thereby reconstructing a real image (reconstructed image) I21 of the object at a position where the object was located. Then, a new hologram dry plate H2 is placed at a position spaced apart from the reconstructed image I21 of the object by a distance Z0, as illustrated in FIG. 3B, and reference light RL2 is directed to be incident upon the hologram dry plate H2 from an inclined direction opposite from the hologram plate H1. The reference light RL2 is formed by splitting light emitted from the same laser light source as the reconstruction illumination light RI21 by means of a beam splitter, or the like. Thus, interference fringes between the reconstruction illumination light RI21 and the reference light RL2 are recorded on the hologram dry plate H2. The hologram dry plate H2 on which such interference fringes (having information of the object) are recorded as a reflection-type hologram will hereinafter be referred to also as the "reflection-type hologram plate H2".

FIG. 3C is a diagram schematically illustrating a principle of reconstructing the reflection-type hologram plate H2 formed as described above.

In particular, the reflection-type hologram plate H2 is irradiated with reconstruction illumination light RI22 (white light from a point light source spaced apart from the reflection-type hologram plate H2 by a certain distance) which propagates in a direction diametrically opposite to that of the reference light RL2 illustrated in FIG. 3B. Thus, reconstruction light R22 having information of the object recorded on the reflection-type hologram plate H2 is reconstructed so as to form a reconstructed image I22 at a position where the object was originally located.

In a reflection-type hologram, a wavelength selectivity (color selectivity) in the optical diffraction characteristic (the diffraction efficiency) is high. Therefore, the image I22 is reconstructed by light having a wavelength close to that of the laser light used for producing the hologram. Thus, a color image can also be reconstructed by superposition. However, a clear reconstructed image cannot be obtained when the distance z0 between the position of the reflection-type hologram plate H2 and a position where the reconstructed image I22 is displayed is large.

The reason why a reconstructed image of the reflection-type hologram is blurred will further be described with reference to FIGS. 3D and 3E.

The reconstruction illumination light RI22 directed toward the reflection-type hologram is white light. Therefore, wavelengths other than a wavelength $\lambda 0$ of the laser light used to produce the hologram are also contained in the reconstruction illumination light RI22. A reflection-type hologram has a high wavelength selectivity, as shown in a graph of FIG. 3E illustrating the wavelength dependency of the diffraction efficiency, whereby substantially none of light having a wavelength far away from the wavelength (center wave length) $\lambda 0$ of the laser light used to produce the hologram is diffracted. Therefore, only light having a wavelength close to the center wavelength $\lambda 0$ is diffracted, thereby reconstructing the image I22. In practice, however, light having a wavelength which is close to, but different from, the center wavelength $\lambda 0$, as represented by $\lambda 1$ and $\lambda 2$ in FIGS. 3D and 3E, is also contained in the reconstructed light R22, thereby also forming and superimposing reconstructed images from such light on the intended reconstructed image from the light having the center wavelength $\lambda 0$. By this effect, the reconstructed image I22 is blurred when the distance z0 to the position where the image I22 is formed is set to be large. That is, with a reflection-type hologram, a clear reconstructed image I22 cannot be viewed when it is viewed from a distance greater than the distance z0 set when producing the hologram. This can be a very critical disadvantage in an application, such as an optical information apparatus, e.g., a traffic sign, which aims to clearly transfer prescribed information.

As described above, the commonly-employed conventional hologram and the reflection-type hologram using the same have significant problems to be solved, in terms of the cost, the accurate display/transfer of information, etc., before they can be used in an optical display apparatus such as a traffic sign, for example.

A hologram display method different from those described above is what is known as a rainbow hologram.

To produce a rainbow hologram, the hologram plate H1 is first produced by the method as illustrated in FIG. 2A, which is then irradiated with reconstruction illumination light (laser light) RI31 in a direction opposite to that of the reconstruction illumination light RI1 illustrated in FIG. 2B and through a slit having a width of $\Delta$, as illustrated in FIG. 4A. Thus, reconstruction light R31, directed from the hologram plate H1 to the position where the object was located, is reconstructed, thereby reconstructing a real image (reconstructed image) I31 of the object at a position where the object was located. Then, a new hologram dry plate H3 is placed at a position spaced apart from the reconstructed image I31 of the object by a distance Z0, as illustrated in FIG. 4B, and reference light RL3 is directed to be incident upon the hologram dry plate H3 from an inclined direction as that for the hologram plate H1. The reference light RL3 is formed by splitting light emitted from the same laser light source as the reconstruction illumination light RI31 by means of a beam splitter, or the like. Thus, interference fringes between the reconstruction illumination light RI31 and the reference light RL3 are recorded on the hologram dry plate H3. The hologram dry plate H3 on which such interference fringes (having information of the object) are recorded as a transmission-type hologram by the rainbow hologram method will hereinafter be referred to also as the "rainbow hologram plate H3".

FIG. 4C is a diagram schematically illustrating a principle of reconstructing the rainbow hologram plate H3 formed as described above.

In particular, the rainbow hologram plate H3 is irradiated with reconstruction illumination light RI32 (white light from a point light source spaced apart from the rainbow hologram plate H3 by a certain distance) which propagates in a direction diametrically opposite to that of the reference light RL3 illustrated in FIG. 4B. Thus, reconstruction light R32 having information of the object recorded on the rainbow hologram plate H3 is reconstructed and directed toward the position where the slit was located during the hologram production, so as to form a reconstructed image I32 at a position where the object was originally located.

With a rainbow hologram formed as described above, a clearer reconstructed image is observed as compared to that observed by a reflection-type hologram. The reason for this will be described with reference to FIGS. 4D and 4E.

The reconstruction illumination light RI32 directed toward the rainbow hologram is white light. Therefore, wavelengths other than a wavelength $\lambda 0$ of the laser light used to produce the hologram are also contained in the reconstruction illumination light RI32. However, a rainbow hologram, which is a transmission-type hologram, has a low wavelength selectivity, as shown in a graph of FIG. 4E illustrating the wavelength dependency of the diffraction efficiency, whereby a relatively wide range of wavelengths are diffracted to emit the reconstruction light R32, thereby reconstructing the images I32 respectively corresponding to different wavelengths of light. However, since a slit is used when producing the rainbow hologram, the reconstructed images formed by the different wavelengths of light are formed at respectively different positions (i.e., spatially separated from one another). For example, reconstructed images formed by light having wavelengths which are different from the center wavelength λ0, as represented by λ1 and λ2 in FIGS. 4D and 4E, are formed concurrently at positions different from that of the reconstructed image formed by light having the center wavelength λ0, but are not spatially superimposed on the intended reconstructed image formed by the light having the center wavelength λ0. Therefore, with the rainbow hologram, the reconstructed image I32 is relatively clearly observed, with the color of the image I32 changing as the observation position changes.

The phenomenon that the reconstructed image I32 is observed with different colors depending upon the observation position is where the nomenclature "rainbow hologram" comes from, and various applications have been proposed in the art which take advantage of the phenomenon. However, in view of reconstructing a color image, on the other hand, such a change in the color of the reconstructed image I32 depending upon the observation position presents a disadvantage that a prescribed color image cannot be reconstructed. For example, in the case of the traffic sign as described above, use of a predetermined color also constitutes a part of the information to be transferred. Therefore, the above-described characteristic of the rainbow hologram presents a very critical disadvantage in the application thereof to an optical information apparatus aims to clearly transfer prescribed information.

DISCLOSURE OF THE INVENTION

The present invention has been made in view of the above-described problems existing in the prior art, and has an objective of providing a light-weight optical display apparatus which occupies a small space and is capable of reconstructing/displaying image information in a bright and clear manner, by using a hologram technique based on a novel method.

An optical display apparatus provided by one aspect of the present invention includes a hologram device and a light source. The hologram is a reflection-type hologram formed by: light having information of an object which is obtained by using light having passed through a slit; and reference light having an incident optical path different from that of the light having the information of the object, wherein a reconstructed image of the object is displayed by light from the light source. The above-described object is accomplished by such a feature.

In one embodiment, the light having the information of the object is object light which is obtained by irradiating the object with diffused light having passed through the slit. The diffused light may be formed by passing light through a ground glass.

In another embodiment, the light having the information of the object is reconstructed light obtained by reconstructing a transmission-type hologram which is formed by: object light obtained by irradiating the object with diffused light having passed through the slit; and irradiation light having an incident optical path different from that of the object light. The diffused light may be formed by passing light through a ground glass.

In still another embodiment, the light having the information of the object is reconstructed light of a transmission-type hologram which is obtained by passing through the slit which is arranged to be adjacent to the transmission-type hologram on which an image of the object is recorded.

In still another embodiment, the light having the information of the object is reconstructed light of a transmission-type hologram which is obtained by passing through: the slit which is arranged to be adjacent to the transmission-type hologram on which an image of the object is recorded; and a cylindrical lens having its generatrix along a longitudinal direction of the slit.

The reference light is provided by superposing a plurality of beams on one another in a direction orthogonal to a longitudinal direction of the slit.

Preferably, the light source is a linear light source. The linear light source may be arranged on or in a vicinity of a plane orthogonal to a longitudinal direction of the slit.

In one embodiment, an incident plane of the reference light is a plane orthogonal to a longitudinal direction of the slit. Alternatively, an incident plane of the reference light may be a plane different from a plane orthogonal to a longitudinal direction of the slit.

An optical display apparatus provided by another aspect of the present invention is an optical display apparatus including a hologram device and a light source. The hologram is a reflection-type hologram formed by: light having information of an object which is obtained by using diffused light diffusing in one direction; and reference light having an incident optical path different from that of the light having the information of the object, wherein a reconstructed image of the object is displayed by light from the light source. The above-described object is accomplished by such a feature.

In one embodiment, the light having the information of the object is object light which is obtained by irradiating the object with the diffused light.

In another embodiment, the light having the information of the object is reconstructed light obtained by reconstructing a transmission-type hologram which is formed by: object light obtained by irradiating the object with the diffused light; and irradiation light having an incident optical path different from that of the object light.

The reference light may be provided by superposing a plurality of beams on one another in a direction orthogonal to the direction in which the diffused light diffuses.

In still another embodiment, the light having the information of the object is reconstructed light of a transmission-type hologram which is obtained by passing through the slit which is arranged to be adjacent to the transmission-type hologram on which an image of the object is recorded. The reference light may be provided by superposing a plurality of beams on one another in a direction orthogonal to the direction in which the diffused light diffuses.

In one embodiment, the diffused light is formed by passing light through a lenticular lens.

Preferably, the light source is a linear light source. the linear light source may be arranged on or in a vicinity of a plane orthogonal to the direction in which the diffused light diffuses.

In one embodiment, an incident plane of the reference light is a plane orthogonal to the direction in which the diffused light diffuses. Alternatively, an incident plane of the reference light may be a plane different from a plane orthogonal to the direction in which the diffused light diffuses.

According to the present invention, there is provided an optical display system having a plurality of display units arranged on an arrangement plane in which reconstructed images from the plurality of units are synthesized and displayed, wherein each of the plurality of units is an optical display apparatus of the present invention having the above-described feature.

The hologram device in the optical display apparatus of the present invention may be provided by combining a plurality of hologram elements with one another.

The hologram device in the optical display apparatus of the present invention may be formed on a flexible substrate.

The hologram device in the optical display apparatus of the present invention may be portable.

The light source in the optical display apparatus of the present invention may be a linear light source; and a length and an installation direction of the linear light source may be set so that a predetermined reconstructed image viewing range is obtained.

The light source in the optical display apparatus of the present invention may be a linear light source; and a position where a reconstructed image is formed may be shifted by moving the linear light source out of an incident plane.

In some cases, the optical display apparatus of the present invention includes a plurality of the hologram devices, wherein the plurality of hologram devices are reconstructed by one light source.

The light source in the optical display apparatus of the present invention may be a linear light source. In some cases, the linear light source is a fluorescent lamp or a combination of a fluorescent lamp and a reflecting plate.

The light source in the optical display apparatus of the present invention may be a linear light source including a polygon mirror and a point light source.

The light source in the optical display apparatus of the present invention may be a linear light source which is a linear light source comprising a cylindrical mirror and a point light source.

The light source in the optical display apparatus of the present invention may be a linear light source configured by a light beam which is linearly focused by a mirror or a lens.

The light source in the optical display apparatus of the present invention may be a linear light source including an array of point light sources.

The light source in the optical display apparatus of the present invention may be a linear light source configured by a bright line displayed on a two-dimensional display apparatus.

According to the present invention, there may be provided an optical display system, including an optical display apparatus of the present invention having the above-described feature and an information communication apparatus. The optical display apparatus may three-dimensionally display a communication area of the information communication apparatus. A display area of the optical display apparatus and the communication area of the information communication apparatus may match with each other. The information communication apparatus may perform a one-way communication or an interactive communication of information.

An optical display apparatus provided by another aspect of the present invention includes an image display apparatus, an imaging optical system and a hologram screen. The hologram screen is arranged to reflect light from a point light source so as to form a point image at a position different from the point light source; and the imaging optical system is arranged to adjust a focus in a vertical direction of an image displayed on the image display apparatus to coincide with the hologram screen. The above-described object is accomplished by such a feature.

In one embodiment, the formed point image is a real image.

In another embodiment, the formed point image is a false image formed at a position on an opposite side of the point light source with respect to the hologram screen.

In one embodiment, the imaging optical system has independent imaging functions in a vertical direction and in a lateral direction. For the vertical direction, a focus in the vertical direction of an image displayed on the image display apparatus is adjusted to coincide with the hologram screen; and for the lateral direction, a focal distance is arranged to be variable.

The above-described optical display apparatus may further include polarization glasses whose polarization transmission directions for respective eyes are orthogonal to each other.

According to the present invention, there may be provided an optical display system having a plurality of display units arranged in a lateral direction, wherein each of the plurality of display units is the optical display apparatus of the present invention having the above-described feature.

Moreover, according to the present invention, there may be provided an optical display system having a plurality of display units arranged in a depth direction, wherein each of the plurality of display units is the optical display apparatus of the present invention having the above-described feature.

The image display apparatus may include: a display device selected from an LED, a CRT, a polymer dispersed type liquid crystal panel and an organic EL panel; and a polarization switching device.

Moreover, the polarization switching device may include a ferroelectric liquid crystal panel.

Each of

Figure 3A:
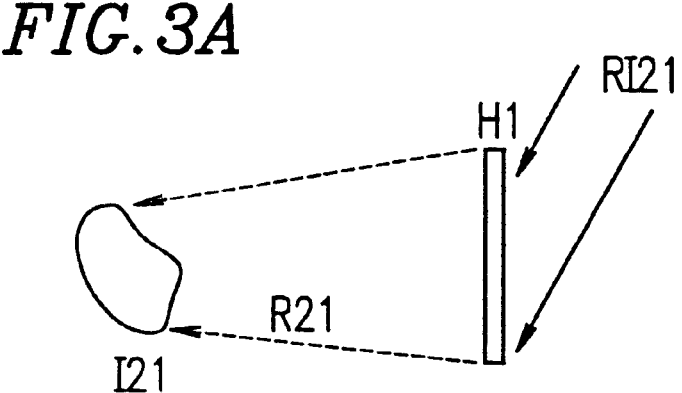
Figure 3B:
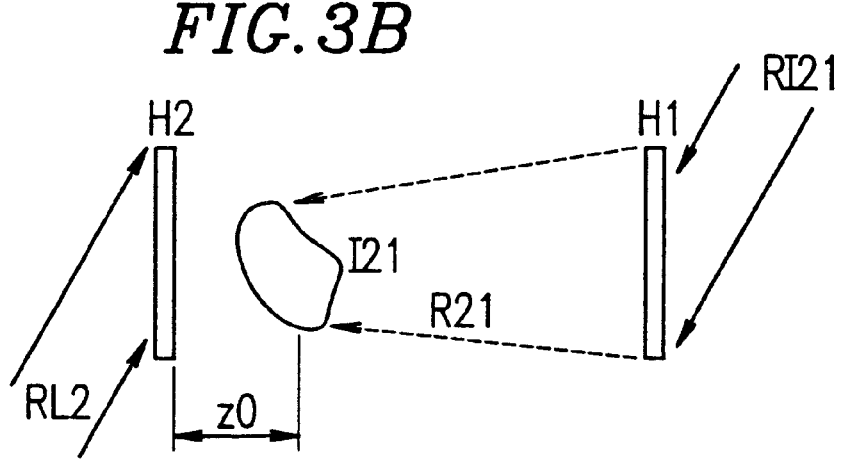

FIGS. 3A and 3B is a diagram schematically illustrating a principle of producing a conventional reflection-type hologram.

Figure 3C:
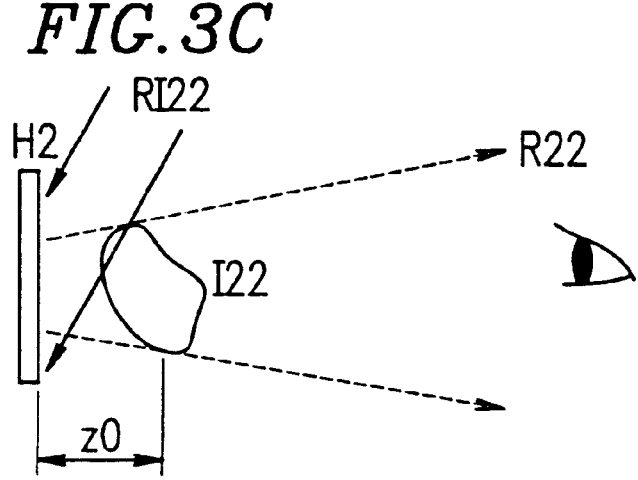

FIG. 3C is a diagram schematically illustrating a principle of reconstructing the reflection-type hologram formed as illustrated in FIGS. 3A and 3B.

Figure 3D:
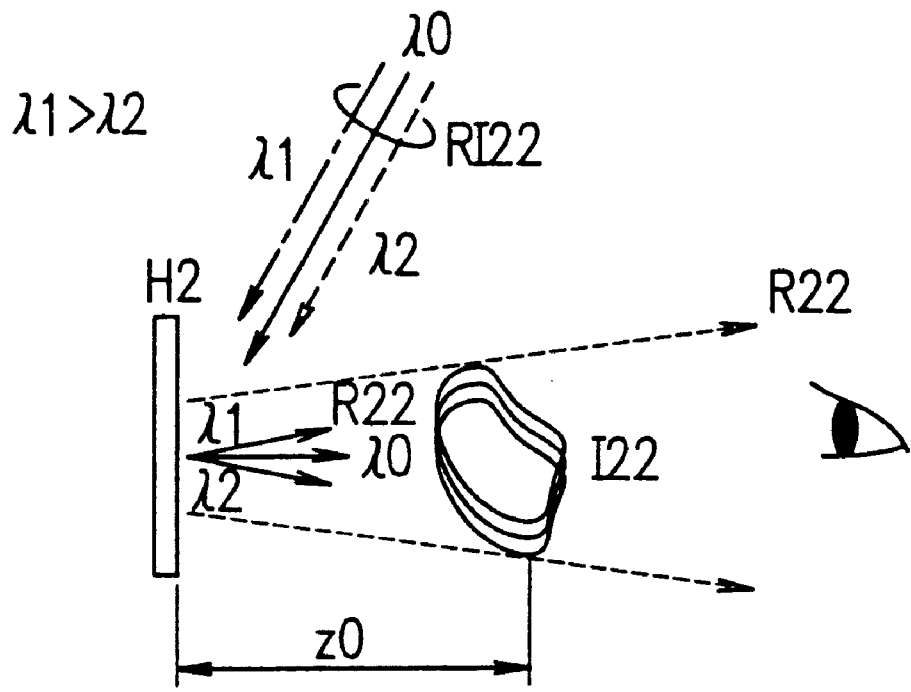

FIG. 3D is a schematic diagram for illustrating a reason why a reconstructed image of the reflection-type hologram is blurred.

Figure 3E:
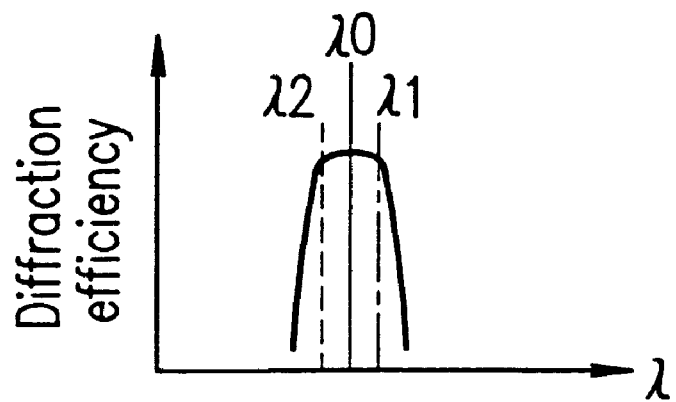

FIG. 3E is a diagram schematically illustrating the wavelength dependency of the diffraction efficiency in the reflection-type hologram.

Each of

Figure 4A:
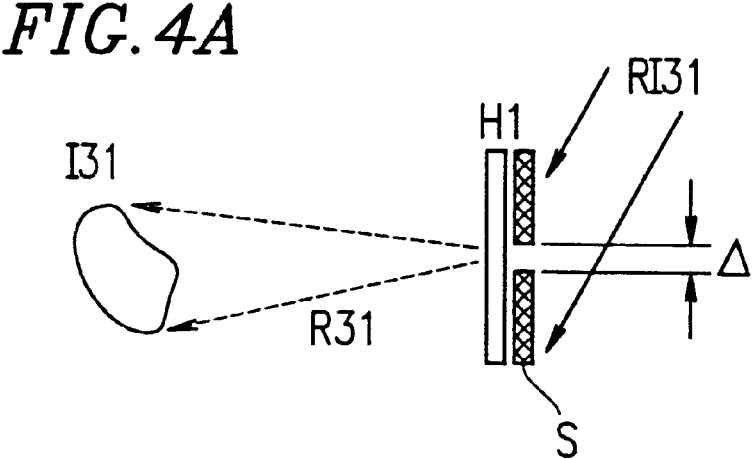
Figure 4B:
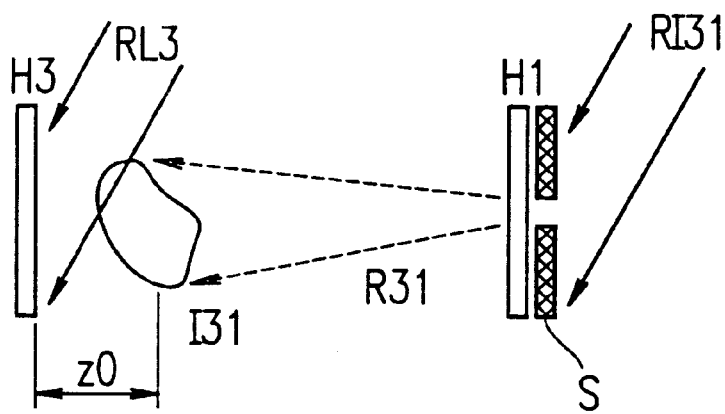

FIGS. 4A and 4B is a diagram schematically illustrating a principle of producing a conventional rainbow hologram.

Figure 4C:
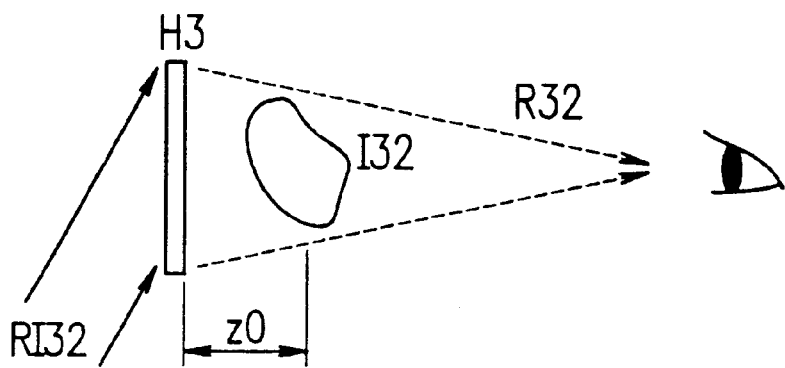

FIG. 4C is a diagram schematically illustrating a principle of reconstructing the rainbow hologram formed as illustrated in FIGS. 4A and 4B.

Figure 4D:
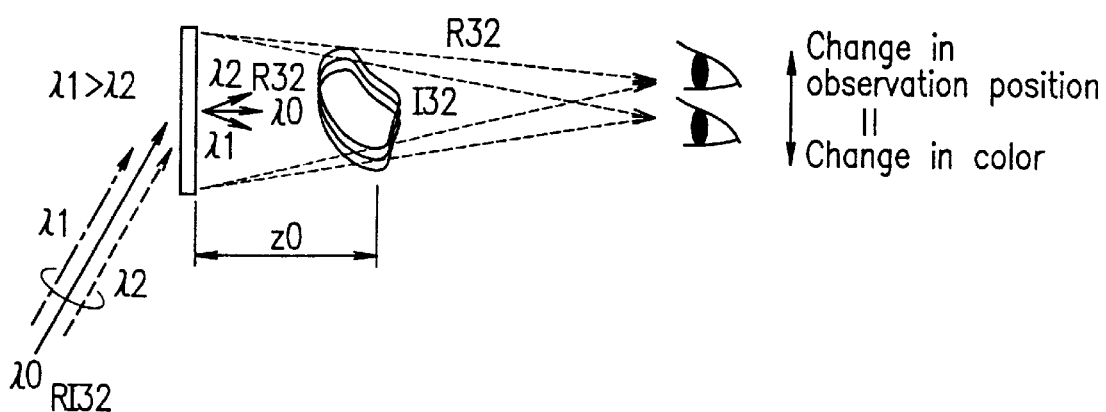

FIG. 4D is a schematic diagram for illustrating a reason why a reconstructed image of the rainbow hologram has only little blur.

Figure 4E:
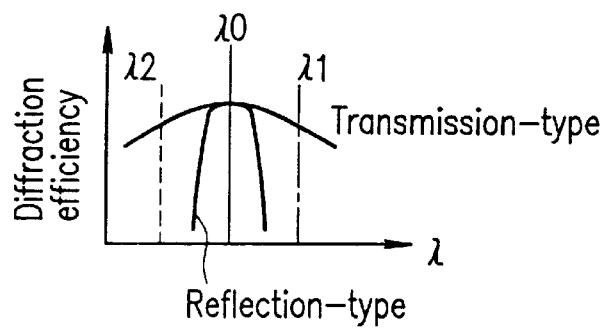

FIG. 4E is a diagram schematically illustrating the wavelength dependency of the diffraction efficiency in the rainbow hologram.

Each of

Figure 5A:
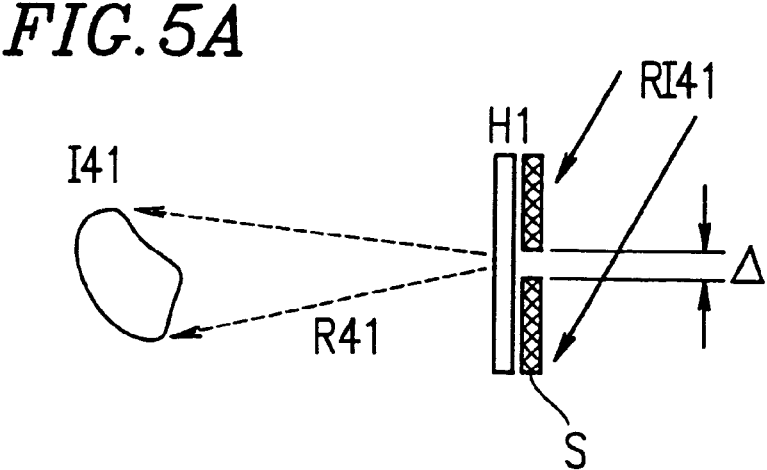
Figure 5B:
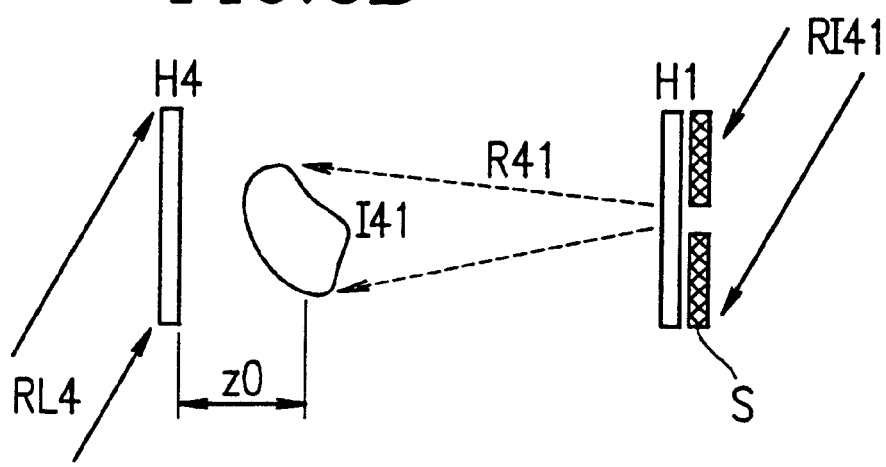

FIGS. 5A and 5B is a diagram schematically illustrating a principle of producing a reflection-type hologram according to the present invention.

Figure 5C:
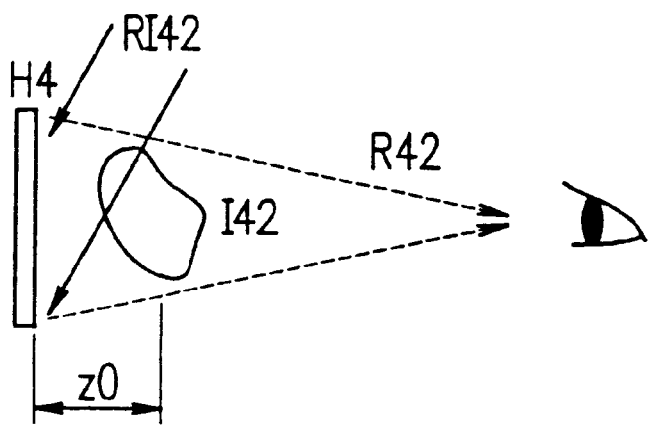

FIG. 5C is a diagram schematically illustrating a principle of reconstructing the reflection-type hologram of the present invention formed as illustrated in FIGS. 5A and 5B.

Figure 6A:
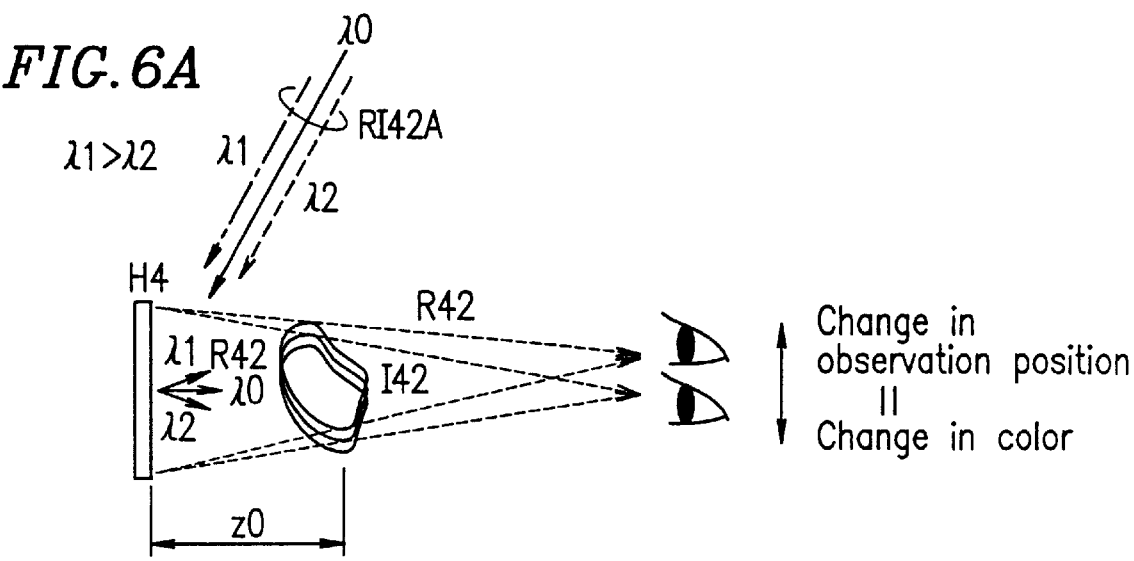

FIG. 6A is a schematic diagram for illustrating a reason why a reconstructed image of the reflection-type hologram of the present invention has only little blur.

Figure 6B:
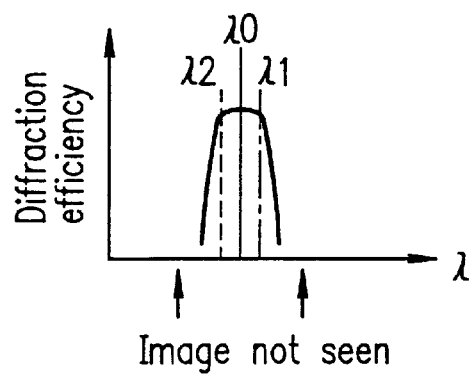

FIG. 6B is a diagram schematically illustrating the wavelength dependency of the diffraction efficiency in the reflection-type hologram of the present invention.

Each of

Figure 7A:
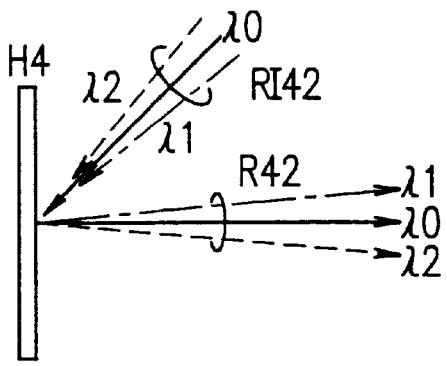
Figure 7B:
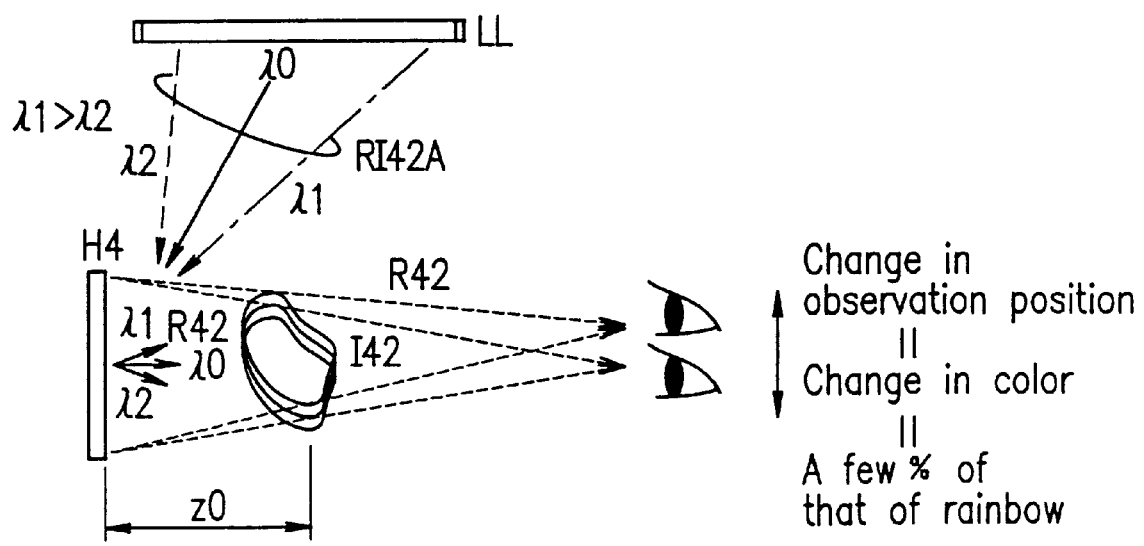

FIGS. 7 and 7B is a diagram schematically illustrating the reflection-type hologram of the present invention formed as illustrated in FIGS. 5A and 5B being reconstructed by using a linear light source.

Figure 8:
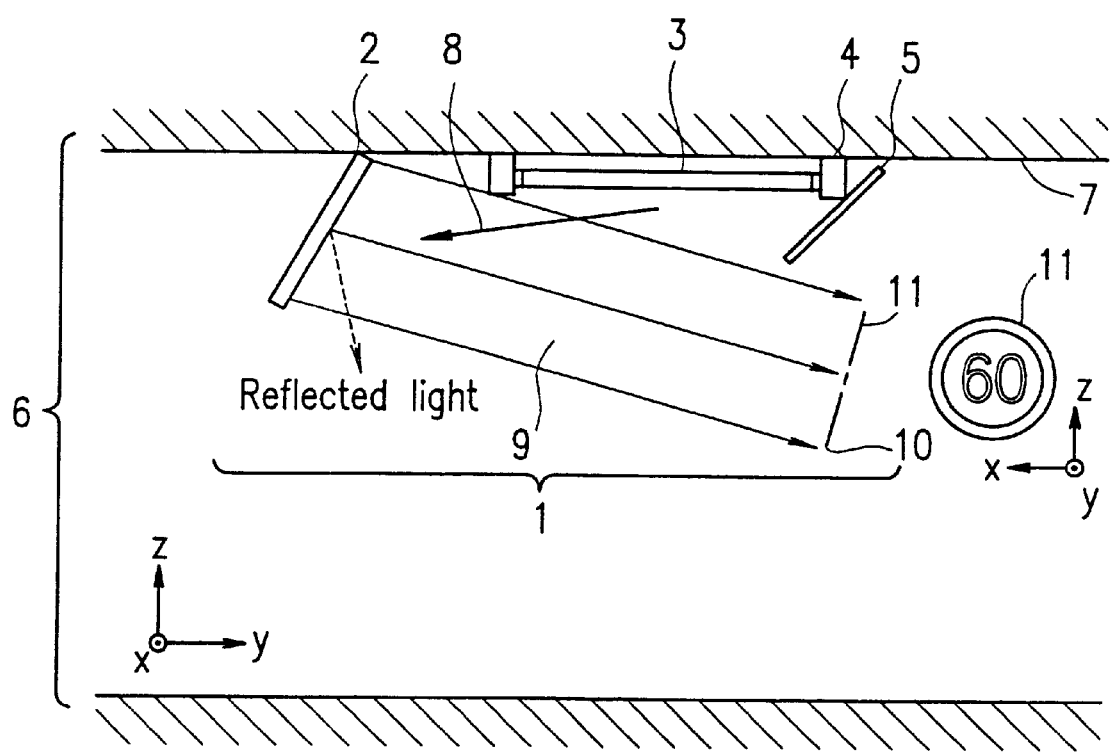

FIG. 8 is a side view illustrating a structure of an optical display apparatus according to Embodiment 1 of the present invention.

Figure 9:
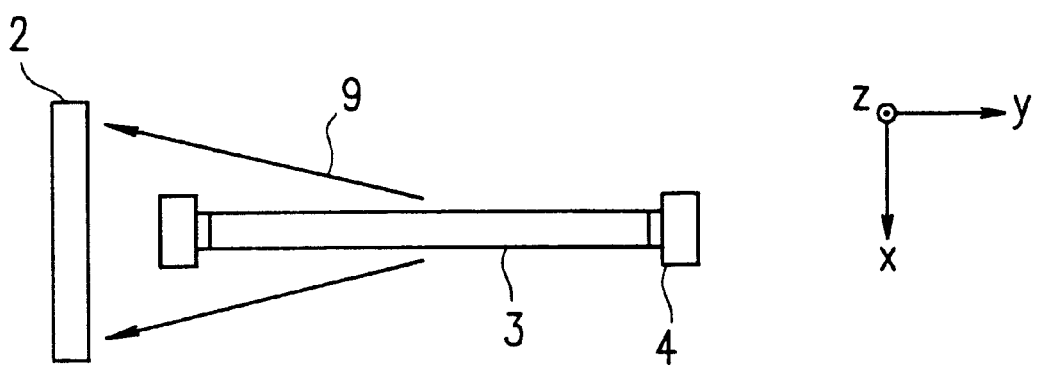

FIG. 9 is a plan view illustrating the optical display apparatus of FIG. 8.

Figure 10:
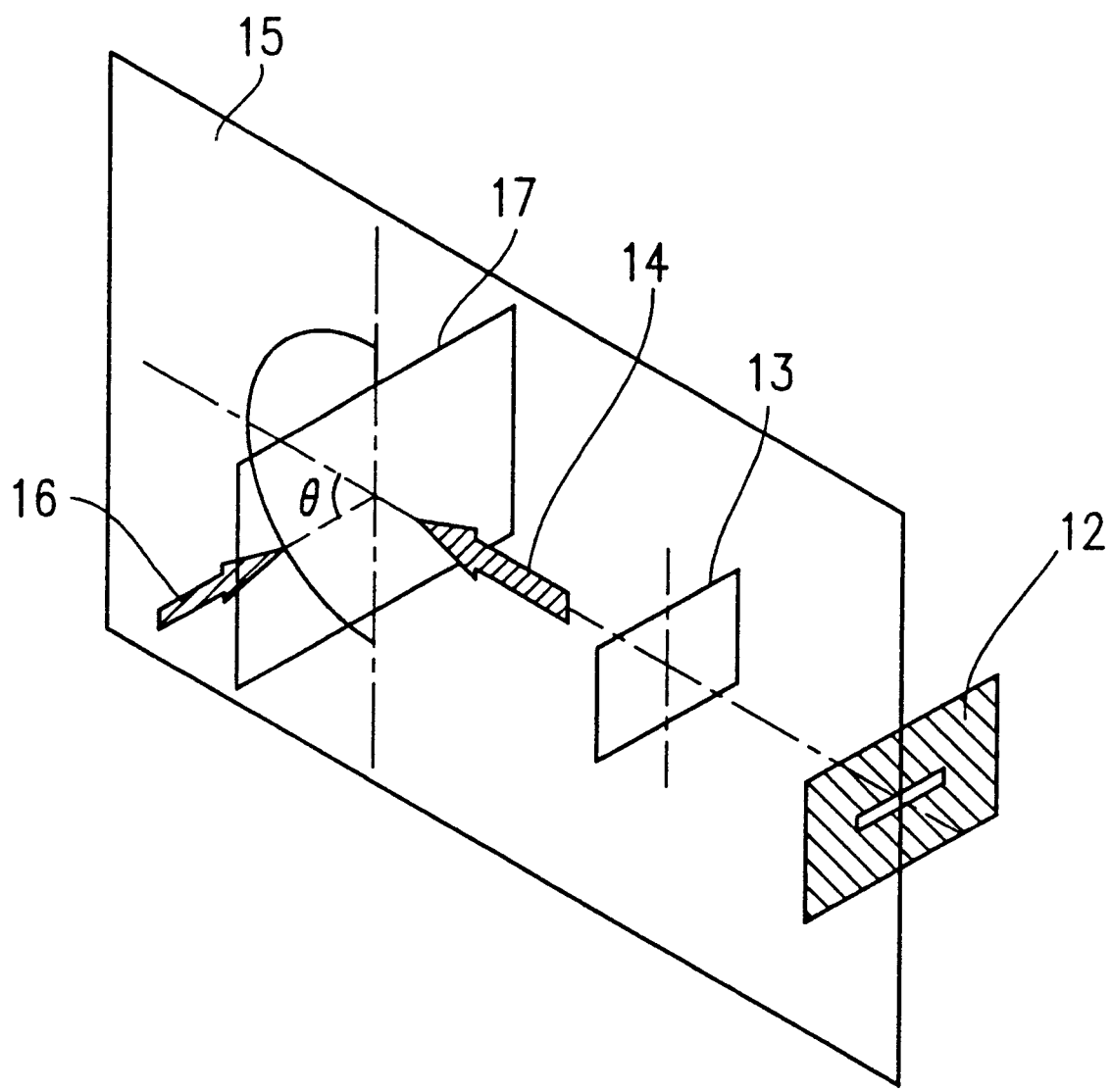

FIG. 10 is a perspective view illustrating an optical system for producing a hologram according the present invention.

Figure 11A:
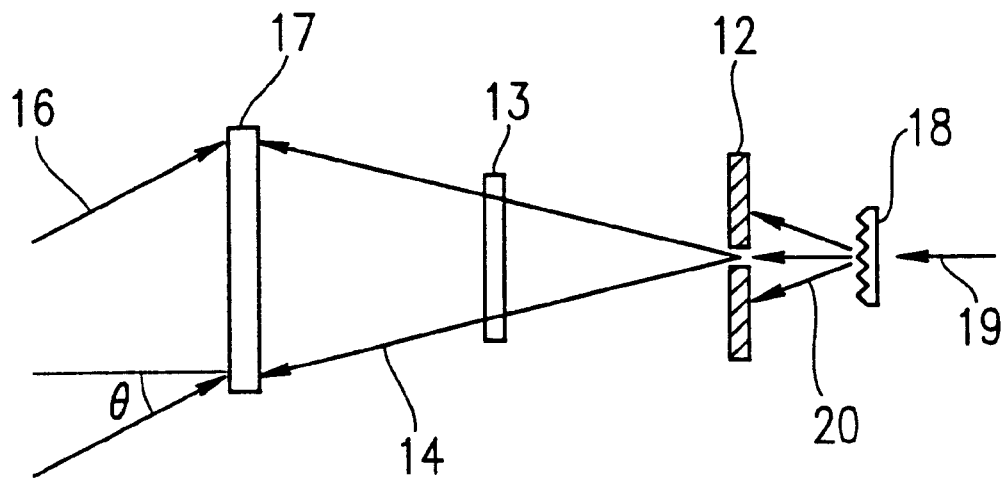
Figure 11B:
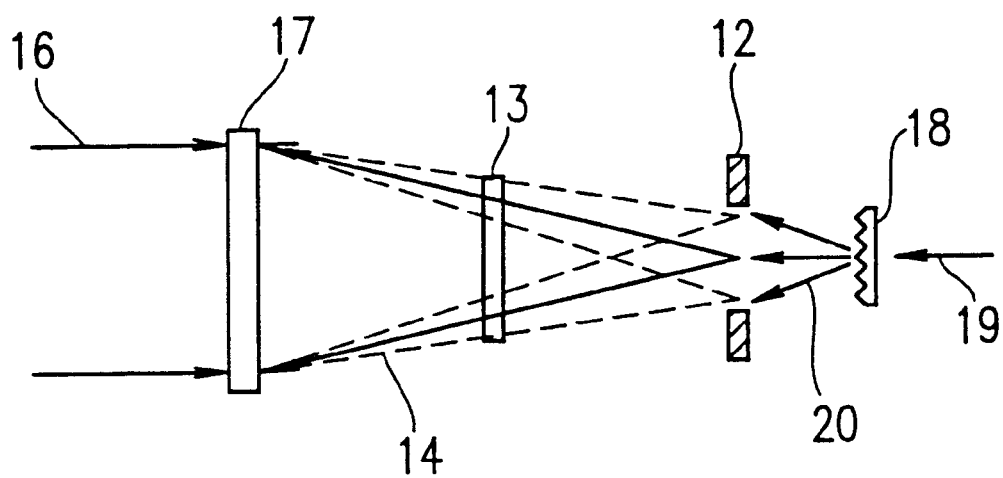

FIGS. 11A and 11B are a side view and a plan view, respectively, of the optical system for producing a hologram illustrated in FIG. 10.

Figure 12:
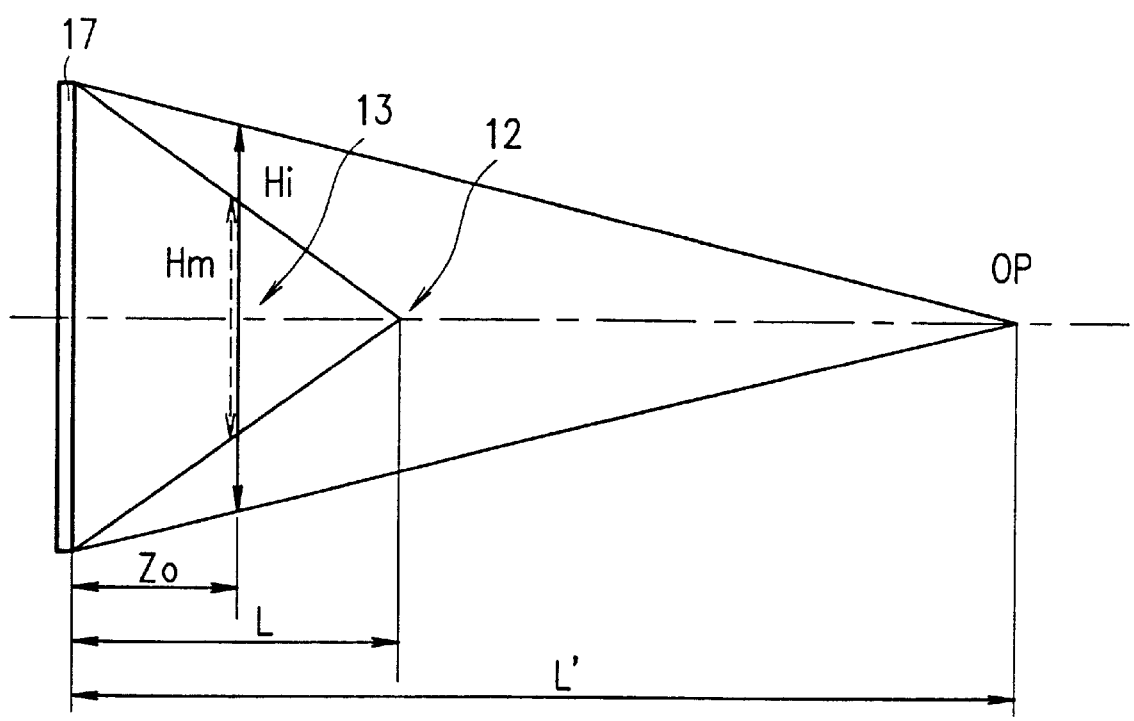

FIG. 12 is a diagram schematically illustrating the geometrical relationship between the height of a hologram and the observation position.

Figure 13:
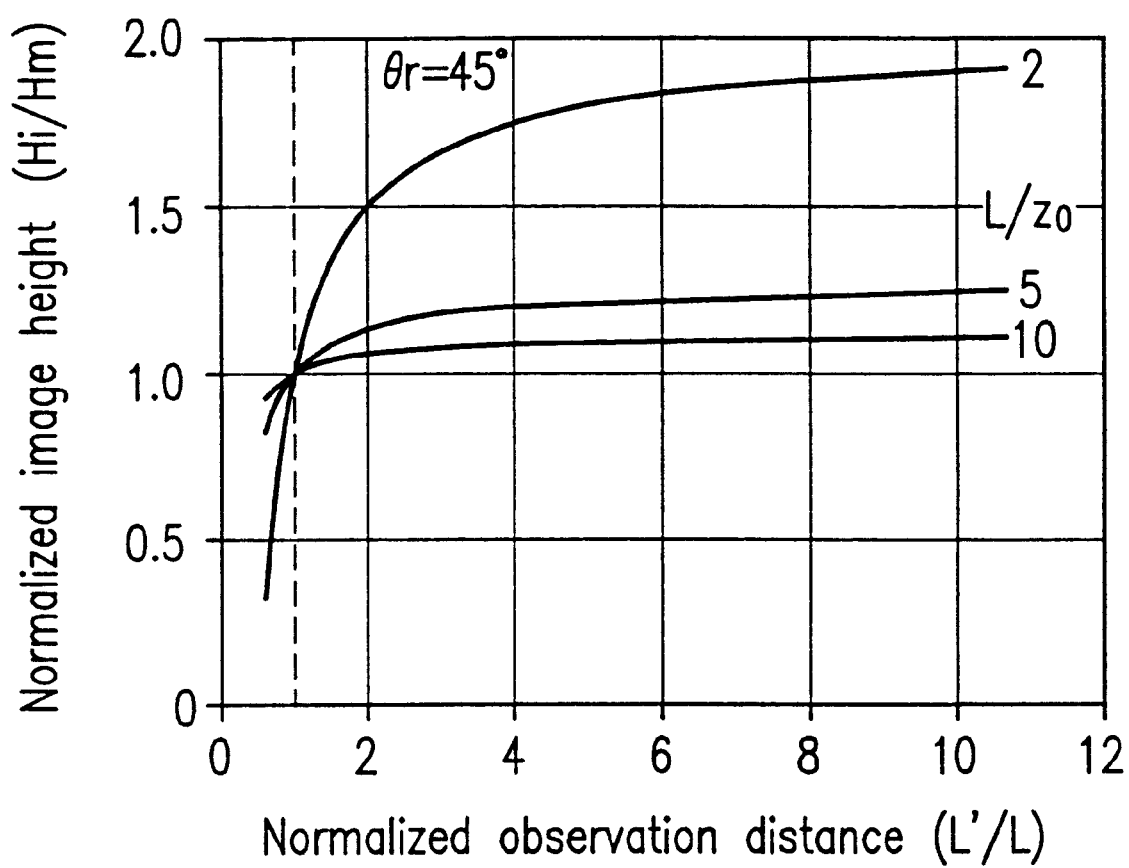

FIG. 13 is a graph illustrating the relationship between the size of a reconstructed image and the observation position.

Figure 14:
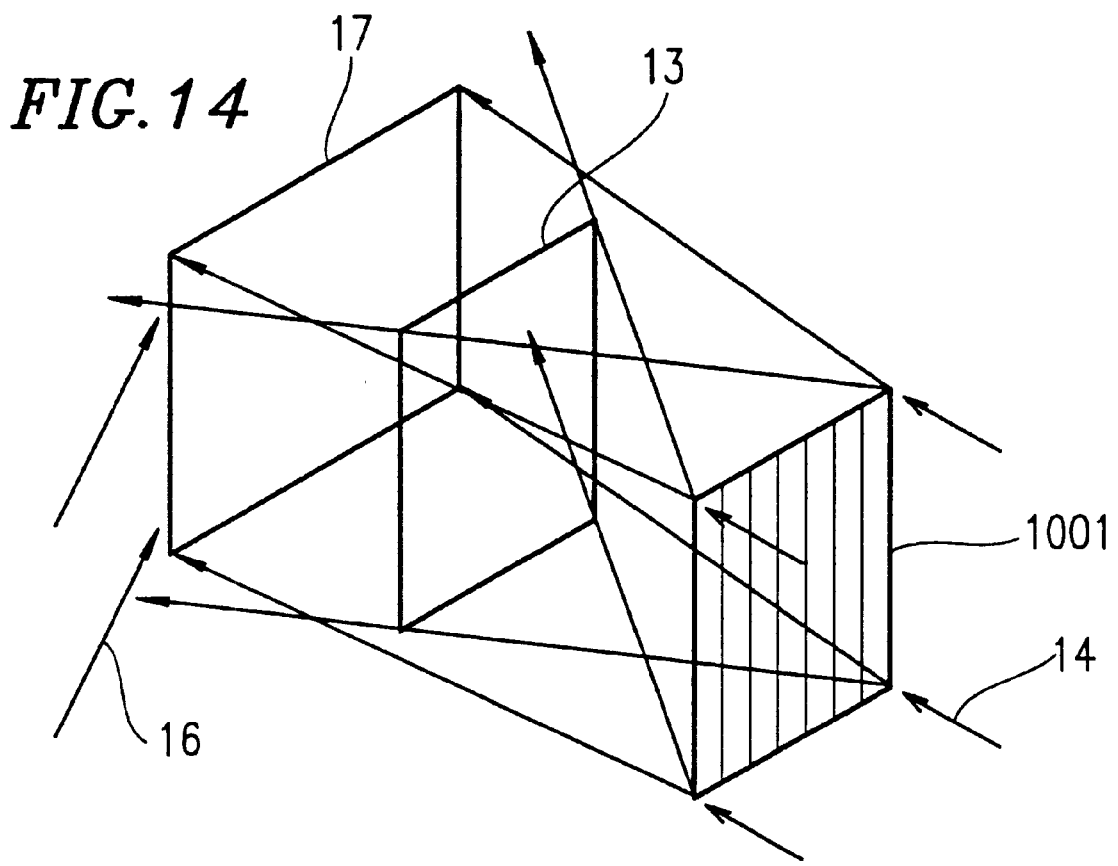

FIG. 14 is a diagram schematically illustrating a structure of an exposure optical system using a one-dimensional diffuser.

Figure 15A:
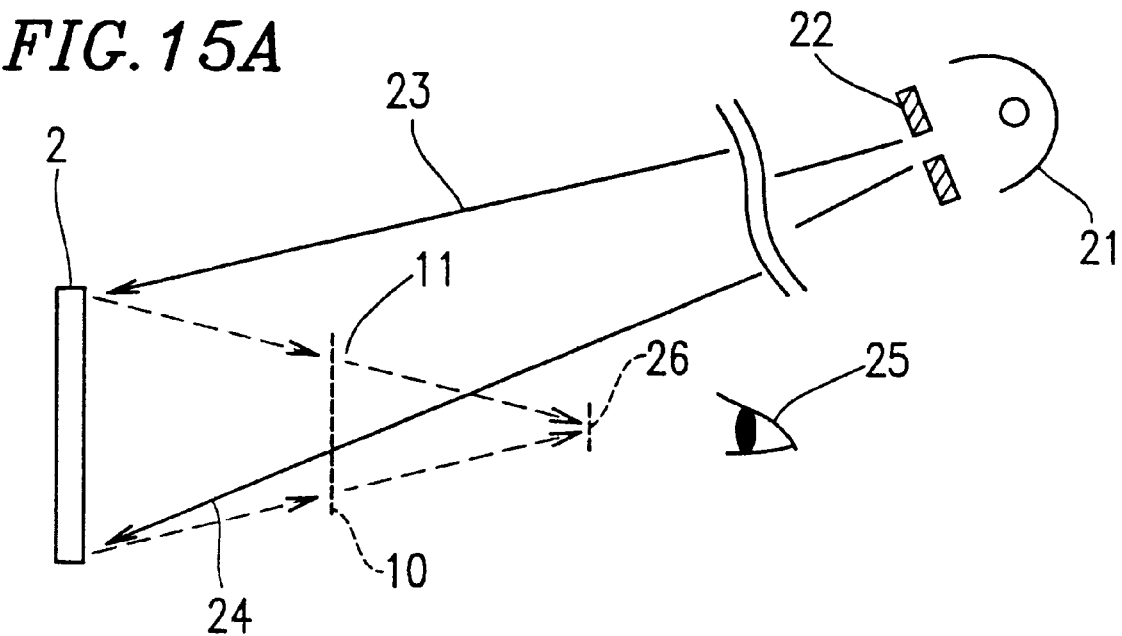
Figure 15B:
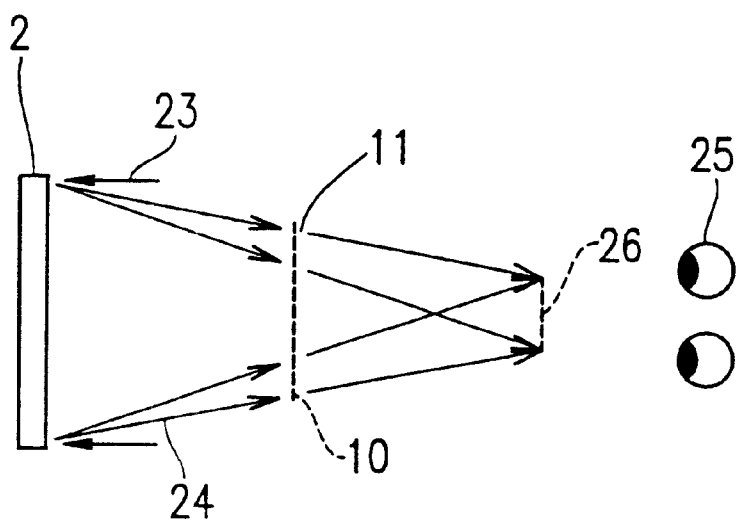

FIGS. 15A and 15B are a side view and a plan view, respectively, illustrating principle of reconstructing the hologram according to the present invention.

Each of

Figure 16A:
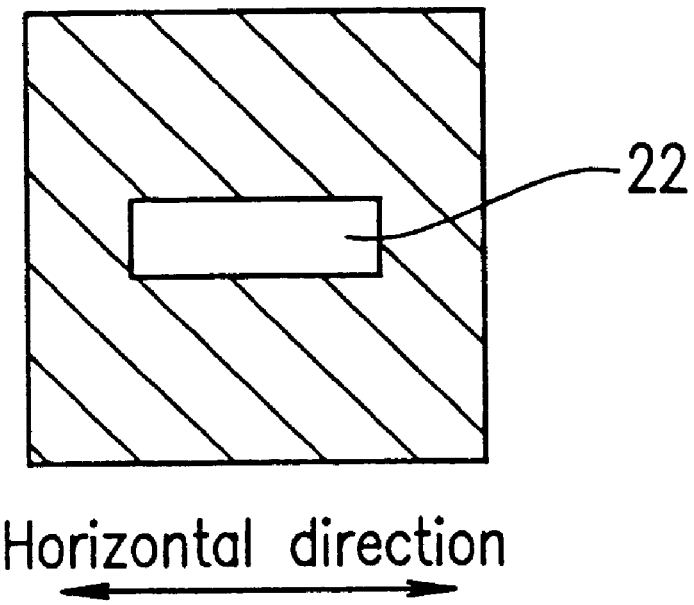
Figure 16B:
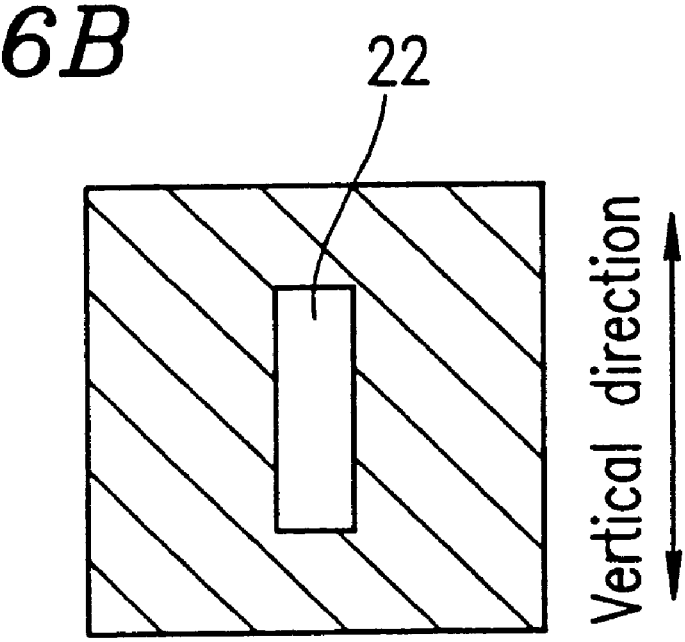

FIGS. 16A and 16B is a diagram illustrating a shape of an opening which can be used in observing a reconstructed image according to the present invention.

Figure 17A:
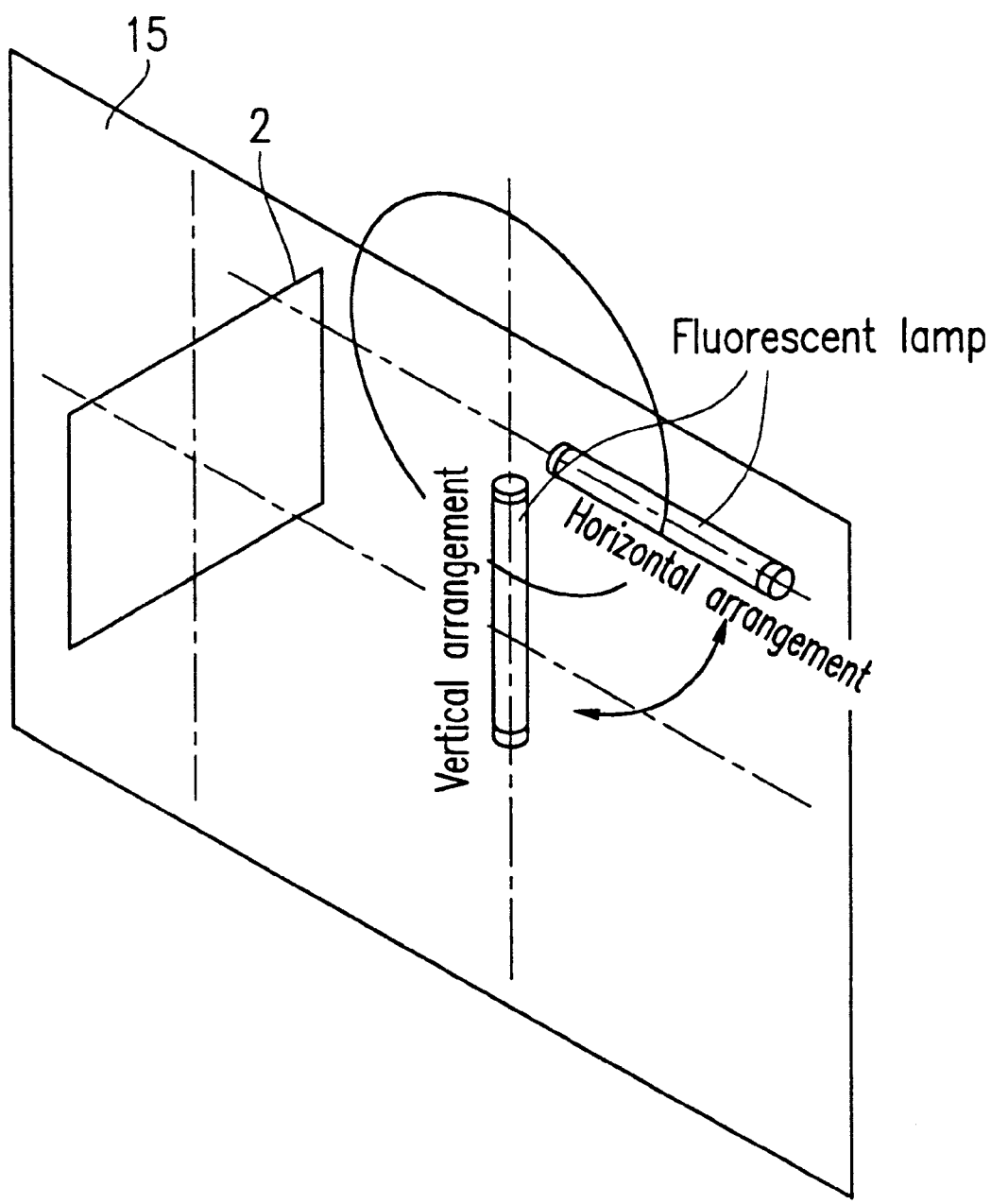

FIG. 17A is a perspective view illustrating a reconstruction optical system of the optical display apparatus of the present invention.

FIGS. 17B and 17C are diagrams illustrating viewing angle ranges obtained when a fluorescent tube of the same length is provided in a horizontal arrangement and a vertical arrangement, respectively.

Figure 18:
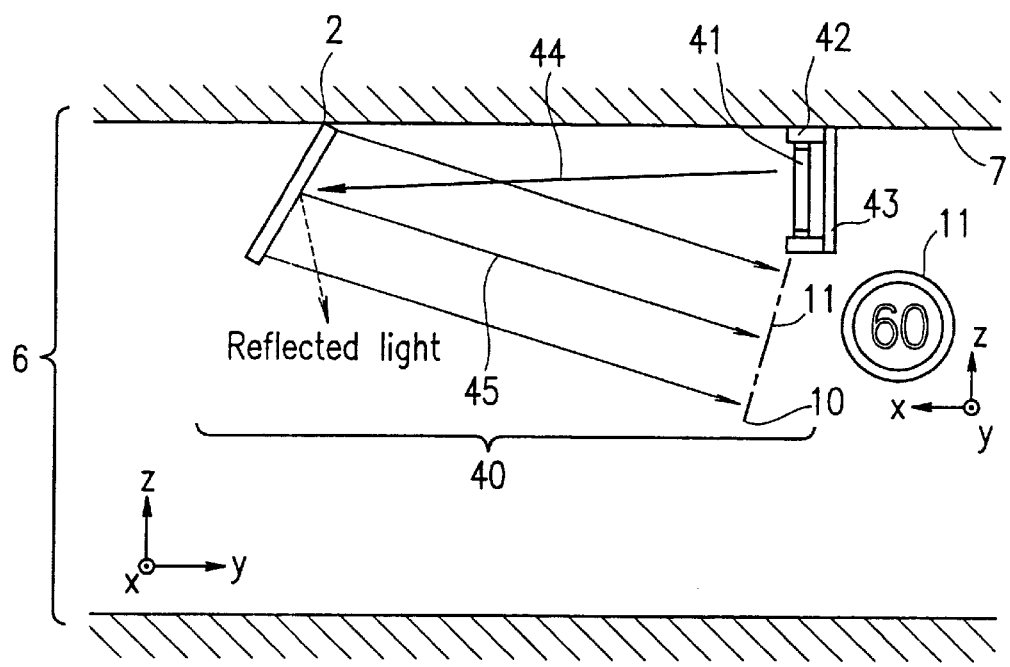

FIG. 18 is a side view illustrating a structure of an optical display apparatus according to Embodiment 2 of the present invention.

Figure 19:
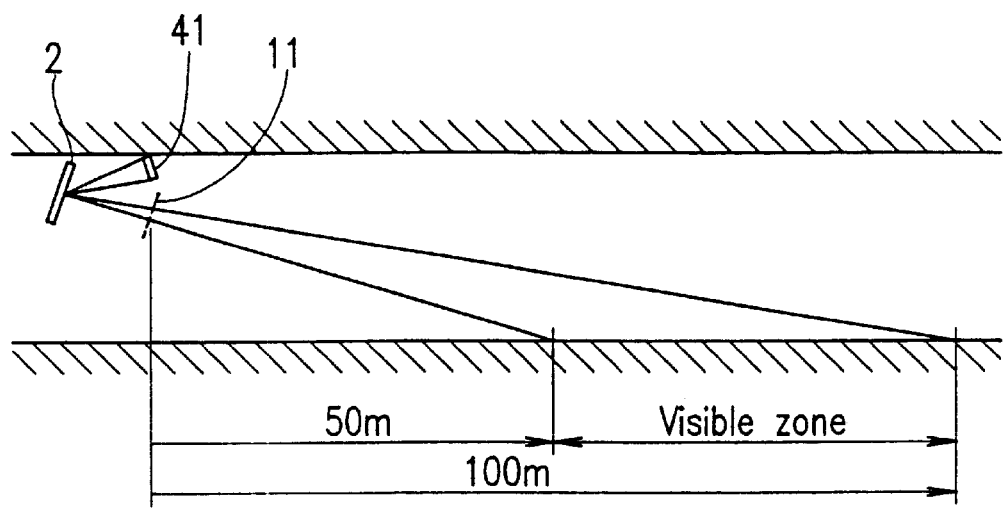

FIG. 19 is a diagram schematically illustrating that a viewing distance can be limited.

Figure 20:
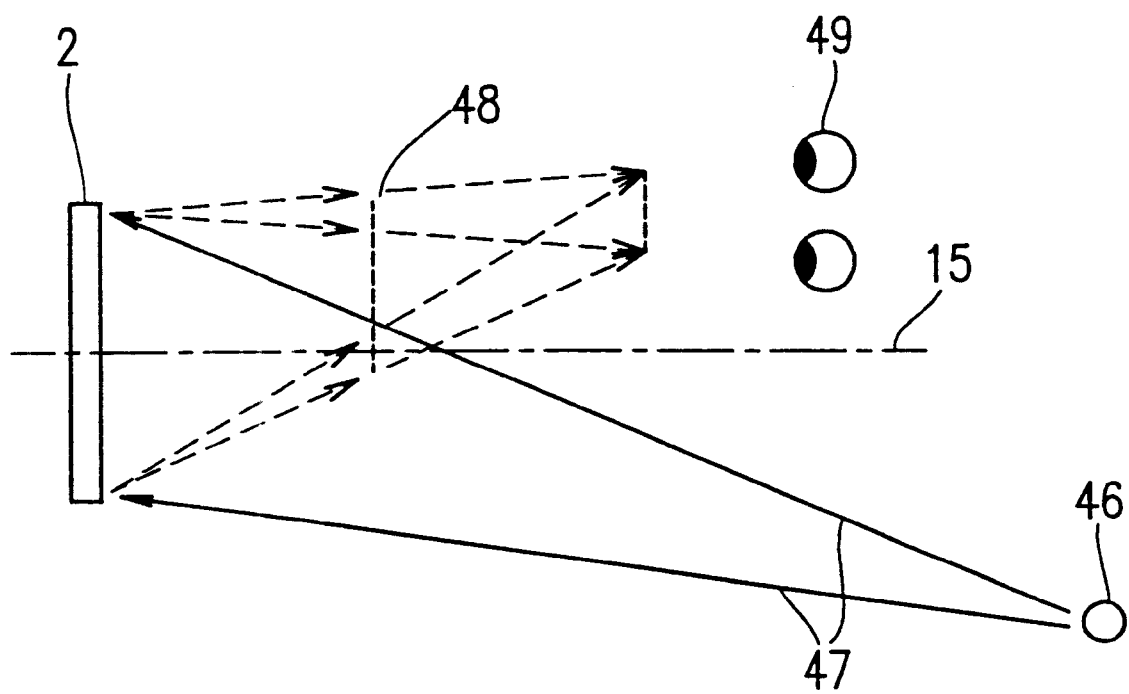

FIG. 20 is a plan view illustrating the optical display apparatus of the present invention where the installation position of a linear light source (fluorescent lamp) is spaced apart from the incident plane (when it is provided in an offset arrangement).

Figure 21A:
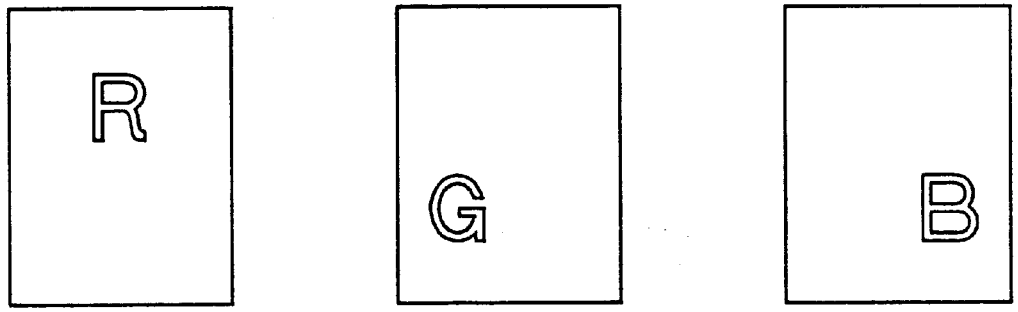

FIG. 21A is a diagram illustrating three exposure pattern masks respectively corresponding to the three primary colors.

Figure 21B:
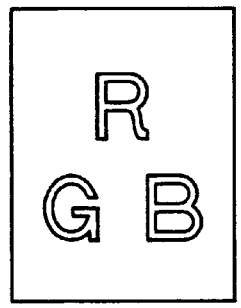

FIG. 21B is a diagram illustrating a reconstructed image obtained by superposing the produced three primary color holograms on another.

Figure 21C:
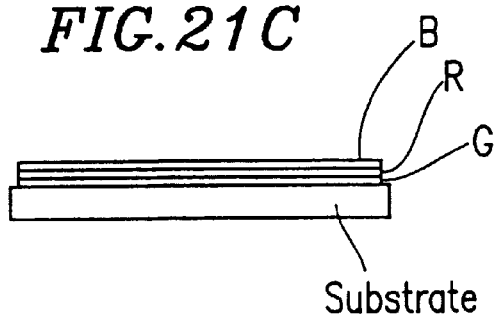

FIG. 21C is a diagram illustrating the produced holograms being layered on a single substrate.

Figure 22:
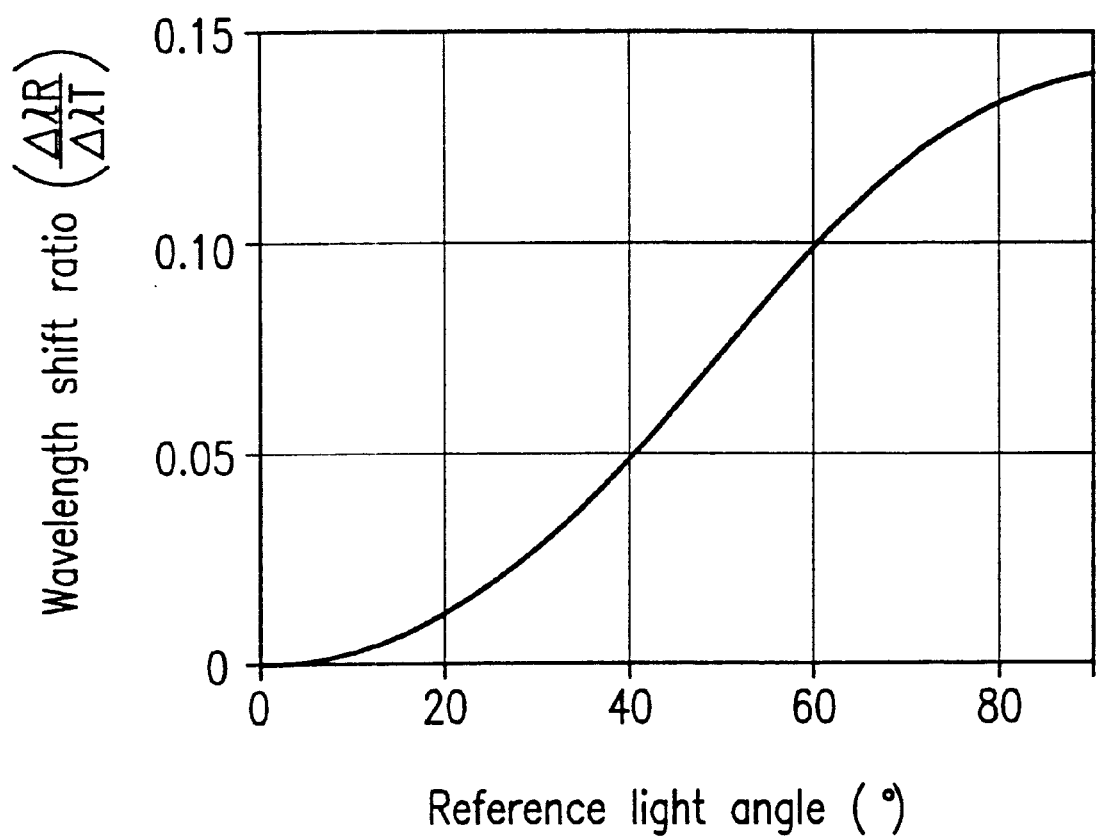

FIG. 22 is a graph illustrating the relationship between the change in color at the center of a reconstructed image and the reference light angle.

Figure 23:
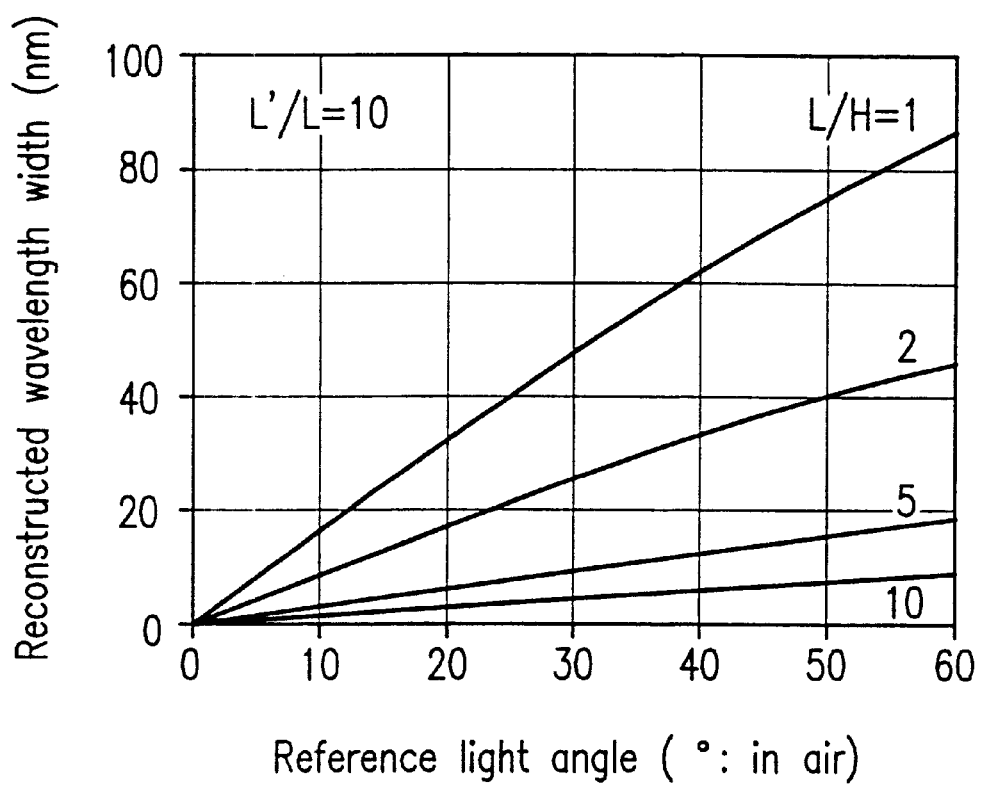

FIG. 23 is a graph illustrating the relationship between the color distribution in the reconstructed image and the reference light angle.

Figure 24:
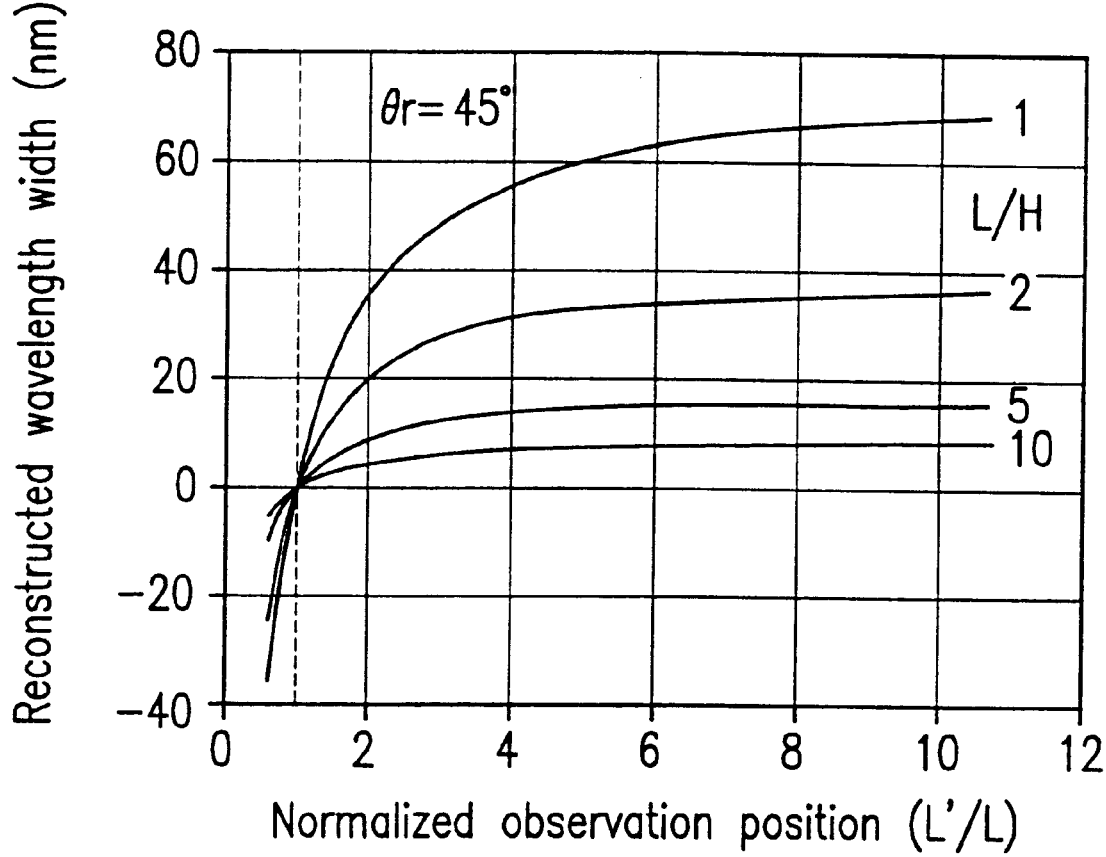

FIG. 24 is a graph illustrating the relationship between the color distribution in the reconstructed image and the observation position.

Each of

FIGS. 25A to 25E illustrates a diagram illustrating an exemplary hologram being formed on a flexible substrate.

Figure 26:
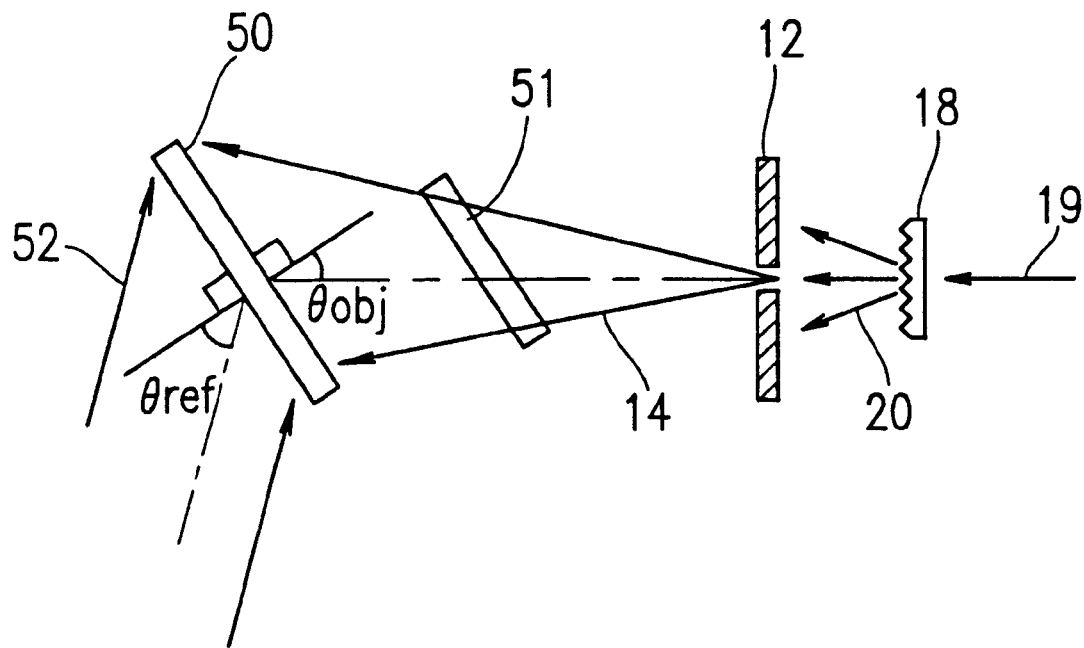

FIG. 26 illustrates a side view of an optical system for producing a hologram which is reconstructed and displayed with a color having a wavelength other than the laser oscillation wavelength.

Figure 27A:
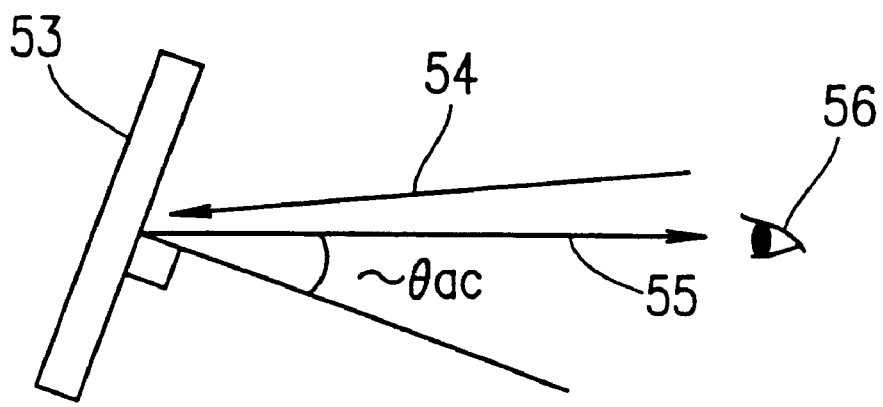
Figure 27B:
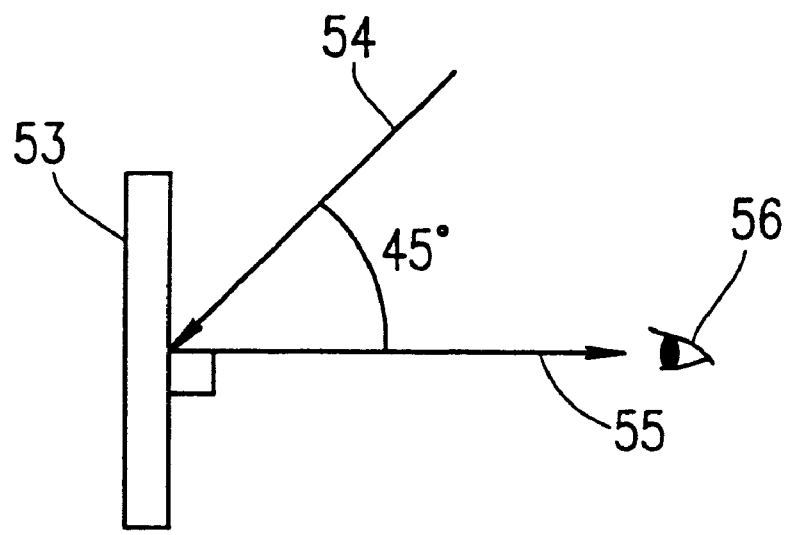

FIG. 27A is a diagram illustrating an installed hologram in which the change in color is reduced within the viewing range thereof, and FIG. 27B is a diagram illustrating a normal hologram being reconstructed.

Figure 28:
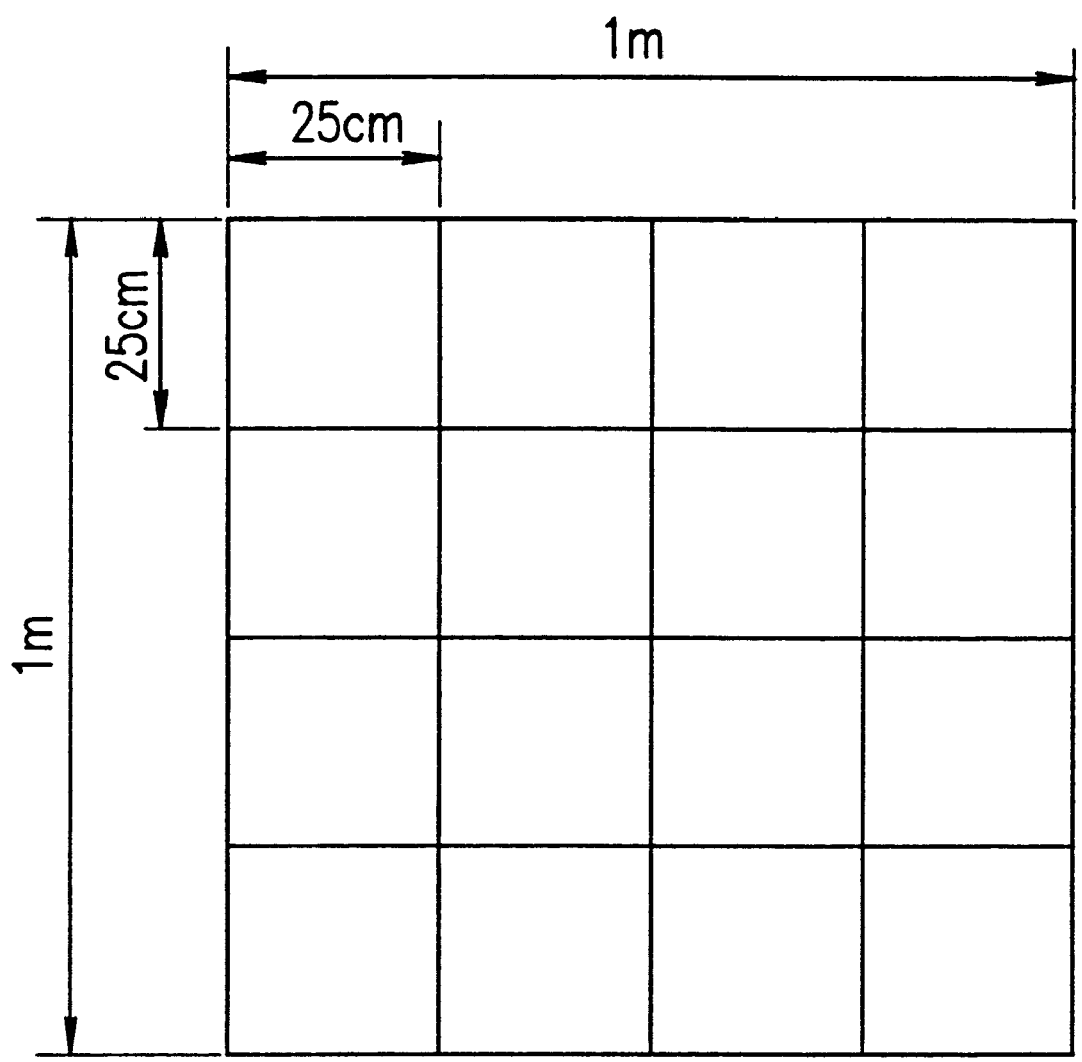

FIG. 28 is a conceptual diagram illustrating elementary holograms being combined together to produce a large display.

Figure 29A:
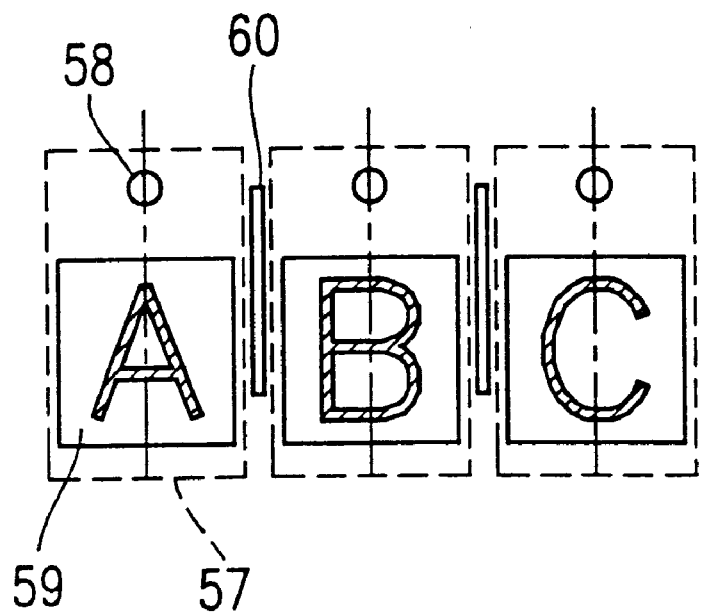
Figure 29B:
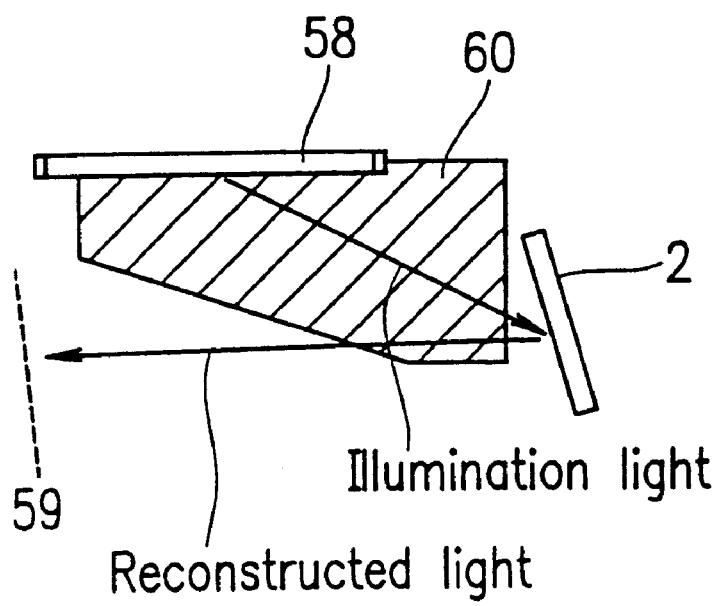

FIGS. 29A and 29B are a front view and a side view, respectively, of an exemplary optical display apparatus in which three display units are arranged side by side.

Figure 30A:
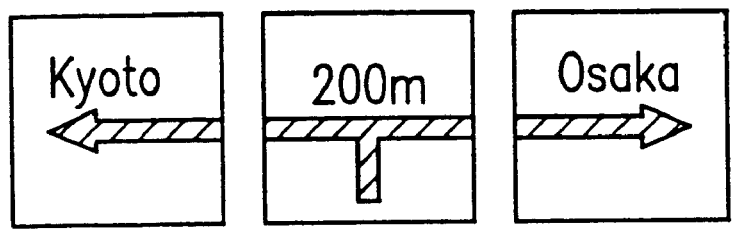
Figure 30B:
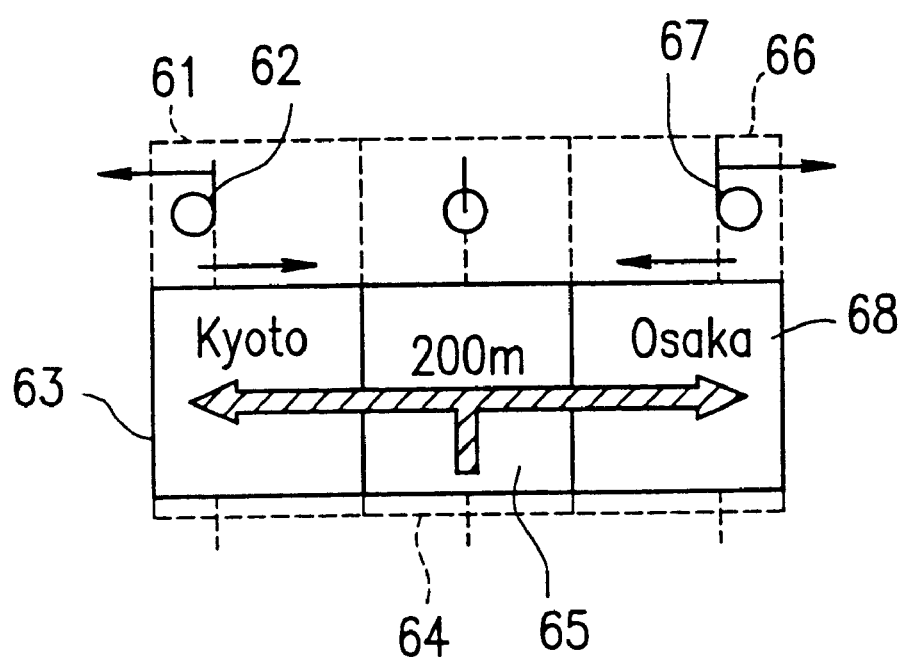

FIGS. 30A and 30B are diagrams illustrating an exemplary optical display apparatus in which three display units are arranged side by side for displaying a single large pattern, respectively showing separated reconstructed images and reconstructed images which are seamlessly synthesized together.

Figure 31A:
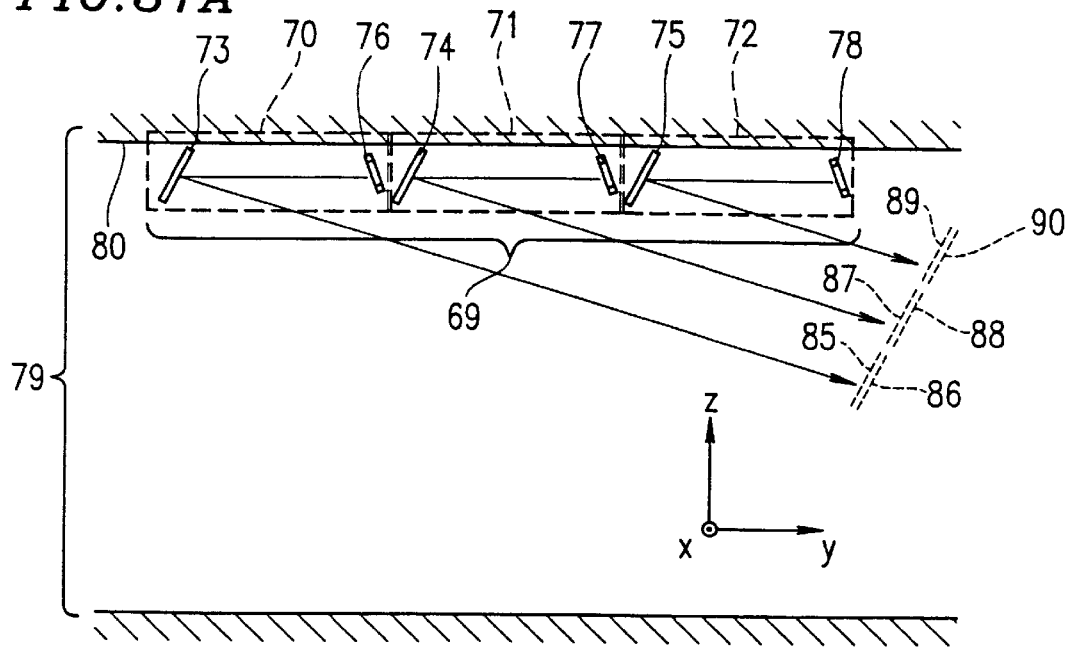

FIG. 31A a side view illustrating a structure of an optical display apparatus according to Embodiment 12 of the present invention.

FIG. 31B is a diagram illustrating a pattern which is displayed by the optical display apparatus of FIG. 31A.

FIG. 31C is a diagram illustrating elementary patterns which are recorded on the respective display units in the optical display apparatus of FIG. 31A.

Figure 31D:
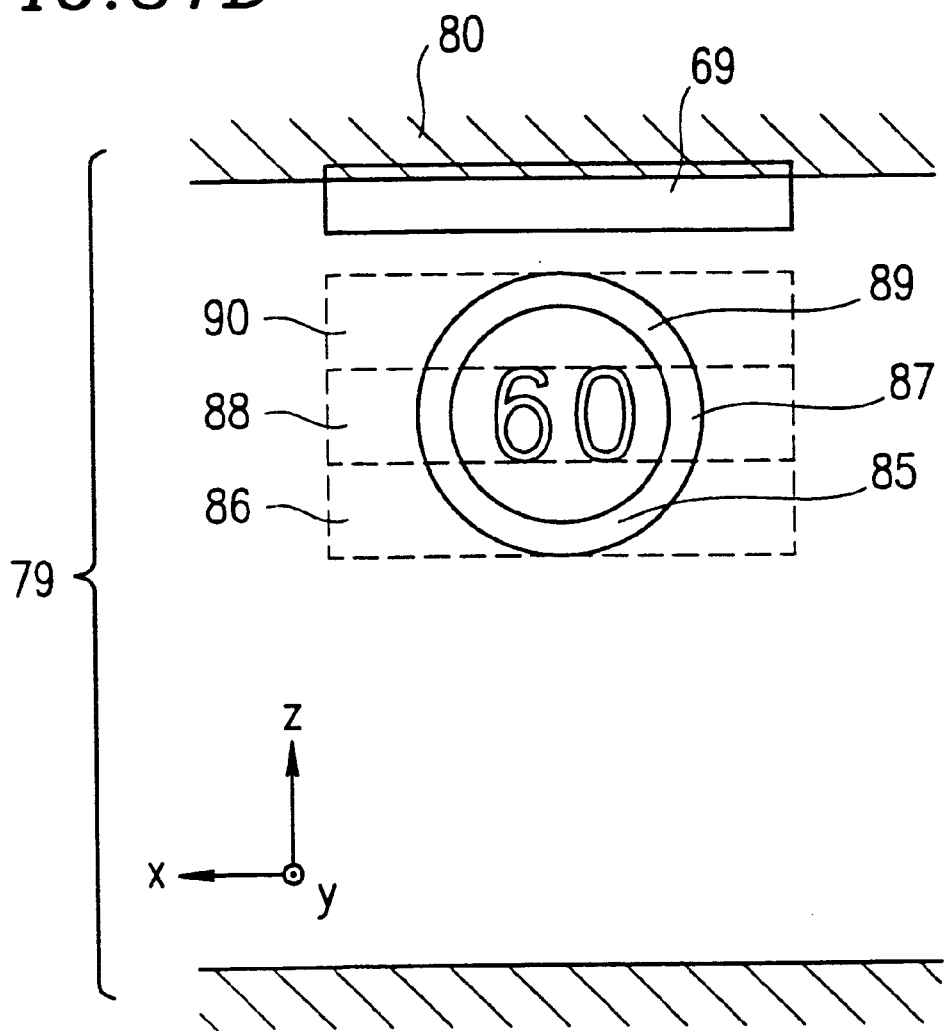

FIG. 31D is a diagram illustrating a reconstructed image which is displayed by the optical display apparatus of FIG. 31A.

Figure 32:
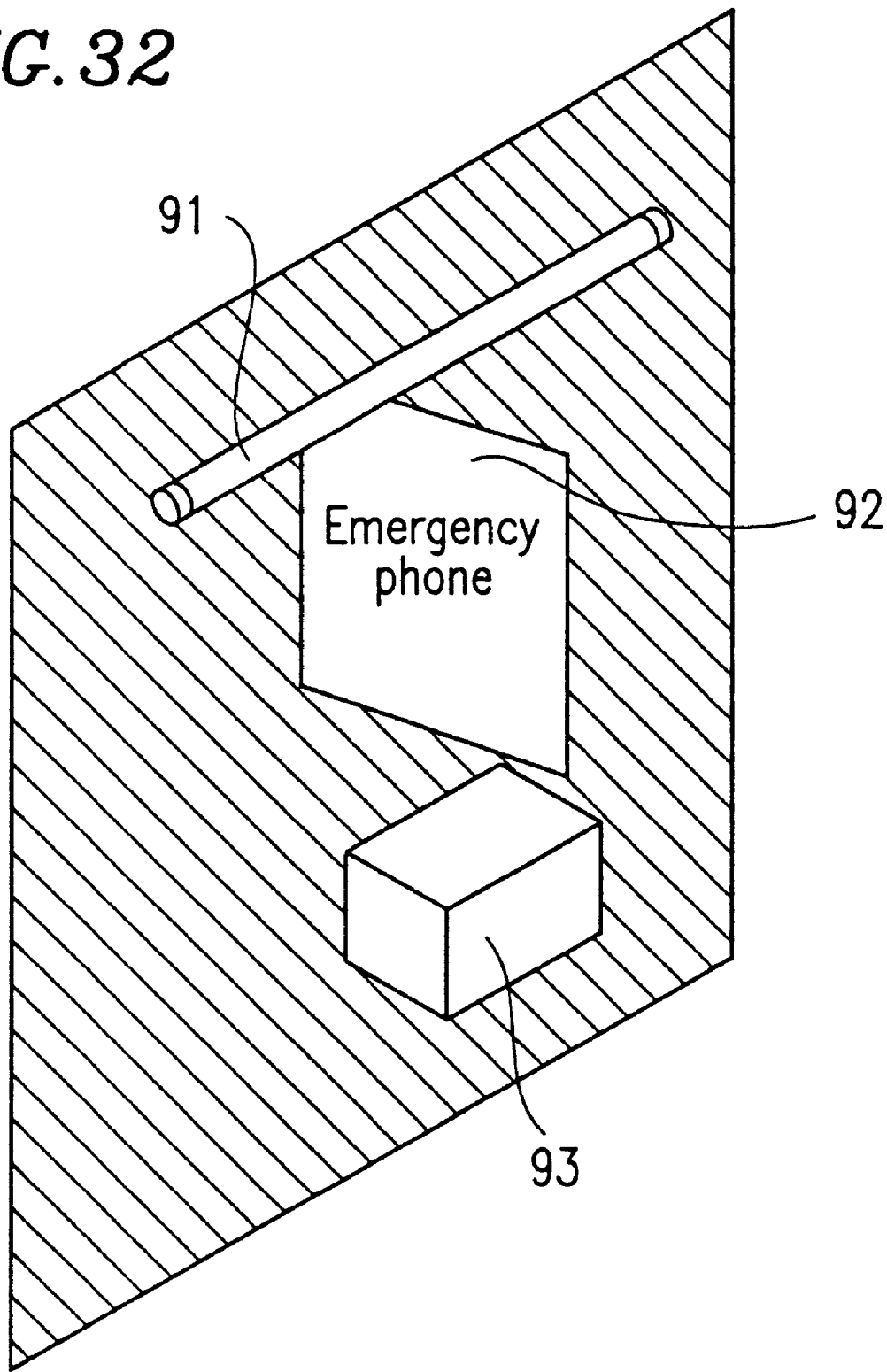

FIG. 32 is a perspective view of an optical display apparatus according to Embodiment 13 of the present invention.

Figure 33:
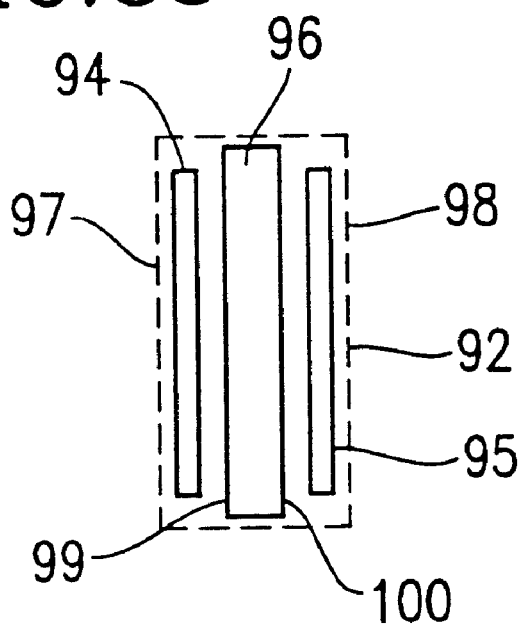

FIG. 33 is a diagram illustrating a structure of a hologram unit included in the optical display apparatus of FIG. 32.

Figure 34:
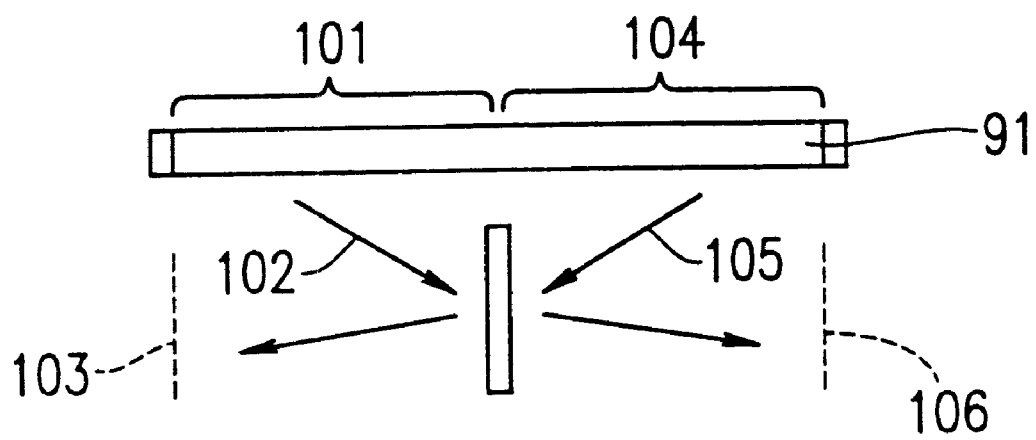

FIG. 34 is a diagram illustrating a principle of operation of the optical display apparatus of FIG. 32.

Figure 35:
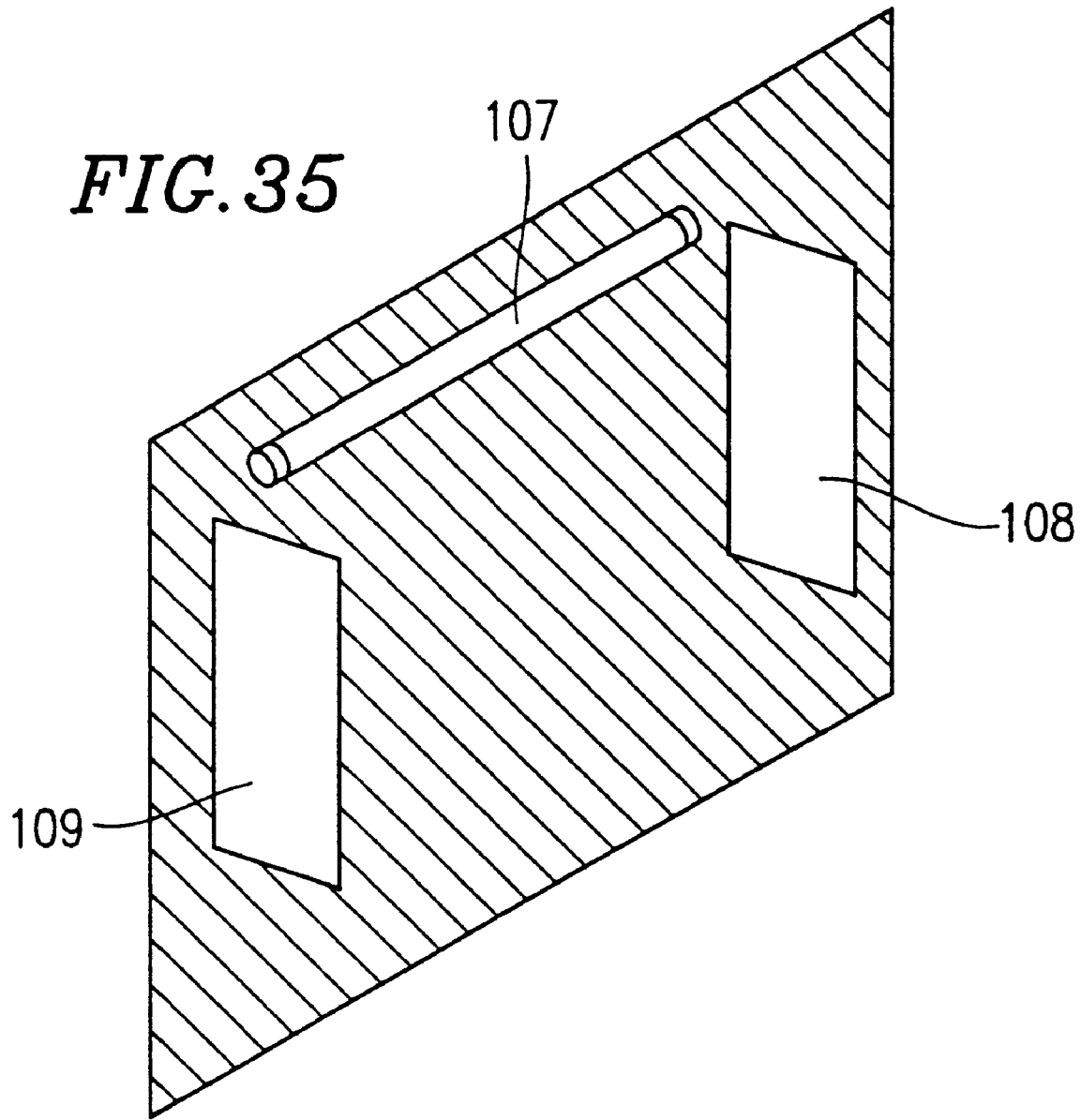

FIG. 35 is a perspective view of an optical display apparatus according to Embodiment 14 of the present invention.

Figure 36:
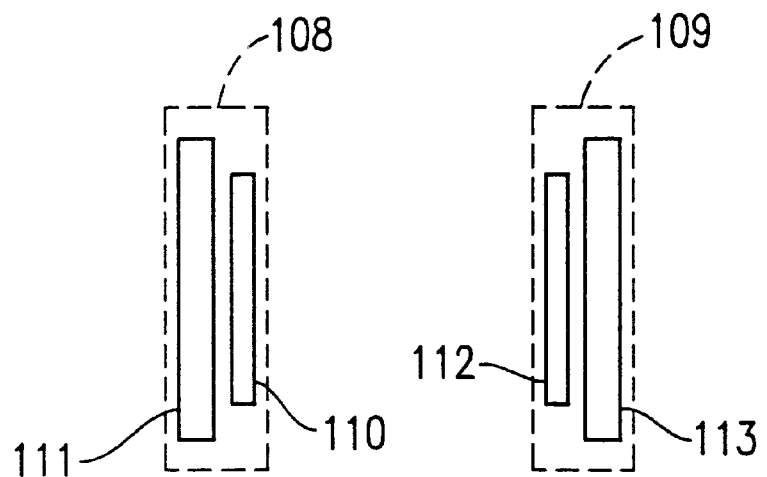

FIG. 36 is a diagram illustrating a structure of a hologram unit included in the optical display apparatus of FIG. 35.

Figure 37:
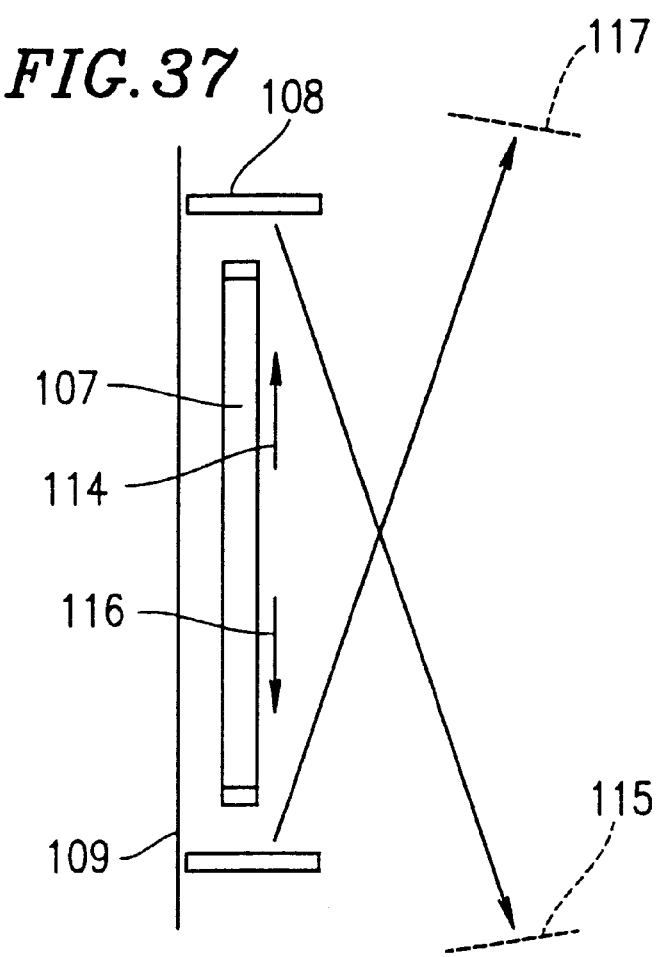

FIG. 37 is a diagram illustrating a principle of operation of the optical display apparatus of FIG. 35.

Figure 38:
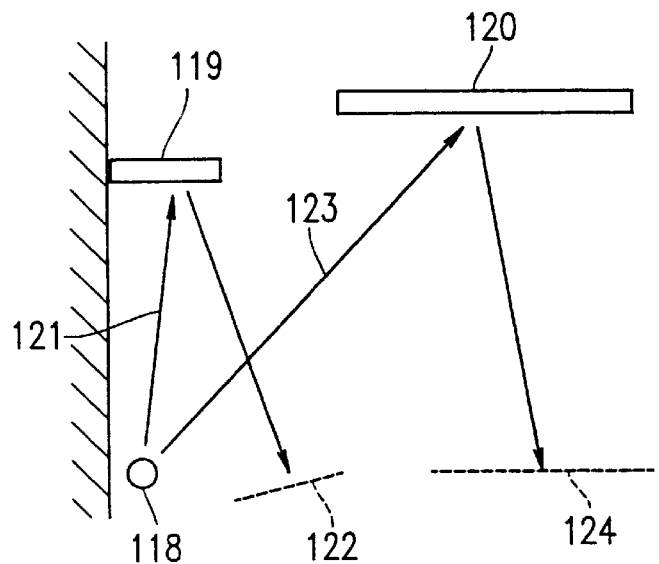

FIG. 38 is a diagram illustrating a structure of an optical display apparatus according to Embodiment 15 of the present invention.

Figure 39A:
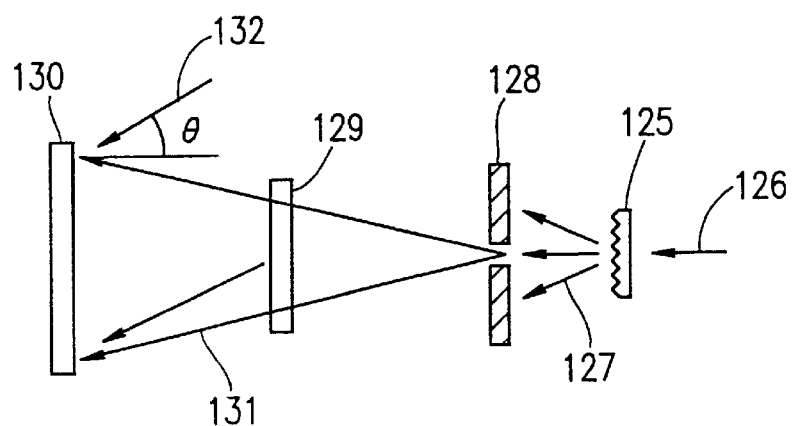
Figure 39B:
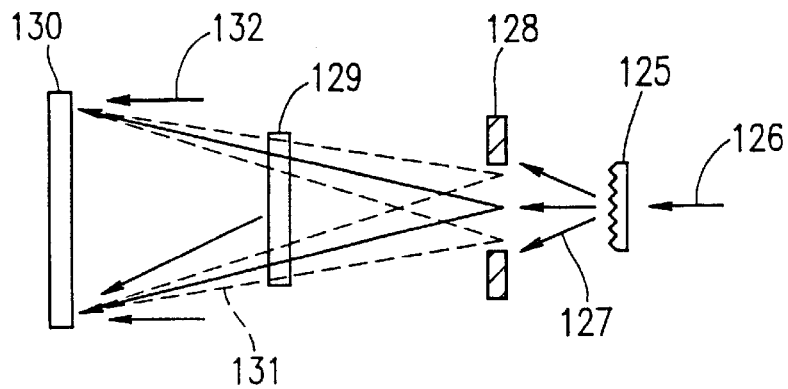

FIGS. 39A and 39B are a side view and a plan view, respectively, of an optical system for producing a transmission-type hologram according to Embodiment 16 of the present invention.

Figure 40:
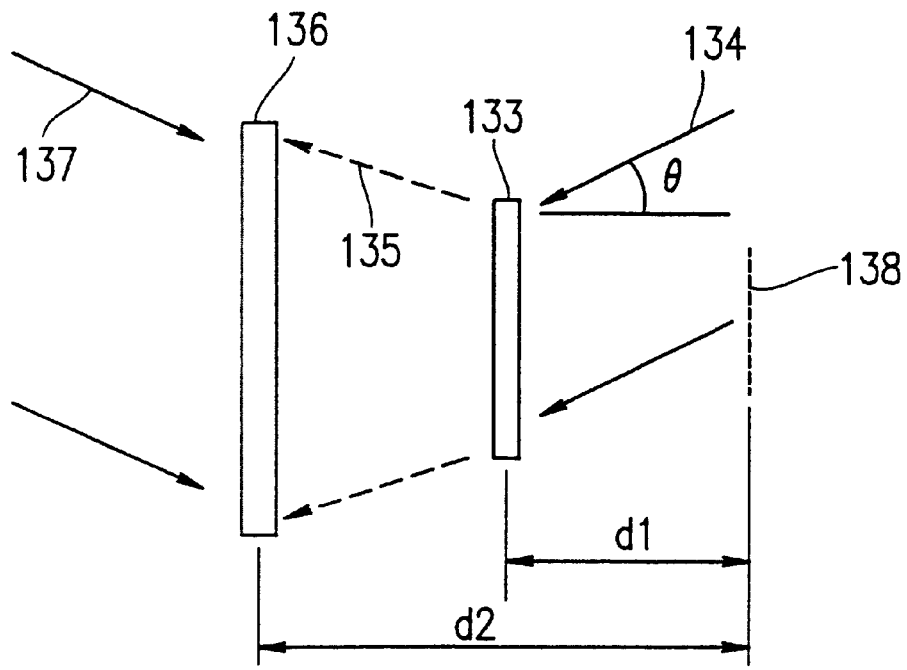

FIG. 40 is a side view of an optical system for producing a reflection-type hologram according to Embodiment 16 of the present invention.

Figure 41:
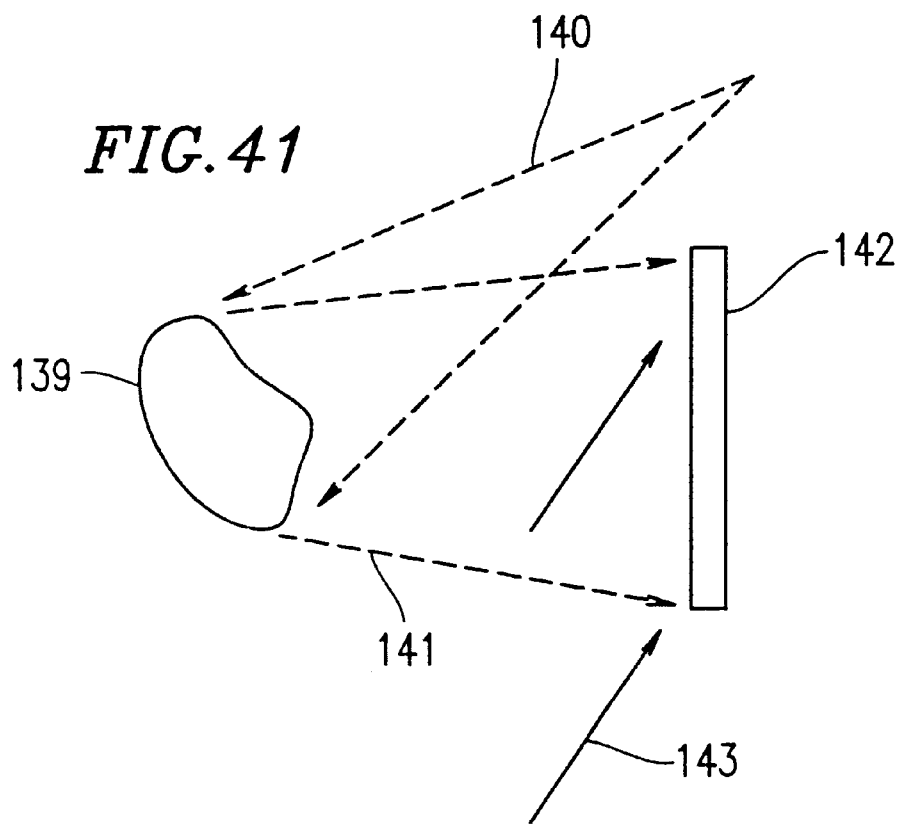

FIG. 41 is a side view of an optical system for producing a transmission-type hologram according to Embodiment 17 of the present invention.

Figure 42:
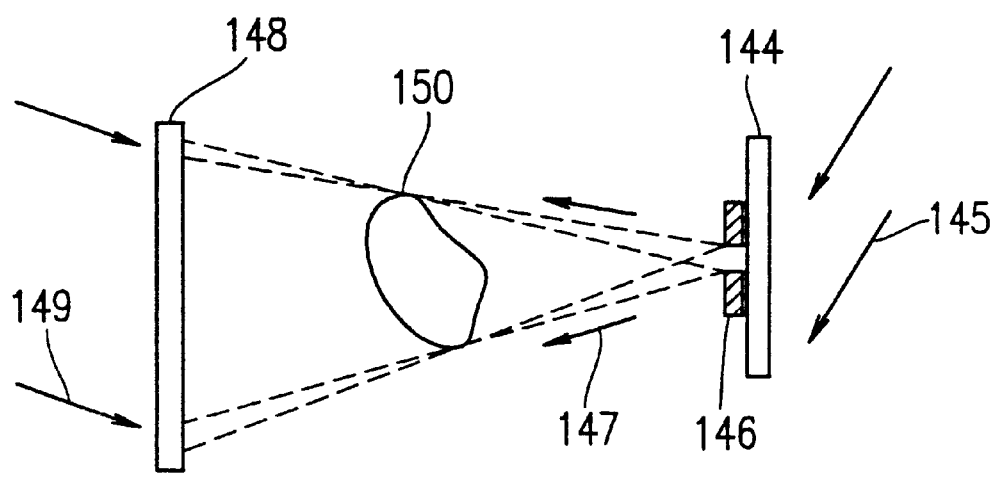

FIG. 42 is a side view of an optical system for producing a reflection-type hologram according to Embodiment 17 of the present invention.

Figure 43:
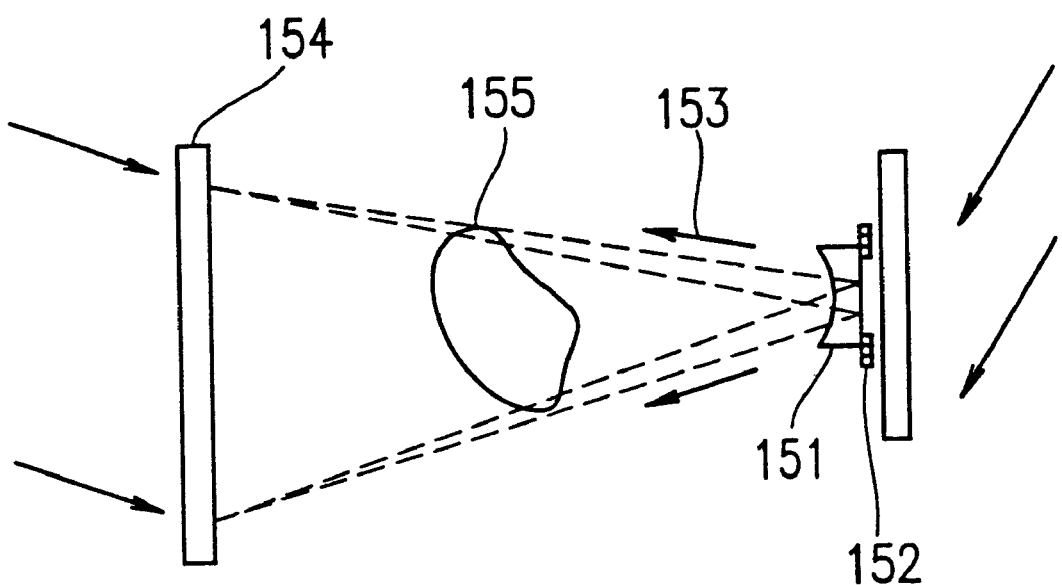

FIG. 43 is a side view of an optical system for producing a reflection-type hologram according to Embodiment 18 of the present invention.

Figure 44:
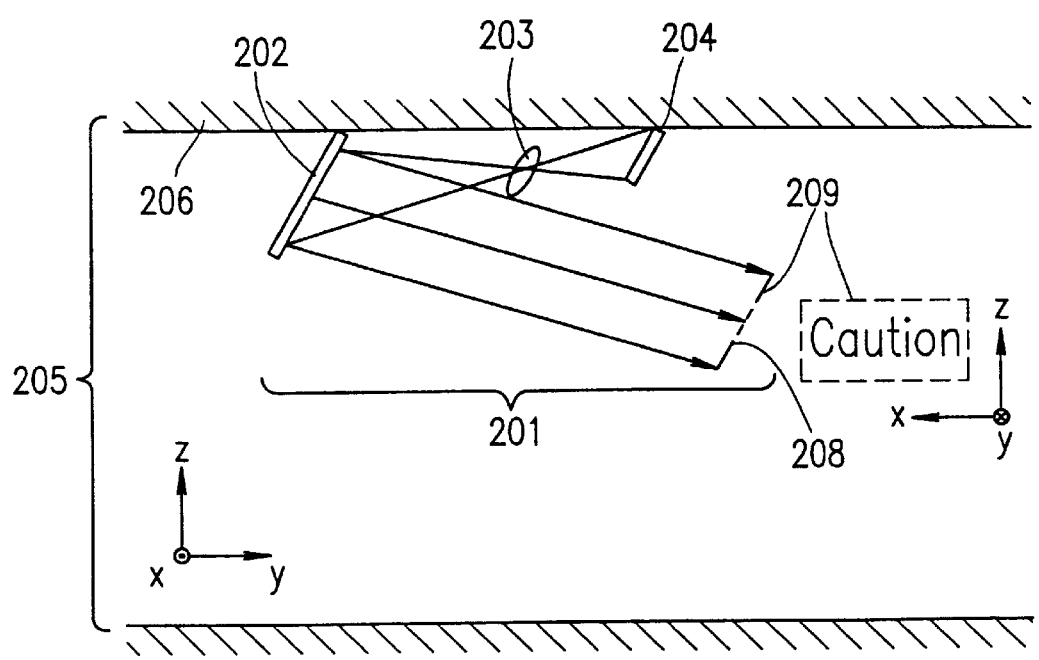

FIG. 44 is a side view of an optical display apparatus according to Embodiment 19 of the present invention.

FIG. 45 is a diagram schematically illustrating an image projected on a hologram screen in the optical display apparatus of FIG. 44.

Figure 46A:
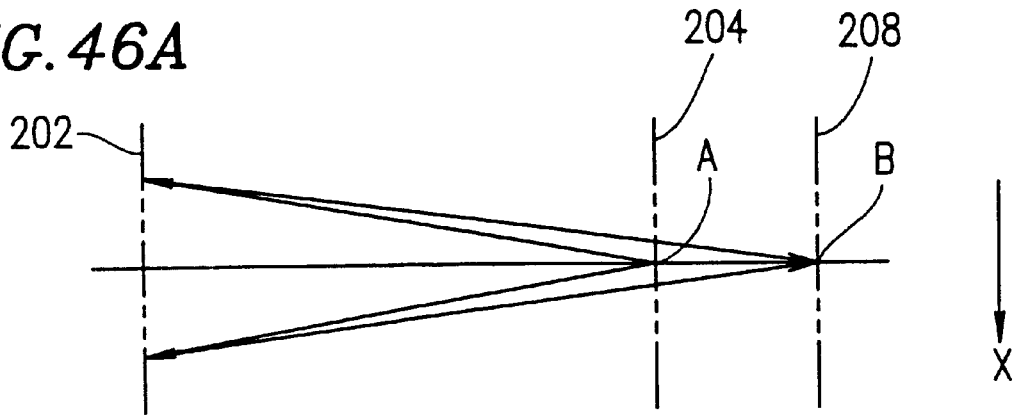
Figure 46B:
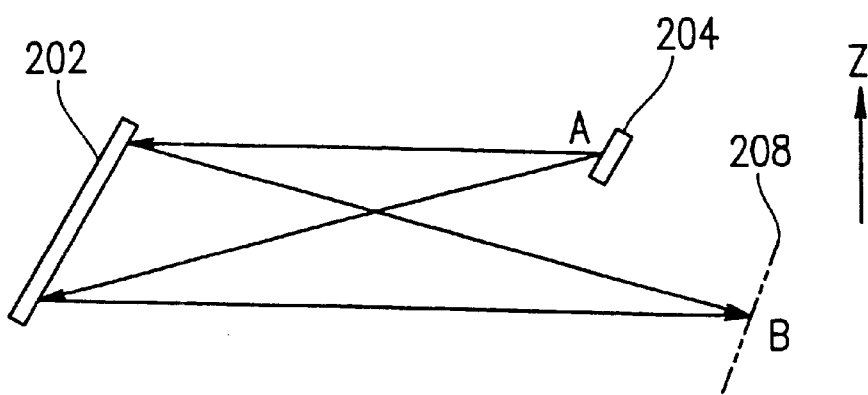

FIGS. 46A and 46B are a plan view and a side view, respectively, schematically illustrating a functional principle of the hologram screen in the optical display apparatus of FIG. 44.

Figure 47:
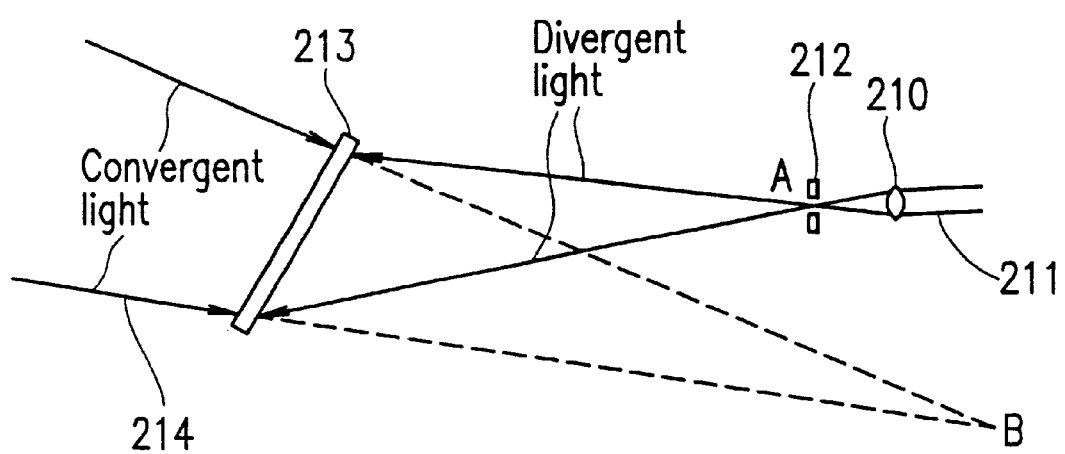

FIG. 47 is a diagram schematically illustrating an optical system producing a hologram screen in the optical display apparatus of FIG. 44.

Figure 48A:
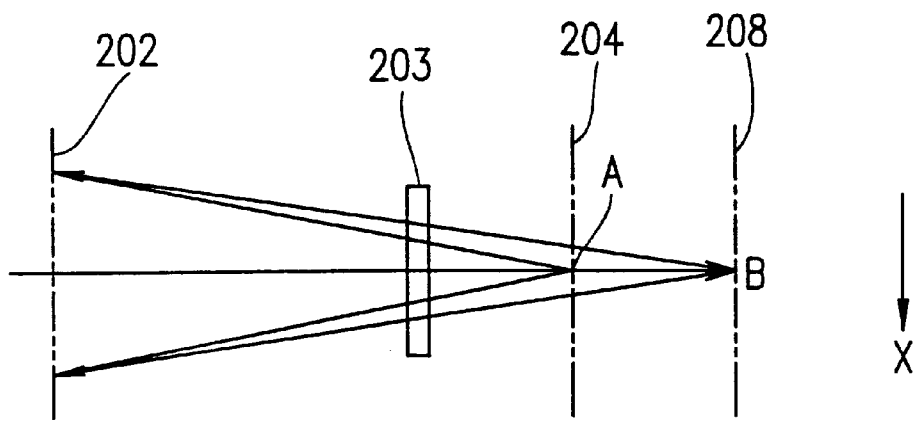
Figure 48B:
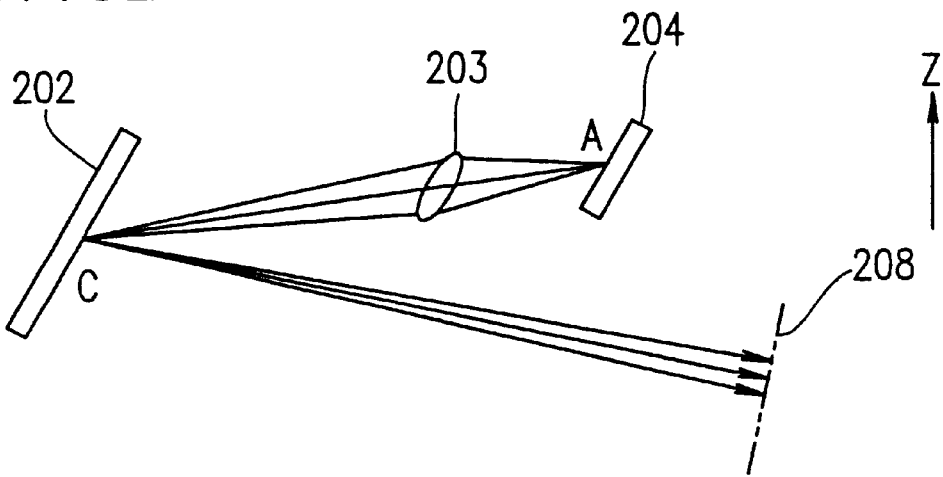

FIGS. 48A and 48B are a plan view and a side view, respectively, schematically illustrating how a light beam travels in the optical display apparatus of FIG. 44.

Figure 49A:
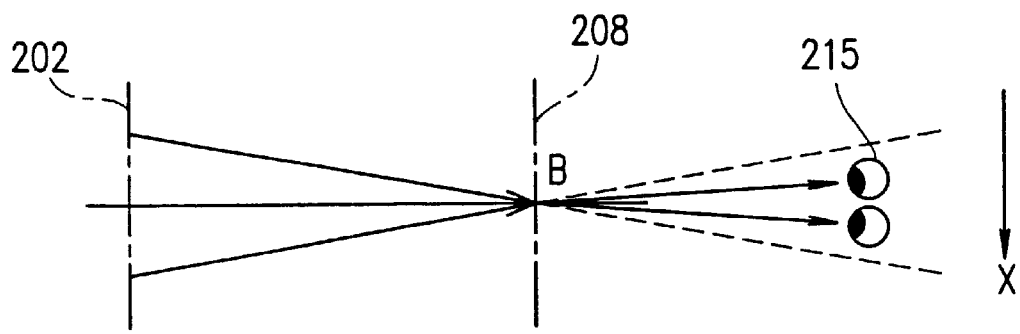
Figure 49B:
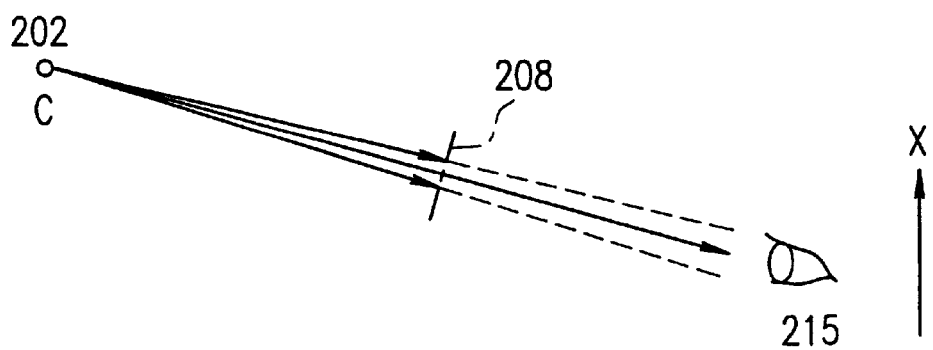

FIGS. 49A and 49B are plan view and a side view, respectively, schematically illustrating how a light beam travels from the hologram screen to the viewer in the optical display apparatus of FIG. 44.

Figure 50:
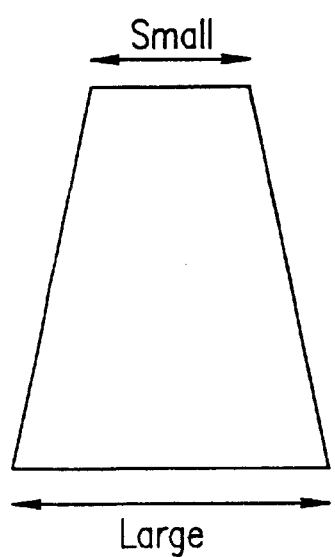

FIG. 50 is a diagram schematically illustrating distortion of a photographed image obtained by shooting a tall building with a normal camera.

Each of

FIGS. 51A to 51D is a diagram schematically illustrating a procedure of a front rising photographic technique.

Figure 52:
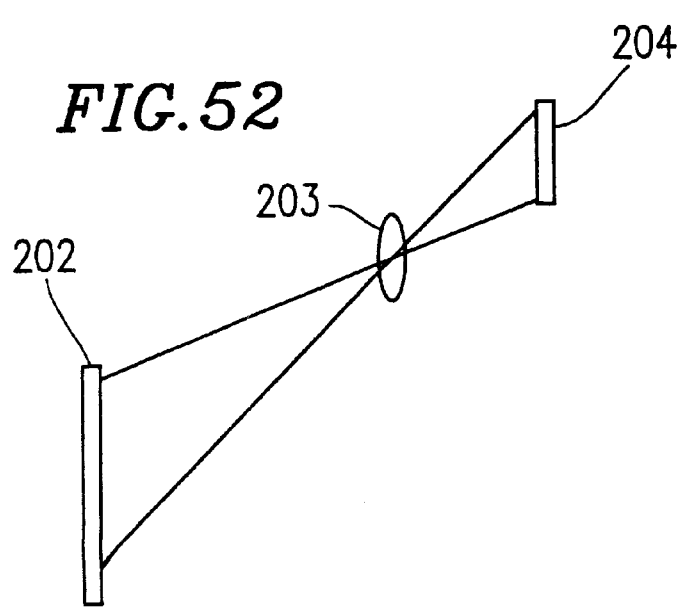

FIG. 52 is a diagram schematically illustrating that the arrangement of the optical display apparatus of FIG. 44 satisfies the condition of the front rising photographic technique.

Figure 53:
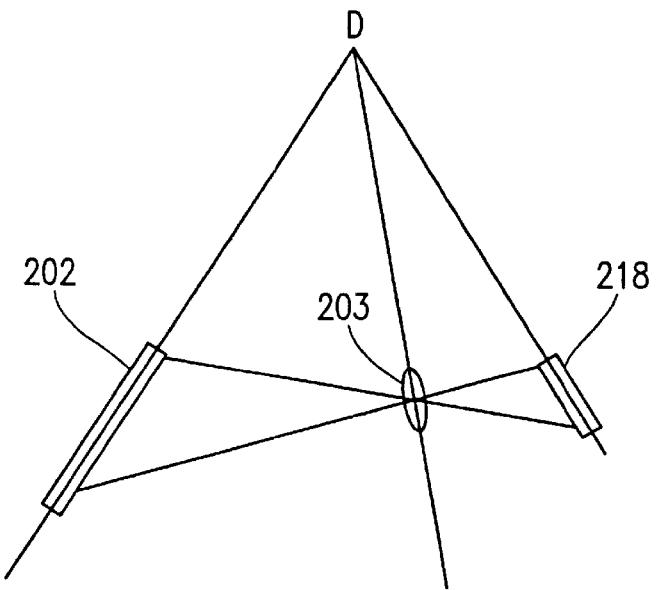

FIG. 53 is a diagram illustrating an arrangement based on a Scheimpflug condition, which is a photographic technique.

Figure 54A:
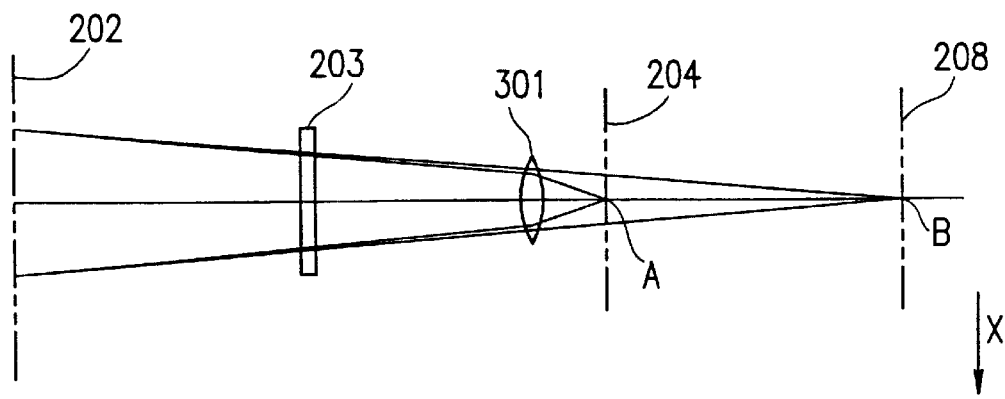
Figure 54B:
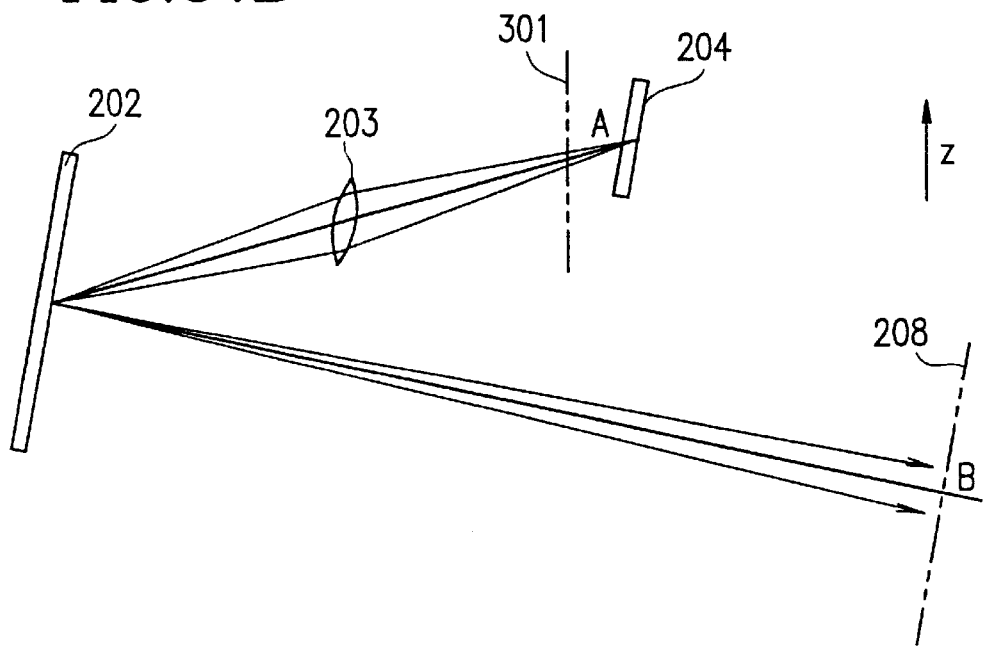

FIGS. 54A and 54B are a plan view and a side view, respectively, schematically illustrating how a light beam travels in an optical display apparatus using a varifocal lens.

Figure 55:
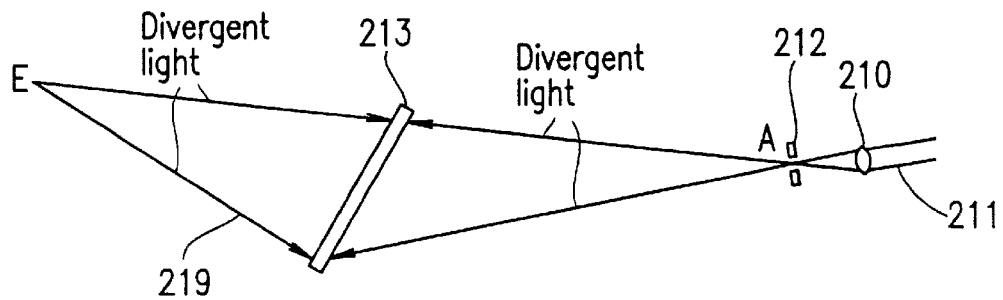

FIG. 55 is a diagram schematically illustrating an optical system for producing a hologram screen in an optical display apparatus by which an image is formed on the other side of the hologram screen.

Figure 56:
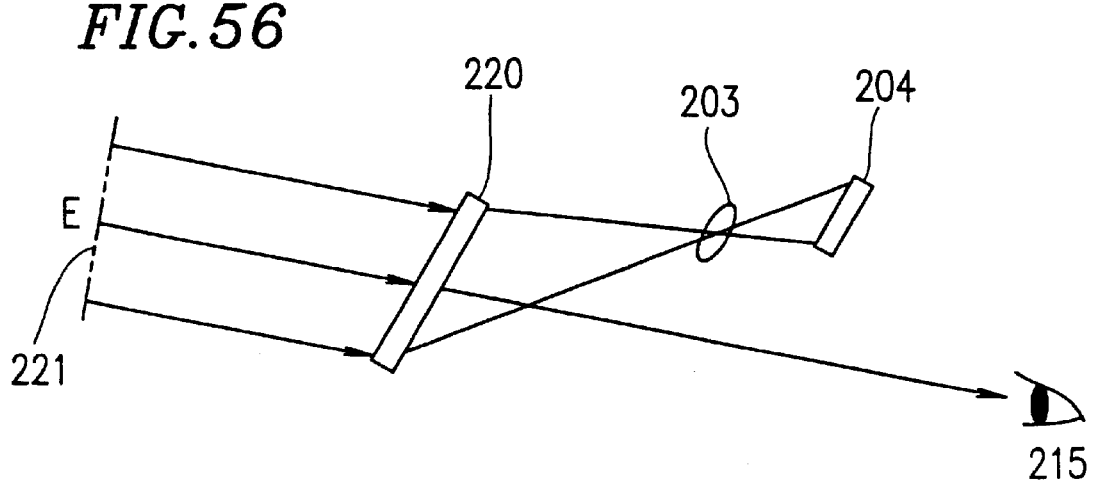

FIG. 56 is a diagram schematically illustrating a structure of an optic display apparatus by which an image is formed on the other side of the hologram screen.

Figure 57:
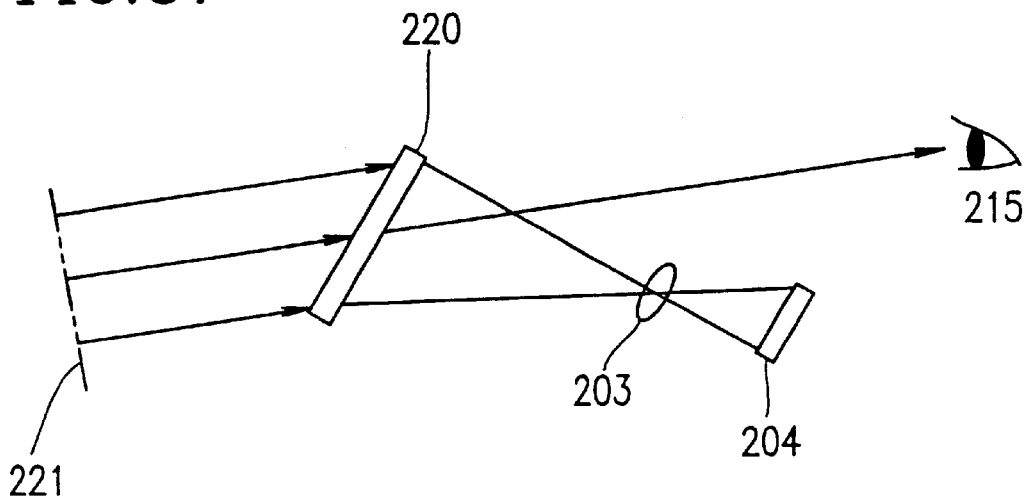

FIG. 57 is a diagram schematically illustrating a structure obtained when applying the optical display apparatus of FIG. 56 to a head-up display.

Figure 58:
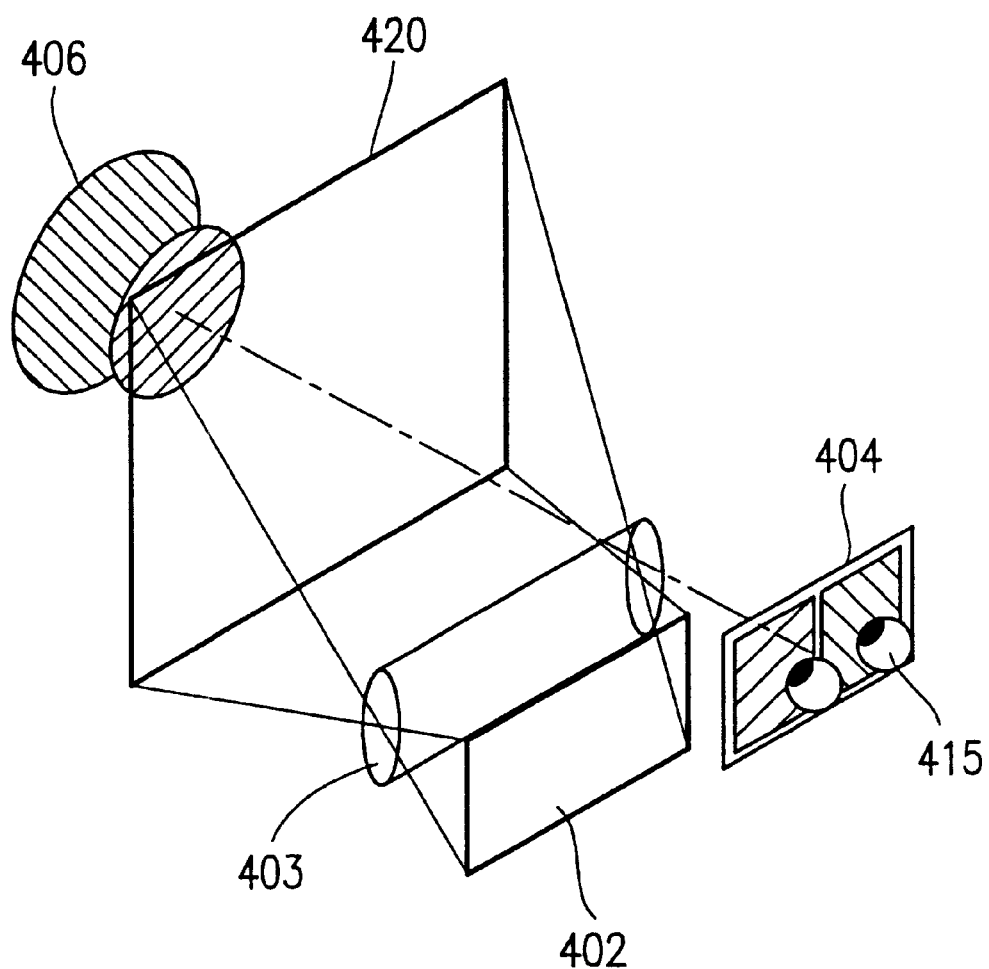

FIG. 58 is a diagram schematically illustrating a structure of a three dimensional display apparatus according to Embodiment 20 of the present invention.

Figure 59A:
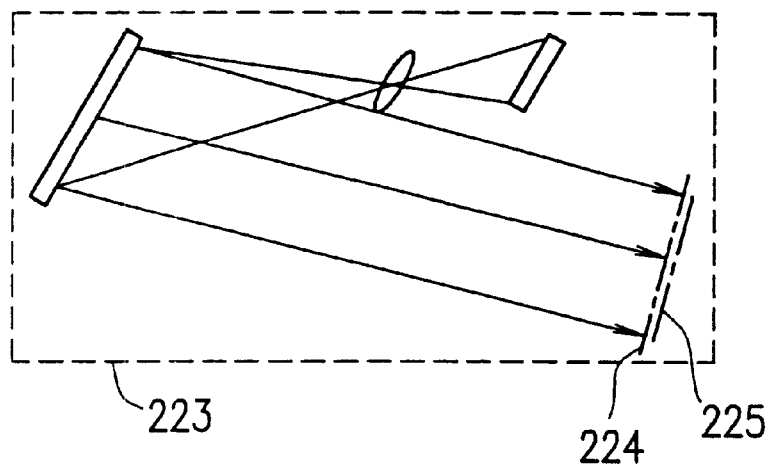
Figure 59B:
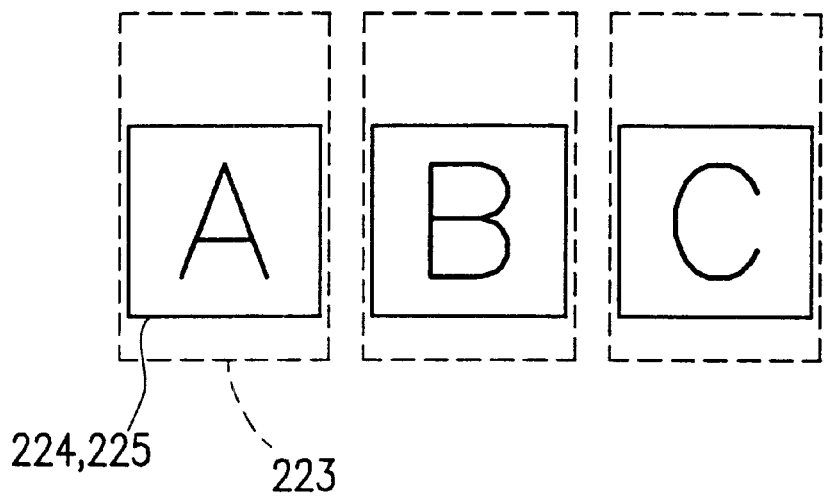

FIGS. 59A and 59B are a side view and a front view, respectively, of an exemplary optical display apparatus in which three display unit are arranged side by side for displaying a single large pattern.

Figure 60:
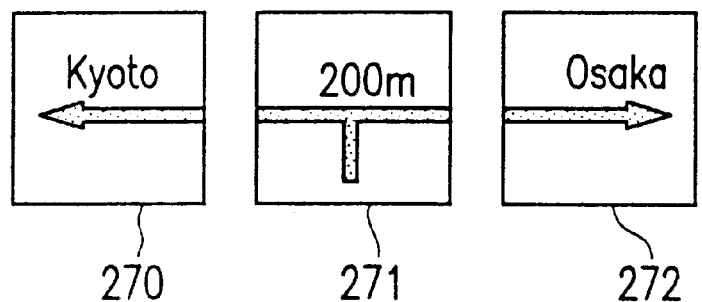

FIG. 60 is a front view of another exemplary optical display apparatus in which three display units are arranged side by side for displaying a single large pattern.

Figure 61:
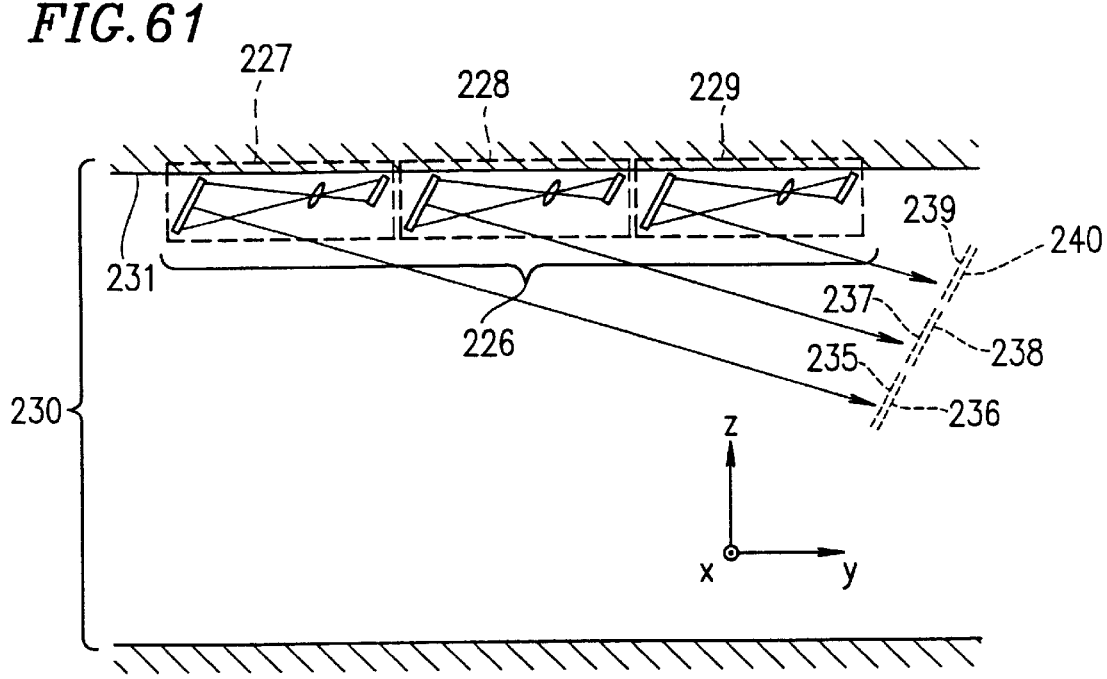

FIG. 61 is a side view illustrating a structure of an optical display apparatus in which a plurality of display units are arranged in a depth direction of an image for displaying a single large pattern.

Each of

Figure 62A:
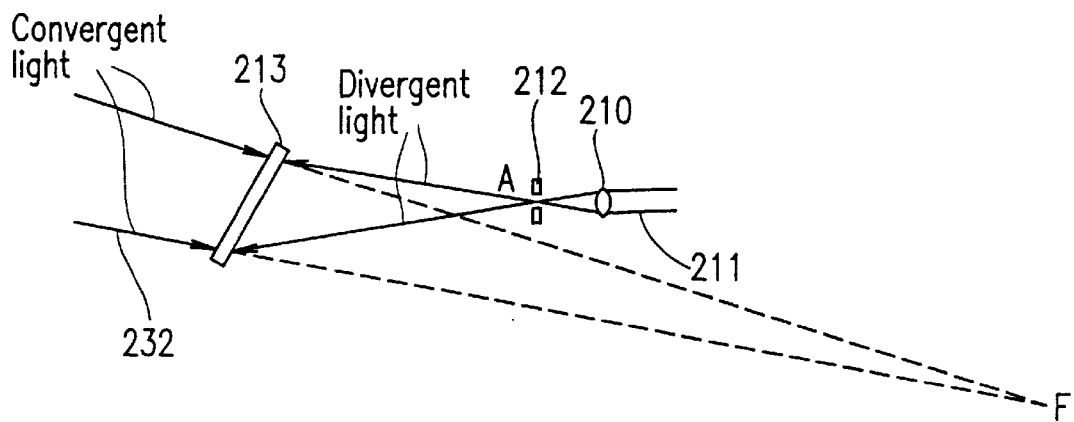
Figure 62B:
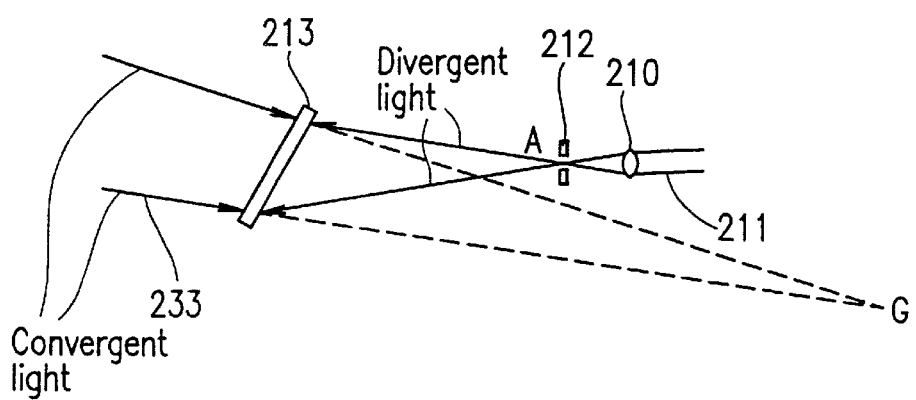
Figure 62C:
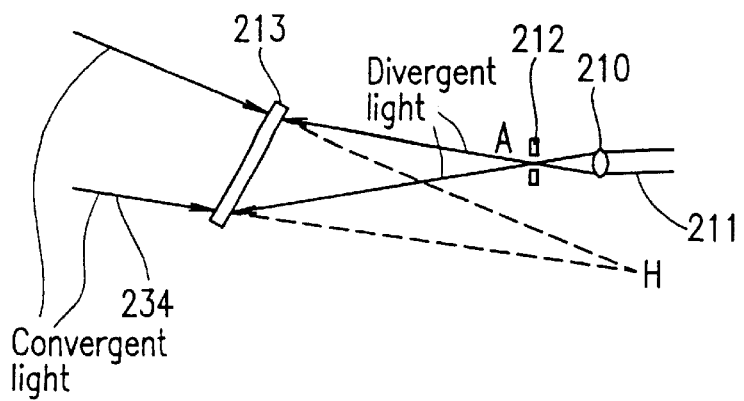

FIGS. 62A to 62C is a diagram illustrating an optical system for producing a hologram screen of each display unit included in the optical display apparatus of FIG. 61.

FIG. 63A is a diagram illustrating a pattern to be displayed by the optical display apparatus of FIG. 61.

FIG. 63B is a diagram illustrating elementary patterns which are recorded on the respective display units in the optical display apparatus of FIG. 61.

Figure 63C:
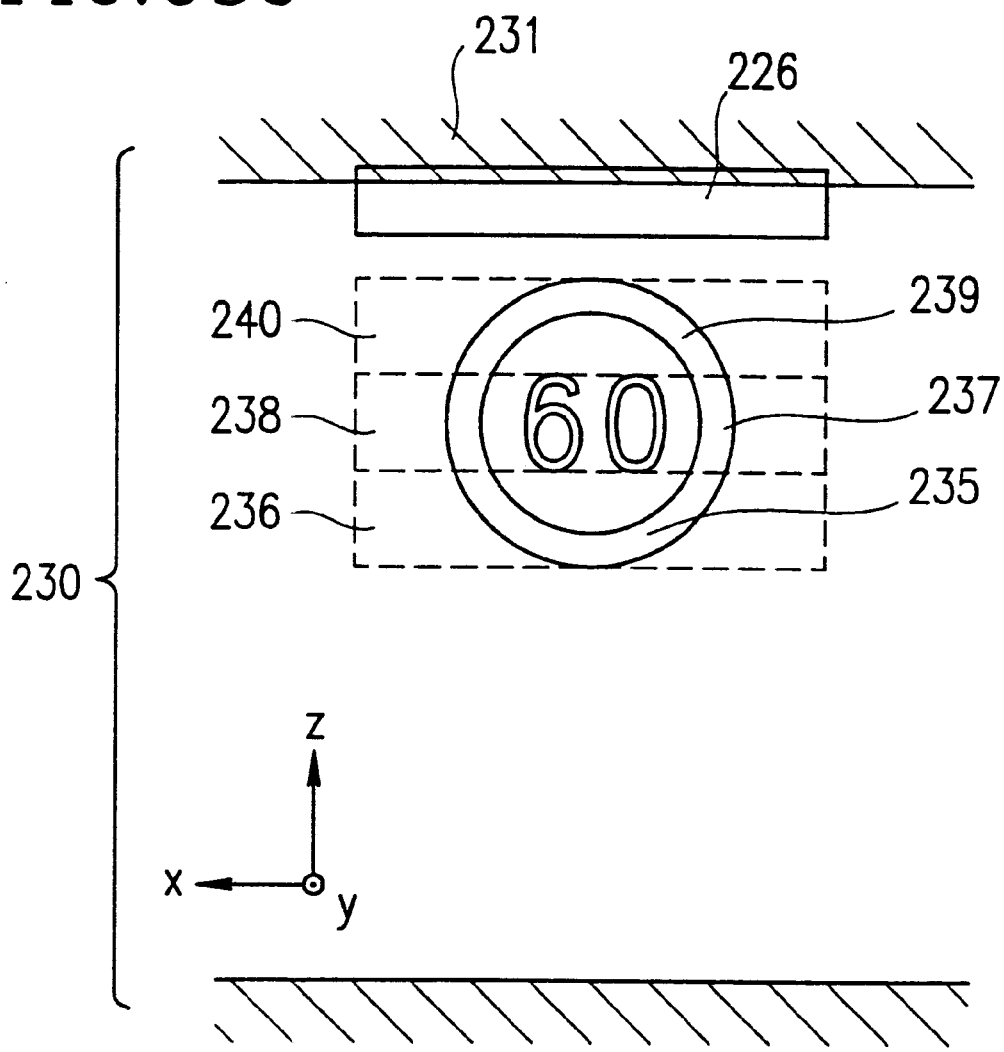

FIG. 63C is a diagram illustrating a reconstructed image displayed by the optical display apparatus illustrated in FIG. 61.

BEST MODE FOR CARRYING OUT THE INVENTION

Before describing specific embodiments of the present invention, the principle of a hologram proposed by the present inventors for realizing an optical display apparatus of the present invention will be described.

Figure 1A:
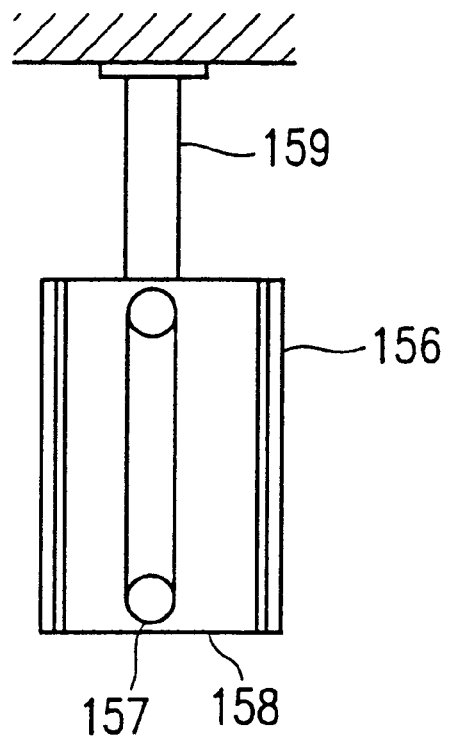
FIGS. 1A and 1B are a side view and a front view, respectively, illustrating a structure of a conventional optical traffic sign.
Figure 1B:
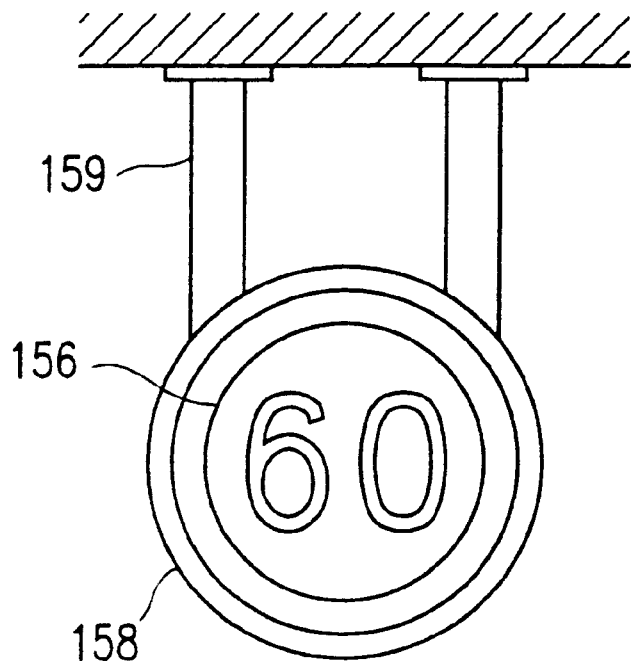
Figure 2A:
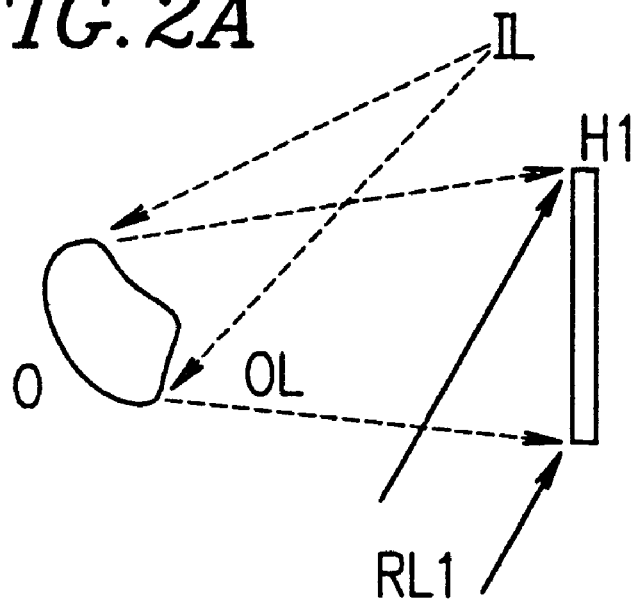
FIG. 2A is a diagram schematically illustrating a principle of producing a commonly-employed conventional hologram.
Figure 2B:
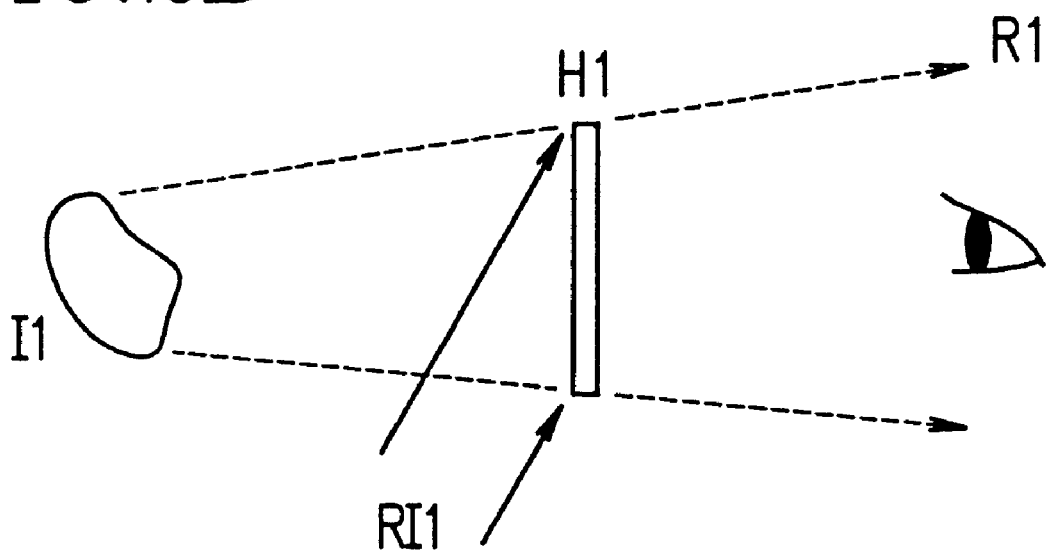
FIG. 2B is a diagram schematically illustrating a principle of reconstructing the hologram formed as illustrated in FIG. 2A.

To produce a hologram according to the present invention, the hologram plate H1 is first produced by the conventional method as illustrated in FIG. 2A, which is then irradiated with reconstruction illumination light (laser light) RI41, as illustrated in FIG. 2B, in a direction opposite to that of the reconstruction illumination light RI1 illustrated in FIG. 2B and through a slit having a width of Δ, as illustrated in FIG. 5A. Thus, reconstruction light R41, directed from the hologram plate H1 to the position where the object was located, is reconstructed, thereby reconstructing a real image (reconstructed image) I41 of the object at a position where the object was located. Then, a hologram dry plate H4 is placed at a position spaced apart from the reconstructed image I41 of the object by a distance Z0, as illustrated in FIG. 5B, and reference light RL4 is directed to be incident upon the hologram dry plate H4 from an inclined direction opposite from the hologram plate H1. The reference light RL4 is formed by splitting light emitted from the same laser light source as the reconstruction illumination light RI41 by means of a beam splitter, or the like. Thus, interference fringes between the reconstruction illumination light RI41 and the reference light RL4 are recorded on the hologram dry plate H4. The hologram dry plate H4 on which such interference fringes (having information of the object) are recorded as a reflection-type hologram will hereinafter be referred to also as the "reflection-type hologram plate H4".

FIG. 5C is a diagram schematically illustrating a principle of reconstructing the rainbow hologram plate H4 formed as described above.

In particular, the hologram plate H4 is irradiated with reconstruction illumination light (white light) RI42 which propagates in a direction diametrically opposite to that of the reference light RL4 illustrated in FIG. 5B. Thus, reconstruction light R42 having information of the object recorded on the hologram plate H4 is reconstructed and directed toward the position where the slit was located during the hologram production, so as to form a reconstructed image I42 at a position where the object was originally located.

With a hologram of the present invention formed as described above, the reconstructed image I42 to be observed is clearer as compared to that observed by the conventional reflection-type hologram, without the problem of a substantial change in the color of the reconstructed image depending upon the observation position as in the conventional rainbow hologram. The reason for this will be described below.

The reconstruction illumination light directed toward the hologram of the present invention is white light. Therefore, wave lengths other than a wavelength $\lambda 0$ of the laser light used to produce the hologram are also contained in the reconstruction illumination light. However, a reflection-type has a high wavelength selectivity, as shown in a graph of FIG. 6B illustrating the wavelength dependency of the diffraction efficiency, whereby substantially none of light having a wavelength far away from the wavelength (center wavelength) $\lambda 0$ of the laser light used to produce the hologram is diffracted. Therefore, basically, only light having a wavelength close to the center wavelength $\lambda 0$ is diffracted to be the reconstruction light R42, thereby reconstructing the image I42 from such light. In practice, other reconstructed images are concurrently formed from light having a wavelength which is close to, but different from, the center wavelength $\lambda 0$, as represented by $\lambda 1$ and $\lambda 2$ in FIGS. 6A and 6B. However, since the present invention uses a slit when producing a hologram, the reconstructed images formed by the different wavelengths of light are formed at respectively different positions (i.e., spatially separated from one another). For example, reconstructed images formed by light having wavelengths which are different from the center wavelength $\lambda 0$, as represented by $\lambda 1$ and $\lambda 2$ in FIGS. 6A and 6B, are formed concurrently at positions different from that of the reconstructed image formed by light having the center wavelength $\lambda 0$, but are not spatially superimposed on the intended reconstructed image formed by the light having the center wavelength $\lambda 0$. Therefore, with the hologram of the present invention, although the color of the reconstructed image I42 slightly changes as the observation position changes, the reconstructed image I42 of each color is clearly observed.

The hologram of the present invention is of a reflection-type, and thus has a high wavelength selectivity in the diffraction efficiency, whereby light having a wavelength other than those closer to the center wavelength $\lambda 0$ is not diffracted. Therefore, where white light from a point light source spaced apart from the rainbow hologram plate H4 by a certain distance is used as the reconstruction illumination light, when the observation position changes substantially (i.e., when the observer moves substantially), the diffraction efficiency of the hologram for the wavelength which forms an image which can be observed from the observation position becomes zero, whereby no reconstructed image is observed. In other words, the viewing range for the reconstructed image I42 is extremely narrowed when the hologram of the present invention is reconstructed by collimated light RI42A from a point light source.

However, when the reconstruction illumination light RI42 to be incident upon the hologram plate H4 is not collimated light but is a group of light beams having respective incident angles, as illustrated in FIG. 7A, the reconstructed images I42 are reconstructed at spatially different positions by beams of reconstructed light R42 having most suitable wavelengths for the respective incident angles. Such an incident condition can be realized by using a linear light source LL rather than a point light source. In particular, when the linear light source LL such as a fluorescent lamp is used as the light source LL of the reconstruction illumination light RI42 for the hologram of the present invention, as illustrated in FIG. 7B, it is possible to intentionally provide a certain angle range to the incident angle of the reconstruction illumination light RI42 for the hologram plate H4, thereby widening the viewing range for the reconstructed image I42.

Then, when the observation position for the hologram of the present invention changes, the color of the reconstructed image I42 changes as in the case of the conventional rainbow hologram. However, the rate of such change in the color of the reconstructed image I42 is as small as several % with respect to the color change of a rainbow hologram. For example, where a hologram plate is formed with reference light of an incident angle of 45°, the wavelength changes on the order of 100 nm for a change in the observation position for a rainbow hologram such that the color of the reconstructed image changes from blue to red. On the contrary, for the hologram of the present invention, the wavelength of the reconstructed image I42 changes by about 6 nm for a similar change in the observation position, whereby substantially no color change is recognized.

When the structure of the hologram of the present invention as described above is applied to a conventional rainbow hologram, reconstructed images of seven colors overlap one another, thereby whitening the overall image. This is because the conventional rainbow hologram is a transmission-type hologram, whereas the hologram of the present invention is of a reflection type and thus has a high wavelength dependency of the diffraction efficiency.

Thus, the principle of forming a hologram of the present invention takes advantage of the characteristic of a reflection-type hologram of "a high wavelength dependency of the diffraction efficiency and thus a narrow viewing range for the reconstructed image", which was considered as a disadvantage of the conventional reflection-type hologram, and forms a hologram plate by recording, as a reflection-type hologram, an image reconstructed by laser light which has passed through a slit. When a reconstructed image is obtained by using a hologram plate formed as described above, it is possible to obtain characteristics which were not obtained by various conventional hologram forming principles, e.g.: the image is not substantially blurred even when the observation position is shifted; and the wavelength selectivity is high so that it is possible to obtain a color reconstructed image by superimposing reconstructed images on one another.

Hereinafter, various embodiments of optical display apparatuses according to the present invention which are provided by using the hologram method of the present invention which is based on the above-described principle.

(Embodiment 1)

FIG. 8 is a side view illustrating a structure of an optical display apparatus according to Embodiment 1 of the present invention, and FIG. 9 is a plan view of the optical display apparatus. In this embodiment, the optical display apparatus of the present invention is used as a traffic sign in a tunnel.

In FIG. 8, reference numeral 1 denotes an optical display apparatus of the present embodiment; 2 a hologram; 3 a fluorescent lamp as a linear light source; 4 fluorescent lamp fittings, and 5 a shield plate. The optical display apparatus 1 is provided on a ceiling plane 7 of a tunnel 6.

A portion of illumination light 8 emitted from the fluorescent lamp 3 is incident upon the hologram 2, and is diffracted by the hologram 2 so as to become reconstructed light 9, thus forming a reconstructed image 11 on a virtual display plane 10. Then, the reconstructed image 11 as viewed from the front side thereof is viewed from a car running through the tunnel 6 as if it were hung at a position downwardly spaced apart from the ceiling plane 7 of the tunnel 6. However, this is only a display (the reconstructed image 11) on the virtual display plane 10, and there is no object actually existing at the position. Therefore, there is no chance for a car collision.

The virtual display plane 10 is a plane or a curved surface which is virtually provided in a space. The reflected light from the surface of the hologram 2 can be deflected in a direction toward the road surface (reflected light in this direction is shown in FIG. 8) or in a direction toward the ceiling plane 7 (reflected light in this direction is not shown in FIG. 8), whereby the reflected light will not be directly incident upon the driver's eye. Rather, the reflected light is effectively used as illumination light for illuminating the road surface or the ceiling plane.

Moreover, a portion of the illumination light 8 from the fluorescent lamp 3 is shielded by the shield plate 5, whereby it will not be directly incident upon the driver's eye. Other portions of the illumination light 8 directed directly toward the road surface or the ceiling plane can also be effectively used as illumination light for illuminating the road surface or the ceiling plane.

The light source section including the fluorescent lamp 3 and the fluorescent lamp fittings 4 may be provided by using common lamp fittings as those used in houses or offices, but it is preferred to make it waterproof so that water does not get into it during a tunnel clean-up. For example, the light source section can be provided by embedding the fluorescent lamp 3 and the fluorescent lamp fittings 4 into the ceiling plane 7 of the tunnel 6, and covering them with a transparent cover.

Next, a principle by which the hologram 2 forms the reconstructed image 11 on the virtual display plane 10 will be described in association with a method for producing the same.

First, a method for producing the hologram 2 will be briefly described with reference to FIG. 10.

FIG. 10 is a perspective view illustrating an optical system for producing the hologram 2, wherein reference numeral 12 denotes a slit, 13 a pattern mask for a traffic sign indicating a speed limit, 14 object light, 15 an incident plane, 16 reference light, and 17 a hologram dry plate. Although the optical system illustrated in FIG. 10 is arranged in a horizontal arrangement where it is laid horizontally at 90° since the production optical system is normally arranged on an optical table, a vertical arrangement is illustrated herein according to the arrangement used during an operation of the optical display apparatus. Moreover, in practice, a pattern mask having a plurality of different patterns is used corresponding to the three primary colors, and the hologram is produced by appropriately switching the wavelength of the laser for exposure and the arrangement of the optical system. However, for the sake of simplicity, an arrangement having the single pattern mask 13 will be described herein.

A method for producing the hologram 2 is as follows.

First, argon laser light having a wavelength of 514.5 nm, which has been transmitted through a ground glass to be diffused light, is directed to be incident upon the slit 12. Information of the pattern mask 13 is read by the light having passed through the slit 12, so as to form the object light 14. This arrangement is intended to show the reconstructed image as if it is floating, and the pattern mask 13 is placed to be front-sided as viewed from the slit 12 side. The slit to be used has a width of about 1.5 mm, and a length of about 40 mm, for example.

The substantially collimated reference light 16 emitted from the argon laser is directed to be incident upon incident plane 15 which is uniquely defined as a plane vertical to the longitudinal direction of the slit 12. Herein, the reference light 16 is directed to be incident at an angle of 15° from the reverse side of the hologram dry plate 17 to form a reflection hologram. Although it is not necessarily required that the reference light 16 is incident upon the incident plane 15, an arrangement where the reference light 16 is incident upon the incident plane 15 is depicted herein as a more preferred embodiment.

Thus, the object light 14 and the reference light 16 form interference fringes, and the interference fringes are recorded on the hologram dry plate 17. A silver salt, a dichromate gelatin, a photopolymerizable photopolymer, or the like, is typically used as a material of the hologram dry plate 17. For example, a dry-film type photopolymerizable photopolymer having a thickness of about 20 $\mu$m is attached to a glass substrate so as to provide the hologram dry plate 17.

Next, the method for producing the hologram 2 will be described in greater detail.

FIGS. 11A and 11B are a side view and a plan view, respectively, of the optical system for producing a hologram illustrated in FIG. 10. Reference numeral 18 denotes a ground glass, 19 laser light, and 20 diffused light.

As illustrated in FIG. 11A, the laser light 19 is incident upon the ground glass 18 so as to be the diffused light 20 and then incident upon the slit 12. The slit 12 has a narrow width as viewed from a side thereof, and transmits only a portion of the diffused light 20. Therefore, light having passed through the slit 12 as viewed form the side appears as spread light coming from a single point. This light reads the information of the pattern mask 13, and irradiates the hologram dry plate 17 as the object light 14. This can be considered as projection of the pattern mask 13 onto the hologram dry plate 17. The object light 14 including the information of the object forms interference fringes with the reference light 16 incident upon the reverse side of the hologram dry plate 17, and the interference fringes are recorded on the hologram dry plate 17.

At this time, the "shadow" of the pattern mask 13 projected onto the hologram dry plate 17 has been enlarged. In view of the rate of projection magnification, the pattern mask 13 is produced while being shrunk in one direction. Although the rate of magnification varies depending upon the setting of the optical system, it normally is about 1.2 to about 2.

More specifically, assuming the original height of the pattern mask 13 to be Hm, and the height of the image actually viewed from the observation position OP to be Hi, the rate of magnification is expressed as follows based on the geometric relationship shown in FIG. 12:

$$Hi=Hm(1-z0/L')/(1-z0/L).$$

Herein, z0 denotes the distance from the hologram dry plate 17 to the image (the pattern mask 13), L denotes the distance from the hologram dry plate 17 to the slit 12 during the hologram production, and L' denotes the distance from the hologram dry plate 17 to the observation position OP. As can be seen from this, the rate of magnification is 1 when L=L'; i.e., there is no enlargement/shrinkage effect when the image is observed from the position where the slit 12 was located. On the other hand, an enlargement/shrinkage effect is provided when the distance L' changes, i.e., when the image is observed from a wide area away from the position where the slit 12 was located.

This relationship is illustrated in FIG. 13 as the relationship between the normalized observation distance (L'/L) and the normalized image height (Hi/Hm), using L/z0 as a parameter. This shows that the value L/z0 may be increased in order to reduce the change in the rate of magnification experienced when the image is viewed from a wide area. The rate of magnification can be suppressed to be 1.1 or less (i.e., a change in shape of 10% or less) even when the image is viewed from a wide area, preferably by setting L/z0 to be 10 or more.

More preferably, if the value L/z0 is selected to be substantially infinite, the change in the rate of magnification would be substantially eliminated. Back to the definition, selecting the value L/z0 to be substantially infinite means that, excluding the case where z0=0, the line extending from the slit 12 to the hologram dry plate 17 has no gradient. Therefore, the slit 12 and the ground glass 18 may be replaced with a one-dimensional diffuser 1001 which has a light diffusing effect only in the width direction of the hologram dry plate 17 with no light diffusing effect in the height direction of the hologram dry plate 17, as illustrated in FIG. 14. There are a number of examples for such a diffuser 1001, including those using a diffraction grating, or those which are holographically produced, or a lenticular lens sheet having an array of cylindrical lenses may alternatively be used.

Now, the method for producing a hologram using the slit 12 and the ground glass 18 will be further described.

As illustrated in the plan view of FIG. 11B, the slit 12 has a large width as viewed from the above, and transmits the diffused light 20 coming from the ground glass 18 over a wide range. In FIG. 11B, diffused light having passed through the central portion of the slit 12 is indicated by a solid line, while diffused light having passed through an end portion of the slit 12 is indicated by a broken line. Information of the pattern mask 13 obtained when viewed from the front side thereof is projected onto the hologram dry plate 17 by the diffused light indicated by the solid line, whereas information of the pattern mask 13 obtained when viewed from a slightly inclined direction through the end portion of the slit 12 is projected onto the hologram dry plate 17 by the diffused light indicated by the broken line. The object light 14 including such information forms interference fringes with the reference light 16 incident upon the reverse side of the hologram dry plate 17, and the interference fringes are recorded on the hologram dry plate 17. This is the principle of how reconstructed images of the pattern mask 13 as viewed from different angles are formed on the respective eyes of the observer when the hologram is reconstructed.

Although side views and plan views have been separately described in the above for simplicity, it is understood that the interference fringes are simultaneously recorded in an actual hologram producing process.

Now, a principle of reconstructing the hologram of the present invention will be described.

The illumination light used to reconstruct a hologram is typically conjugate light of reference light. Since in the process of producing a hologram of the present invention, the reference light is collimated light as described above, the illumination light may also be collimated light. However, although collimated light can be easily provided when producing a hologram because laser light is used, it is difficult to provide collimated light from a white light source such as a halogen lamp which is typically used for reconstructing a hologram. Practically, a light source with a small light-emitting section is selected, while limiting the aperture thereof, for reconstructing a hologram. Such a light source, which can be considered substantially as a point light source, is arranged sufficiently away from the hologram, so as to illuminate the hologram with diffused light which can be considered as substantially collimated light. The image of the hologram 2 of the present embodiment can generally be reconstructed by such a method.

FIGS. 15A and 15B are a side view and a plan view, respectively, illustrating a principle of reconstructing the hologram 2. Reference numeral 21 denotes a halogen lamp, 22 an opening, 23 illumination light, 24 reconstructed light, 25 an observer, and 26 a reconstructed image of the slit 12.

Light emitted from the halogen lamp 21 is limited by the opening 22, so as to form the illumination light 23 which can be considered as substantially collimated light. The reconstructed light 24 formed by diffracting the illumination light 23 with the hologram 2 forms the reconstructed image 11 on the virtual display plane 10, i.e., in the vicinity of the position where the pattern mask 13 was located when producing the hologram, whereby the observer 25 views the reconstructed image 11 as if it is floating apart from the hologram plane.

As a result of an observation, the viewing angle in the horizontal direction for which the reconstructed image 11 can be observed is about 8°, which means that the display provided by the optical display apparatus 1 of the present invention can be recognized from a car at a distance of 50 m to 100 m away from the display even if the car changes lanes (i.e., moves in the horizontal direction by about 6 m) on an actual road. However, the viewing angle in the vertical direction is as small as about 1°, which means that it may not be possible to ensure a sufficient zone or time for which the sign can be recognized from a car moving at a high speed.

Moreover, the reconstructed image 11 appears to be brightest when the observer is at the position where the reconstructed image 26 of the slit 12 is formed, i.e., the position where the slit 12 was located when producing the hologram, and the entire reconstructed image 11 can be seen when the observer is in the vicinity of such a position. However, only a portion of the image can be seen when the observer moves from the position toward the hologram 2 or away from the hologram 2.

The above observation result shows that although a reconstructed image can be obtained but it is extremely difficult to provide a practical traffic sign for tunnels by reconstructing it with a point light source.

Therefore, the present inventors continued to study the positional relationship between the light source and the hologram, and the interaction between the illumination light and the hologram, and conducted a more detailed observation of the reconstructed image, thereby discovering a unique practical advantage which is extremely important to solving the above-described problems and providing the optical display apparatus 1 of the present invention.

FIGS. 16A and 16B illustrate two characteristic shapes for the opening 22 used during the above-described observation of the reconstructed image.

As a result of the observation, while the reconstructed image of the hologram 2 was blurred when the width of the opening 22 was widened in the horizontal direction as illustrated in FIG. 16A, while the reconstructed image of the hologram 2 was not blurred when the length of the opening 22 was extended in the vertical direction as illustrated in FIG. 16B. Moreover, the viewing range in the vertical direction was increased as the length of the opening 22 was extended, with the color of the reconstructed image being unchanged within the viewing range. That is, the observer always observes an image of the same color which is not blurred within the viewing range. This is a significant advantage provided by providing the hologram 2 with a reflection-type hologram.

When the opening 22 which is elongated in the vertical direction is used, the entire reconstructed image can be observed even when the observer moves from the position where the reconstructed image 26 of the slit 12 is formed toward the hologram 2 or away from the hologram 2. That is, the observer sees the entire, unblurred image of the same color without any portion thereof being cut out even when the observer changes position with respect to the image in the depth direction.

Although the expression "the color does not change" is used herein, strictly speaking, the reconstructed wavelength changes. However, the change in wavelength can be suppressed to a level such that it cannot be perceived by a human eye, by appropriately selecting the parameters of the hologram.

The above-described observation result means that it is possible to solve all of the above-described problems and to provide a practical traffic sign for tunnels by employing a combination of the hologram 2 and the vertically-elongated opening 22 of the present invention.

The straight tube fluorescent lamp 3 is used as a light source in Embodiment 1 of the present invention, as illustrated in FIG. 8. Even when the image is reconstructed with the straight tube fluorescent lamp 3, an unblurred, bright reconstructed image with no change in color can be obtained. Moreover, an unblurred reconstructed image can always be recognized even when observing the hologram 2 as by viewing it from an upward or downward direction. As the fluorescent lamp 3 is brought slightly closer to the hologram 2 under a predetermined condition, the viewing angle in the vertical direction may reach ±5°, which implies that it is possible to ensure a sufficient zone and time for which the sign can be recognized from a car moving at a high speed. Moreover, the reconstructed image will not be cut off even when the distance from the hologram 2 changes, whereby the reconstructed image can be seen sufficiently before the optical display apparatus 1.

While the reference light 16 is directed to be incident upon the incident plane 15 in the process of producing the hologram, the present invention is not limited thereto. Moreover, while the fluorescent lamp is arranged on the incident plane 15 for reconstructing the image, the present invention is not limited thereto. According to the present invention, the incident direction of the reference light and the arrangement and direction of the linear light source each have some degree of tolerance.

Moreover, for the method of producing a hologram using the diffuser 1001, the incident plane can be defined as a plane perpendicular to the direction in which the diffused light is spread. While the reference light is directed to be incident upon the incident plane in the basic arrangement, the present invention is not limited thereto. Moreover, although the fluorescent lamp is arranged on the incident plane for reconstructing the image in the basic arrangement, the present invention is not limited thereto.

(Embodiment 2)

While the fluorescent lamp 3, which is a linear light source, is horizontally arranged in Embodiment 1, the installation condition of the fluorescent lamp 3 is not limited in terms of the orientation thereof as long as it is basically placed in a position on the incident plane 15 or in the vicinity of such a position.

FIG. 17A is a perspective view illustrating a reconstruction optical system of the optical display apparatus of the present invention, wherein the system may be arranged in either one of the horizontal and vertical arrangements illustrated, or at any intermediate angle therebetween. However, the viewing angle range in the vertical direction varies depending upon the installation direction.

FIGS. 17B and 17C are diagrams for comparing the viewing angle ranges obtained when a fluorescent tube of the same length is provided in the horizontal arrangement and the vertical arrangement.

In the case of the horizontal arrangement of FIG. 17B, illumination light 28 emitted from the right end of a fluorescent lamp 27 is diffracted by the hologram 2, thereby forming a reconstructed image 29, which is recognized by an observer 30. On the other hand, illumination light 31 emitted from the left end of the fluorescent lamp 27 is diffracted by the hologram 2, thereby forming a reconstructed image 32, which is recognized by an observer 33. The angle formed by the position of the observer 30 and that of the observer 33 with respect to the hologram 2 is the viewing angle range for the horizontal arrangement.

In the case of the vertical arrangement of FIG. 17C, illumination light 34 emitted from the lower end of the fluorescent lamp 27, which is indicated by a solid line, is diffracted by the hologram 2, thereby forming a reconstructed image 35, which is recognized by an observer 36. On the other hand, illumination light 37 emitted from the upper end of the fluorescent lamp 27 is diffracted by the hologram 2, thereby forming a reconstructed image 38, which is recognized by an observer 39. The angle formed by the position of the observer 36 and that of the observer 39 with respect to the hologram 2 is the viewing angle range for the vertical arrangement.

A comparison between the horizontal arrangement and the vertical arrangement shows that a larger viewing angle can be obtained with the vertical arrangement. From a different point of view, a shorter fluorescent lamp can be used when employing an arrangement close to the vertical arrangement. Strictly speaking, it is more preferred to arrange the fluorescent lamp to be perpendicular to the optical path for the reconstruction illumination light.

FIG. 18 is a side view illustrating a structure of an optical display apparatus according to Embodiment 2 of the present invention. Also in this embodiment, the optical display apparatus of the present invention is used as a traffic sign in a tunnel.

In FIG. 18, reference numeral 40 denotes the optical display apparatus of the present embodiment, 41 a fluorescent lamp, which is a linear light source, 42 fluorescent lamp fittings, and 43 a reflecting plate. The optical display apparatus 40 is provided on the ceiling plane 7 of the tunnel 6.

Direct light emitted from the fluorescent lamp 41 and indirect light which has been once reflected by the reflecting plate 43 are synthesized together, thereby forming illumination light 44. The effect of the reflecting plate 43 makes possible an even brighter display. A portion of the illumination light 44 which is incident upon the hologram 2 is diffracted by the hologram 2 to be reconstructed light 45, thereby forming the reconstructed image 11 on the virtual display plane 10. Then, the reconstructed image 11 as viewed from the front side thereof is viewed from a car running through the tunnel 6 as if it were a traffic sign indicating a speed limit hung at a position downwardly spaced apart from the ceiling plane 7 of the tunnel 6. However, this is only a display (the reconstructed image 11) on the virtual display plane 10, and there is no object actually existing at the position. Therefore, there is no chance for a car collision.

The virtual display plane 10 is a plane or a curved surface which is virtually provided in a space. The reflected light from the surface of the hologram 2 can be deflected in a direction toward the road surface (reflected light in this direction is shown in FIG. 18) or in a direction toward the ceiling plane 7 (reflected light in this direction is not shown in FIG. 18), whereby the reflected light will not be directly incident upon the driver's eye. Rather, the reflected light is effectively used as illumination light for illuminating the road surface or the ceiling plane.

Moreover, a portion of the illumination light 44 from the fluorescent lamp 41 is shielded by the fluorescent lamp fittings 42 and/or the reflecting plate 43, whereby it will not be directly incident upon the driver's eye. Other portions of the illumination light 44 directed directly toward the road surface or the ceiling plane can also be effectively used as illumination light for illuminating the road surface or the ceiling plane.

The light source section including the fluorescent lamp 41 and the fluorescent lamp fittings 42 may be provided by using common lamp fittings as those used in houses or offices, but it is preferred to make it waterproof so that water does not get into it during a tunnel clean-up. For example, the light source section can be provided by covering the fluorescent lamp 41 and the fluorescent lamp fittings 42 with a transparent cover.

(Embodiment 3)

The viewing range can be intentionally limited by utilizing the above-described characteristic that the viewing angle range is dependent upon the length of the fluorescent lamp and the direction in which the fluorescent lamp is arranged. For example, by appropriately setting the length of the fluorescent lamp and the direction in which the fluorescent lamp is arranged, it is possible to realize an arrangement such that the traffic sign becomes visible at a distance of 100 m before the sign and becomes invisible at a distance of 50 m before the sign, as illustrated in FIG. 19.

This arrangement can be practiced with an optical display apparatus of any of the embodiments described in this specification.

(Embodiment 4)

FIG. 20 is a plan view illustrating an optical display apparatus of the present invention where the installation position of the fluorescent lamp 46 is spaced apart from the incident plane 15.

A reconstructed image 48 can be well recognized also in this case though it is associated with a slight change in color and a slight reduction in the viewing angle range. However, the observer 49 needs to observe the image from a position moved from the incident plane 15 in a direction opposite to the direction in which the fluorescent lamp 46 is moved from the incident plane 15, as illustrated in FIG. 20. This is because illumination light 47 is incident upon the hologram 2 in an inclined direction, whereby the reconstructed image 48 is formed at a position spaced apart from the incident plane 15. The above-described arrangement can be positively used for display, when it is difficult to install the fluorescent lamp 46 on the incident plane 15 for reasons such as for saving the installation space for the optical display apparatus. It is understood that it is possible to intentionally produce a hologram in view of such a reconstruction arrangement.

This arrangement can be practiced with an optical display apparatus of any of the embodiments described in this specification.

(Embodiment 5)

Only the process for a single pattern mask and the reconstruction of a hologram produced by such a process have been described above. This may suffice for a single color display. However, for producing a color display, a hologram is produced by layering different pattern masks corresponding to the colors to be displayed on one another so as to realize the color display.

FIG. 21A illustrates three exposure pattern masks corresponding to the three primary colors. These pattern masks are used as objects so as to produce single-color holograms of R, G and B, respectively. FIG. 21B illustrates a reconstructed image obtained by superposing the three produced holograms on one another. FIG. 21C illustrates the produced holograms being layered on a single substrate.

The useful characteristic of the hologram described in the embodiments of the present invention, i.e., the characteristic that the color of the reconstructed image does not change within the viewing range even when the vertical opening limit width is widened, holds for various colors. Therefore, the color of the color reconstructed image of the layered hologram does not change within the viewing range (strictly speaking, the reconstructed wavelength slightly changes, but the change in wavelength cannot be perceived by a human eye as a substantial change in color). The change in the reconstructed wavelength at the center of the reconstructed image depends upon the incident angle θ of the reference light which is set when producing the hologram of each color, as illustrated in the wavelength shift ratio with respect to the incident angle θ of the reference light ($\Delta\lambda R/\Delta\lambda T$) in FIG. 22. In particular, the change in color increases as the incident angle θ of the reference light increases. However, in the case where the incident angle of the reference light θ=30°, for example, the change in color (the change in wavelength) within a viewing angle range of ±2°, which is required for a sign, is about 4 nm, which cannot be substantially perceived by a human eye. Therefore, for a commonly-employed incident angle of the reference light, θ=45° or less, the reconstructed image is perceived as having a single color.

The wavelength shift ratio with respect to the incident angle θ of the reference light ($\Delta\lambda R/\Delta\lambda T$), as illustrated in FIG. 22, denotes the ratio of the amount of wavelength shift $\Delta\lambda R$ for the arrangement of the present invention, which is a reflection-type hologram, with respect to the amount of wavelength shift $\Delta\lambda T$ for a transmission-type hologram such as the conventional rainbow hologram.

More strictly, when a color distribution exists in the reconstructed image, and the incident angle θ of the reference light increases, the color distribution increases. This relationship is illustrated in FIG. 23 as the relationship between the reference light angle and the reconstructed wavelength width. Herein, H denotes the height of the hologram. FIG. 23 shows that by selecting the parameter L/H to be a large value, it is possible to reduce the color distribution to an unrecognizable level within the range of the incident angle of the reference light, θ=45° or less.

The color distribution in the reconstructed image also changes depending upon the observation position. In particular, the change in color increases as the observation position moves farther away. This relationship is illustrated in FIG. 24 as the relationship between the normalized observation position and the reconstructed wavelength width. This shows that by appropriately selecting the parameter L/H, it is possible to reduce the color distribution to an unrecognizable level.

More preferably, if the value L/H could be selected to be substantially infinite, the change in the rate of magnification would be substantially eliminated. Back to the definition, selecting the value L/H to be substantially infinite means that the line extending from the slit to the hologram has no gradient. Therefore, the slit and the ground glass may be replaced with a one-dimensional diffuser which has a light diffusing effect only in the width direction of the hologram with no light diffusing effect in the height direction of the hologram. There are a number of examples for such a diffuser, including those using a diffraction grating, or those which are holographically produced. For example, a lenticular lens sheet having an array of cylindrical lenses may be used.

The arrangement of the exposure optical system to be used in such a case is as described above with reference to FIG. 14.

The arrangement of the present embodiment as described above can be practiced with an optical display apparatus of any of the embodiments described in this specification.

(Embodiment 6)

Figure 25A:
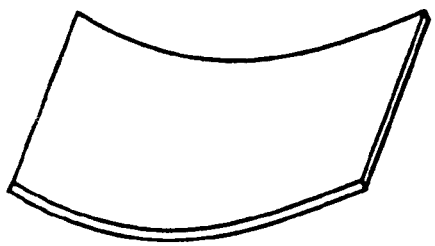
Figure 25B:
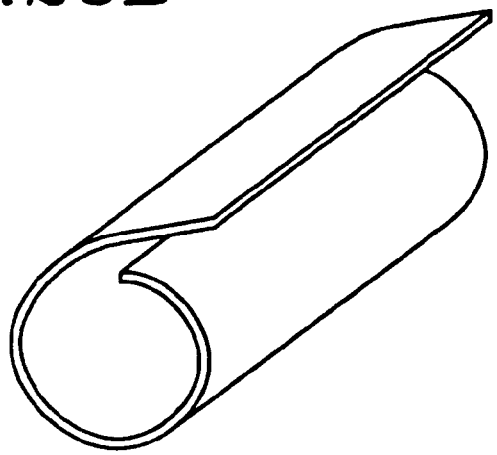
Figure 25C:
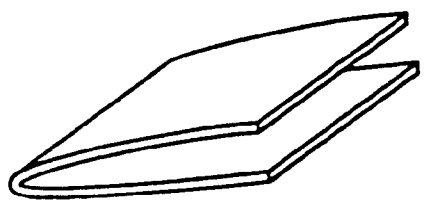

The hologram 2 of the present invention can be layered with a flexible substrate which can be bent, rolled, or folded, as illustrated in FIGS. 25A to 25C, respectively.

While a hologram dry plate is formed by attaching a dry film type photopolymer to a glass substrate in the above-described process of producing the hologram 2, the photopolymer on which a hologram image has been recorded can be detached from the glass substrate and re-attached to another substrate after the process. The hologram 2 of the present invention can be bent, rolled or folded, as illustrated in FIGS. 25A to 25C, respectively, after it is re-attached to another flexible substrate, including but not limited to, a plastic film, paper, cloth, or the like. This allows for compact storage of the display apparatus not being used, and such a display apparatus can easily be carried around.

In such a case, it is not necessary to carry around the light source. This is because it is very easy to find a place where a fluorescent lamp is used, and the reconstructed image can easily be obtained by simply unfolding the hologram in the vicinity of a fluorescent lamp which is used in a house, an office, a train station, a train car, an elevator, or the like. Thus, the hologram of the present invention can be effectively used as a poster, a direction board, a billboard, etc., as well as in various other applications. Moreover, regarding the installation, it can be adequately installed simply by attaching it to a wall surface by common means such as a pushpin, a tape, or the like. The embodiment as described above is made possible because according to the present invention, the reconstructed image of the hologram can be displayed with a fluorescent lamp, which is one of the most commonly-employed light sources.

Moreover, the hologram can be provided in the form of a film or a book by superposing a plurality of holograms on one another. In such a case, reconstructed images can be viewed under a fluorescent lamp as by turning over pages of a book, and such a hologram can be effectively used as a trade catalog, a picture book, a map, etc., as well as in various other applications.

Figure 25D:
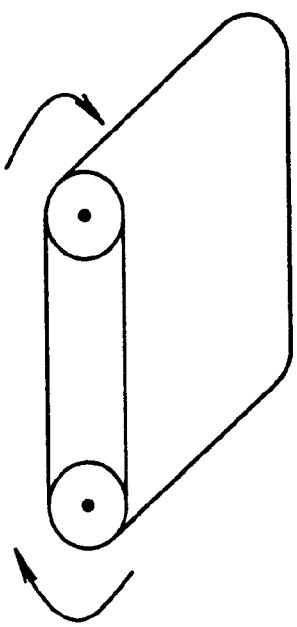
Figure 25E:
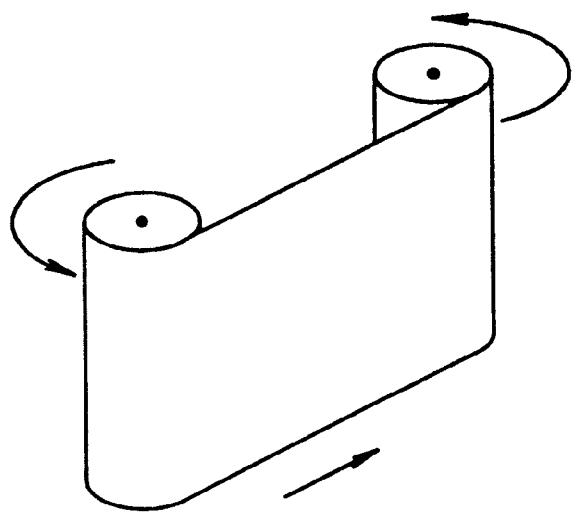

Moreover, it is possible to reconstruct a continuous image by recording the image on a looped flexible substrate as illustrated in FIG. 25D and by moving the same by means of a roll. Alternatively, it can be provided in a windup form as illustrated in FIG. 25E.

The arrangement of the present embodiment where a hologram is layered on a flexible substrate as described above can be practiced with an optical display apparatus of any of the embodiments described in this specification.

(Embodiment 7)

A laser typically used as an exposure laser includes an argon laser or a krypton laser, each having primary oscillation wavelengths of 488 nm, 514.5 nm and 467.1 nm. Through exposure with the three wavelengths, it is possible to reconstruct and display colors of the wavelengths. However, the following process is generally required to reconstruct and display colors of wavelengths other than the oscillation wavelength of the laser, e.g., to display green at 550 nm, to which a human eye has the highest visibility, or to display yellow in the vicinity of 570 nm.

Where a silver salt is used as the hologram material, the sample is exposed with an argon laser at 514.5 nm, and then immersed in an appropriate solution, so as to widen the interval of the periodic arrangement of the hologram, thereby shifting the reconstructed wavelength to 550 nm or 570 nm. Alternatively, where a dry film type photopolymer is used, the sample is similarly exposed with an argon laser at 514.5 nm, and then the entire surface of the sample is irradiated with UV light, after which a color tuning film is layered on the sample, followed by a heat treatment. The movement of a swelling substance from the color tuning film to the photopolymer side widens the interval of the periodic arrangement, thereby shifting the reconstructed wavelength to 550 nm or 570 nm. In any case, such a method is not preferable in view of improving the production efficiency because it is necessary to perform an additional process after laser exposure.

On the contrary, for the hologram of the optical display apparatus of the present invention, it is possible to shift the reconstructed color by setting the reference light and the object light so that they are incident upon the hologram dry plate at an appropriate angle during the laser exposure, without subsequently performing the additional process.

FIG. 26 illustrates a side view of an optical system for producing a hologram which is reconstructed and displayed with a color having a wavelength other than the laser oscillation wavelength. Unlike the optical system illustrated in FIG. 15A, a hologram dry plate 50 is inclined by an angle θobj with respect to the optical axis of the object light. A pattern mask 51, which is an object, is similarly inclined by the angle θobj. The pattern mask 51 is produced while being further shrunk in one direction as compared to the above-described pattern mask 13. Strictly speaking, the pattern mask 51 is not produced with a uniform shrinkage rate, but with a shrinkage rate which continuously varies for various positions of the pattern mask 51. On the other hand, reference light 52 is arranged to be incident upon the reverse side of the hologram dry plate 50 at an angle θref.

Where the exposure is performed with laser light at a wavelength λ=514.5 nm, for example, using such a producing optical system, a reconstructed image of bright green at a wavelength λE=550 nm can be observed over the front surface of the hologram dry plate during reconstruction by setting the object light angle θobj and the reference light angle θref to be −25.3° and 42.1°, respectively. Then, the incident angle of the illumination light having a wavelength of 550 nm is 15°.

Where the exposure is similarly performed with laser light at a wavelength λ=514.5 nm, a reconstructed image of bright yellow at a wavelength λE=570 nm can be observed over the front surface of the hologram dry plate during reconstruction by setting the object light angle θobj and the reference light angle θref to be −33.1° and 51.2°, respectively. Then, the incident angle of the illumination light having a wavelength of 570 nm is also 15°.

The above-described angle can be determined from the following relation:

$$\theta RE = \sin^{-1}[n \cdot \sin\{(\theta O + \theta R)/2 + \pi - \phi\}];$$

and $$\theta OE = \sin^{-1}[n \cdot \sin\{(\theta O + \theta R)/2 + \phi\}].$$

Herein, θRE and θOE are the incident angles of the illumination light and the reconstructed light, respectively, for the wavelength to be displayed. π denotes the ratio of the circumference of a circle to its diameter, and n denotes the average refractive index of the hologram material. Herein, the calculation was conducted with n=1.52. Moreover, θR, θO and φ are parameters which are respectively expressed as follows:

$$\theta O = \sin^{-1}(\sin \theta obj/n);$$

$$\theta R = \sin^{-1}(\sin \theta ref/n) - \pi;$$

and $$\phi = \sin^{-1}[\lambda \sin\{(\theta O - \theta R)/2\}/\lambda E].$$

Thus, it is possible to display any intermediate color by using a hologram which has been produced so as to exhibit a desired reconstructed wavelength in combination with a light source having a continuous emission distribution, e.g., a white fluorescent lamp. Moreover, it is possible to display a bright reconstructed image with a high light efficiency by combining it with a light source having three emission peaks, corresponding to the three colors of R, G and B, e.g., a three-wavelength fluorescent lamp.

The arrangement of the above-described embodiment as described above can be practiced with an optical display apparatus of any of the embodiments described in this specification.

(Embodiment 8)

As described above in Embodiment 5 of the present invention, as the field of view of the observer is moved in the vertical direction, the reconstructed wavelength slightly changes. Assuming that the object light is incident upon the hologram from the front side thereof while producing the hologram, the degree of the change in color depends upon the set incident angle θ of the reference light, and the change in color increases as θ increases. For example, when θ exceeds 45°, a change in the reconstructed wavelength of 6 nm or more occurs in the center of the reconstructed image within the viewing angle range of ±2°, which is required for a sign, whereby even a human eye recognizes a slight change in color in the portion where the change in hue is substantial. Moreover, the color distribution within the image becomes more significant.

While a method for producing a hologram by optimally selecting the parameter L/H to suppress such a change has already been described above in Embodiment 5, there exists a hologram setting angle, for the hologram of the optical display apparatus of the present invention, with which it is possible to minimize the change in color after production. The setting angle is an angle which is substantially ½ of the angle between the illumination light and the object light; and more exactly an angle which satisfies the following relation:

$$\theta ac = \sin^{-1}[n \cdot \sin\{(\theta O + \theta R + \pi)/2\}].$$

For example, when the exposure wavelength is 514.5 nm, with the incident angle of the reference light being θref=45° and the incident angle of the object light being 0°, θac=21.4° is obtained from the above expression. Then, the change in the reconstructed wavelength is only about 0.2 nm within the viewing angle range of ±2°, which is required for a sign, whereby the change in color will not be recognized. Moreover, the color distribution within the reconstructed image can be suppressed to be extremely small. Since the reconstructed wavelength slightly shifts toward the long wavelength side, the producing optical system should preferably be set in view of such a shift.

FIG. 27A illustrates an installation of the hologram when the installation angle is set to be close to θac, and FIG. 27B illustrates a normal installation of the hologram for comparison.

When the installation angle of a hologram 53 is set to be as close to θac as possible, the optical path of illumination light 54 and that of reconstructed light 55 come closer to each other. Thus, in practice, it is preferable to install the hologram while setting the installation angle to be as close to θac as possible and such that an observer 56 attempting to view the reconstructed image does not block the illumination light 54. It is more preferable to slightly move a linear light source for illumination, which is not shown, in the horizontal direction so that the illumination light 54 and the observer 56 do not overlap each other, as described in Embodiment 4.

The arrangement of the above-described embodiment as described above can be practiced with an optical display apparatus of any of the embodiments described in this specification.

(Embodiment 9)

It is possible to increase the size of the virtual display plane and that of the reconstructed image by increasing the size of the hologram. However, the exposure area which is normally realized by a hologram producing optical system is about φ300 mm to about φ400 mm, which presents the limit for the size of the reconstructed image. Although it is not impossible to realize an exposure area larger than this, there will then be problems as follows:

(1) The production of optical components such as a lens, a mirror, or the like, is difficult and costly;
(2) The light intensity decreases as the laser beam is extremely widened;
(3) The exposure time increases because of (2) above; and
(4) The exposure condition becomes unstable (increased probabilities for adverse effects such as air fluctuation, vibration, and laser stability) because of (3) above.

In order to avoid these difficult problems, with the optical display apparatus of the present invention, a large-size hologram is provided by providing small elementary holograms which can be produced under a more stable condition, and combining these elementary holograms together just like tiling.

FIG. 28 illustrates an exemplary 1 m×1 m hologram. Herein, sixteen 25 cm×25 cm elementary holograms are arranged in a 4×4 matrix, thereby realizing the size of 1 m×1 m. Each elementary hologram is produced by using one of elementary masks which are obtained by dividing a pattern mask having a size of about 1 m×1 m, which is the object, into 4 equal parts. The problems as those described above do not occur in exposure for the size of 25 cm.

The arrangement of the above-described embodiment as described above can be practiced with an optical display apparatus of any of the embodiments described in this specification.

(Embodiment 10)

One feature of the optical display apparatus of the present invention that is not seen in conventional apparatuses is that the optical display apparatus whose basic arrangement has been shown in each embodiment may be used as one display unit, while a plurality of such units can be arranged on an arrangement plane so as to synthesize and display reconstructed images from the respective units on the virtual display plane. For example, where the display units are arranged side by side as viewed from the observer, the display width can be widened in the horizontal direction by synthesizing the respective reconstructed images on the virtual display plane.

FIGS. 29A and 29B are a front view and a side view, respectively, of an exemplary optical display apparatus in which three display units 57 are arranged side by side.

A hologram reconstructed image 59 reconstructed by a fluorescent lamp 58 differs for the respective display units, and each display unit reconstructs and displays one of the characters "A", "B" and "C". When the respective display units are closely arranged together side by side, as illustrated in the figure, the characters are aligned together so that they can be recognized as one word.

It is preferable to arrange a shield plate 60 between the units so that the fluorescent lamp for one unit does not reconstruct the fluorescent lamp for another unit.

(Embodiment 11)

Where the information to be displayed is a string of characters as in FIG. 29A, even if there is a slight gap between the characters, the information is conveyed to the observer with no problem. However, where the information to be displayed is a pattern, any gap therein is undesirable, and in some cases the gap itself may be recognized as a piece of information, whereby the observer recognizes information which is different from the original information intended to be conveyed. In the case of the arrangement of Embodiment 10, even when the holograms for the respective units are arranged together in a completely continuous manner, if the fluorescent lamps are arranged at the basic positions, the reconstructed images from the respective holograms are reconstructed at separated positions on the virtual display plane, thereby causing the above-described problem.

In order to solve such a problem, the present embodiment employs the method described in Embodiment 4 of the present invention. That is, the shift in the position where the reconstructed image is formed due to the offset arrangement of the fluorescent lamps is positively utilized to provide a large synthesized reconstructed image which is seamless between the respective images.

FIGS. 30A and 30B are diagrams illustrating an exemplary optical display apparatus in which three display units are arranged side by side for displaying a single large pattern, respectively showing separated reconstructed images and reconstructed images which are seamlessly synthesized together.

Each display unit is arranged to display an individual reconstructed image as illustrated in FIG. 30A. When the units are arranged side by side, and a fluorescent lamp 62 of a left display unit 61 indicated by a broken line is moved to the left, a reconstructed image 63 is moved to the right so that it is displayed adjacent to a reconstructed image 65 of a center display unit 64 with no gap therebetween. Similarly, when a fluorescent lamp 67 of a right display unit 66 is moved to the right, a reconstructed image 68 moves to the left so that it is displayed adjacent to the reconstructed image 65 of the center display unit 64 with no gap therebetween.

As described above, according to the present invention, it is possible to combine reconstructed images together with no gap, thereby allowing large patterns to be displayed.

(Embodiment 12)

An arrangement which sufficiently exhibits the feature of the optical display apparatus of the present invention is one in which a plurality of display units are arranged along a depth direction of the reconstructed image as viewed from the observer, so that the reconstructed images from the respective holograms are synthesized on the virtual display plane.

FIG. 31A is a side view illustrating a structure of an optical display apparatus according to Embodiment 12 of the present invention. In this embodiment, the optical display apparatus of the present invention is used as a traffic sign in a tunnel. Specifically, reference numeral 69 denotes an optical display apparatus of the present embodiment; 70 to 72 display units; 73 to 75 holograms; and 76 to 78 fluorescent lamps as linear light sources. The display units 70 to 72 are arranged side by side on a ceiling plane 80 of a tunnel 79.

An operation of the optical display apparatus 69 having such a structure will be described below.

First, an original picture pattern 81 of a traffic sign indicating a speed limit, as illustrated in FIG. 31B, is divided into parts and recorded on the holograms 73, 74 and 75, respectively, by a method as that described in Embodiment 1 of the present invention. In particular, as illustrated in FIG. 31C, an elementary pattern 82 for the lower approximately ⅓ portion obtained by dividing the original picture pattern 81, is recorded on the hologram 73, an elementary pattern 83 for the middle approximately ⅓ portion is recorded on the hologram 74, and an elementary pattern 84 for the upper approximately ⅓ portion is recorded on the hologram 75. Each hologram is produced by arranging a pattern mask for the elementary pattern and a hologram dry plate at a respectively different distance in an optical system for producing each hologram.

As illustrated in FIG. 31A, a reconstructed image 85 of the hologram 73 formed by the fluorescent lamp 76 is arranged to be formed in the vicinity of a virtual display plane 86. Similarly, a reconstructed image 87 of the hologram 74 formed by the fluorescent lamp 77 and a reconstructed image 89 of the hologram 75 formed by the fluorescent lamp 78 are arranged to be formed in the vicinity of a virtual display plane 88 and a virtual display plane 90, respectively. Then, the reconstructed images 85, 87 and 89 as viewed from the front side thereof are synthesized into a single image, as illustrated in FIG. 31D. Thus, the reconstructed image is viewed from a car running through a tunnel 79 as if it were a traffic sign indicating a speed limit hung from a ceiling plane 80 of the tunnel 79. However, this is only a display on the virtual display plane, and there is no object actually existing on the display plane. Therefore, there is no chance for a car collision.

An advantage of this structure is that it is possible to reduce the height of the display unit by a rate of approximately 1/N, where N denotes the number of display units provided. Thus, the cross section for which a tunnel is to be dug through can be reduced by employing an optical display apparatus having such an extremely flat structure. This provides a substantial reduction in the construction cost.

(Embodiment 13)

FIG. 32 is a perspective view of an optical display apparatus according to the present embodiment. This is an example for displaying the position of an emergency phone in a tunnel. Reference numeral 91 denotes a fluorescent lamp, 92 a hologram unit, and 93 an emergency phone.

The hologram unit 92 has a structure as illustrated in FIG. 33. Specifically, reference numeral 94 denotes a first hologram, 95 a second hologram, and 96 a display board. The first hologram 94 and the second hologram 95 are arranged to form a reconstructed image on the side of a first plane 97 of the hologram unit 92 and on the side of a second plane 98 of the hologram unit 92, respectively. Information identical to display information to be reconstructed by the first hologram 94 is written on a first plane 99 of the display board 96 to which the first hologram 94 is attached. Similarly, information identical to display information to be reconstructed by the second hologram 95 is written on a second plane 100 of the display board 96 to which the second hologram 95 is attached.

The hologram unit 92 having such a structure is arranged under the fluorescent lamp 91 as a linear light source, as illustrated in FIG. 32. Referring to the side view of FIG. 34 in order to describe an operation of the hologram unit 92, a reconstructed image 103 of the first hologram 94 is formed by illumination light 102 emitted from a region 101 of the fluorescent lamp 91. In this example, the characters "Emergency Phone" are displayed. On the other hand, a reconstructed image 106 of the second hologram 95 is formed by illumination light 105 emitted from a region 104 of the fluorescent lamp 91, thereby similarly displaying the characters "Emergency Phone". Therefore, it is possible to clearly indicate the position of the emergency phone 93 to people on both sides of the optical display apparatus. In this example, the character information "Emergency Phone" is written on both sides of the display board 96, whereby a display on the opposite side can be recognized through a transparent hologram plane. Therefore, even in an emergency where the fluorescent lamp 91 does not light up, for example, the position of the emergency phone 93 can be recognized by using a flash light.

While a case where identical information is displayed has been described above, it is understood that it is possible to display different information on the opposite sides by recording different information on the respective holograms.

(Embodiment 14)

FIG. 35 is a perspective view of an optical display apparatus according to the present embodiment. Reference numeral 107 denotes a fluorescent lamp, 108 a first hologram unit, and 109 a second hologram unit.

Each of the hologram units 108 and 109 has a structure as illustrated in FIG. 36. In particular, reference numeral 110 denotes a first hologram, 111 a first display board, 112 a second hologram, and 113 a second display board. The first and second hologram units 108 and 109 are arranged near the respective ends of the fluorescent lamp 107 as a linear light source, as illustrated in FIG. 35.

An operation of the optical display apparatus according to the present embodiment will be described with reference to FIG. 37.

A reconstructed image 115 of the first hologram 110 is formed by illumination light 114 emitted from the fluorescent lamp 107. On the other hand, a reconstructed image 117 of the second hologram 112 is formed by illumination light 116 emitted from the fluorescent lamp 107. Therefore, it is possible to display identical or different information to people on both sides of the optical display apparatus.

Information identical to the reconstructed image 115 of the first hologram 110 and information identical to reconstructed image 117 of the second hologram 112 are recorded on the first display board 111 and on the second display board 113, respectively, and can be recognized from the opposite side through transparent hologram plane. Therefore, even in an emergency where the fluorescent lamp 107 does not light up, for example, the information can be recognized by using a flash light.

In the structure described above, a display board is provided for an emergency display with one hologram being provided on each side of the display board. In other applications, if a display board having such a function is not necessary, the hologram unit may be replaced with a single hologram. The hologram is a reflection-type hologram which is recorded through double exposure from the front side and the reverse side thereof. Identical or different reconstructed images can be observed from the respective sides of the hologram.

(Embodiment 15)

An example of an optical display apparatus where a plurality of holograms are reconstructed from a single linear light source has been described in Embodiments 13 and 14 above. The plurality of holograms to be reconstructed do not have to be placed on the same installation plane as in the example described above.

FIG. 38 is a plan view of an optical display apparatus according to the present embodiment, where one hologram is arranged on a side wall and another hologram is arranged on the ceiling.

Reference numeral 118 denotes a fluorescent lamp, 119 a first hologram, and 120 a second hologram. Illumination light 121 emitted from the fluorescent lamp 118 forms a reconstructed image 122 of the first hologram 119, and illumination light 123 forms a reconstructed image 124 of the second hologram 120. Such a reconstruction operation can be realized because the hologram of the present invention can be reconstructed by a fluorescent lamp.

The structure of an optical display apparatus for simultaneously reconstructing such a plurality of holograms is not limited to this embodiment, but various other structures are possible by effectively utilizing light which is omnidirectionally emitted from the linear light source as illumination light.

While the reference light 16 is directed to be incident upon the incident plane 15 in a hologram producing process in Embodiment 1, the present invention is not limited to this. It may also be effective to intentionally not employ the arrangement. For example, when a hologram is formed by directing the object light to be incident upon the incident plane while directing the reference light to be incident upon a plane different from the incident plane, the reconstructed image can be viewed from the front side of the hologram for illumination light coming from the left-hand side in the arrangement of the fluorescent lamp and the hologram illustrated in FIG. 38. Moreover, since the direction of the reflected light of the illumination light is different from the direction in which the reconstructed image is obtained, an easy-to-view display is realized.

(Embodiment 16)

The method for producing a hologram of the present invention is not limited to that described in Embodiment 1. For example, it is possible to first reconstruct an image which has been recorded as a transmission-type hologram, and then to record it as a reflection-type hologram.

FIGS. 39A and 39B are a side view and a plan view, respectively, of an optical system for producing a transmission-type hologram according to the present embodiment.

As illustrated in FIG. 39A, laser light 126 incident upon a ground glass 125 so as to be diffused light 127 and then incident upon a slit 128. The slit 128 has a narrow width as viewed from a side thereof, and transmits only a portion of the diffused light 127. Therefore, light having passed through the slit 128 appears as spread light coming from a single point as viewed form the side. This light reads the information of a pattern mask 129, and irradiates a hologram dry plate 130 as object light 131. This can be considered as projection of the pattern mask 129 onto the hologram dry plate 130. The object light 131 including the information of the object forms interference fringes with reference light 132 incident upon the same side of the hologram dry plate 130, and the interference fringes are recorded on the hologram dry plate 130.

At this time, the "shadow" of the pattern mask 129 projected onto the hologram dry plate 130 has been enlarged. In view of the rate of projection magnification, the pattern mask 129 is produced while being shrunk in one direction. Although the rate of magnification varies depending upon the setting of the optical system, it normally is about 1.2 to about 2.

As illustrated in the plan view of FIG. 39B, the slit 128 has a large width as viewed from the above, and transmits diffused light 127 coming from the ground glass 125 over a wide range. In FIG. 39B, diffused light having passed through the central portion of the slit 128 is indicated by a solid line, while diffused light having passed through an end portion of the slit 128 is indicated by a broken line. Information of the pattern mask 129 obtained when viewed from the front side thereof is projected onto the hologram dry plate 130 by the diffused light indicated by the solid line, whereas information of the pattern mask 129 obtained when viewed from a slightly inclined direction through the end portion of the slit 128 is projected onto the hologram dry plate 130 by the diffused light indicated by the broken line. The object light 131 including such information forms interference fringes with the reference light 132 incident upon the same side of the hologram dry plate 130, and the interference fringes are recorded on the hologram dry plate 130. This is the principle of how reconstructed images of the pattern mask 129 as viewed from different angles are formed on the respective eyes of the observer when the hologram is reconstructed.

Although side views and plan views have been separately described above for simplicity, it is understood that the interference fringes are simultaneously recorded in an actual hologram producing process.

FIG. 40 illustrates an optical system for obtaining a reflection-type hologram from a master hologram, while using the hologram produced by the above-described process as the master hologram. Illumination light 134 which is directed to be incident upon a master hologram 133 is equal to the reference light 132 used when producing the master hologram. The illumination light 134 forms reconstructed light 135 from the master hologram 133. The reconstructed light 135 is incident upon a hologram dry plate 136 as object light and forms interference fringes with reference light 137 which is incident upon the reverse side thereof, thereby forming a reflection-type hologram.

As described above, in the present embodiment, a transmission-type hologram is once produced so as to produce a reflection-type hologram using it as a master hologram. The method has an advantage that the optical system for producing a reflection-type hologram can be arranged easily, and that the distance between the reconstruction display plane and the hologram can be re-adjusted. In particular, while a reconstructed image 138 is formed at a position where the pattern mask 129 was placed when producing the master hologram, the distance between the master hologram 133 and the reconstructed image 138 is d1, whereas the distance between the reflection-type hologram 136 and the reconstructed image 138 is d2. Thus, the amount by which the reconstructed image floats above the hologram plane can be increased or decreased.

(Embodiment 17)

FIG. 41 illustrates an optical system for producing a hologram according to Embodiment 17. This is also a process of producing a transmission-type hologram once and then forming a reflection-type hologram while using it as a master hologram.

In FIG. 41, object light 141 obtained by irradiating an object 139, which is a three-dimensional object, with illumination light 140 forms interference fringes with reference light 143 incident upon the same side of a hologram dry plate 142. They are recorded on the hologram dry plate 142 as a transmission-type hologram, thereby providing a master hologram 144.

In FIG. 42, a reconstructed image of the object 139 is obtained by directing illumination light 145, which is conjugate light of the reference light 143, to be incident upon the master hologram 144. Herein, a slit 146 is arranged in the vicinity of the master hologram 144 so as to use light coming through the slit 146 as object light 147, so that interference fringes are formed between the object light 147 and reference light 149 incident upon the reverse side of a hologram dry plate 148. The interference fringes are recorded on the hologram dry plate 148 as a reflection-type hologram. Reference numeral 150 denotes a reconstructed image of the object 139.

By employing such a method, it is possible to obtain an unblurred reconstructed image for a three-dimensional object or an object spaced apart from the hologram plane.

(Embodiment 18)

FIG. 43 illustrates an optical system for producing a hologram according to Embodiment 18. This is also a process of producing a transmission-type hologram once and then forming a reflection-type hologram while using it as a master hologram.

The optical system of FIG. 43 differs from that of FIG. 42 in that a negative cylindrical lens 151 and an opening 152 are provided in place of the slit 146. By the action of the cylindrical lens 151, it is possible to match the position in the vertical direction in the figure where reconstructed light 153 forms an image with a hologram dry plate 154, whereby it is possible to obtain a sharp reconstructed image for a three-dimensional object or an object spaced apart from the hologram plane. Reference numeral 155 is a reconstructed image of object 139.

In FIG. 43, the cylindrical lens 151 having a negative power is used, assuming a case where the reconstructed image 155 is formed between the master hologram and the hologram dry plate. However, when the reconstructed image 155 is formed on the left side of the hologram dry plate 154 in FIG. 43, a cylindrical lens having a positive power is used.

(Embodiment 19)

FIG. 44 is a side view illustrating a structure of an optical display apparatus according to Embodiment 19 of the present invention. In this embodiment, the optical display apparatus of the present invention is used as a traffic sign in a tunnel.

In FIG. 44, reference numeral 201 denotes an optical display apparatus of the present embodiment, 202 a hologram screen, 203 a cylindrical lens, and 204 an LED display apparatus. The optical display apparatus 201 is arranged on a ceiling plane 206 of a tunnel 205. As shown in the figure, the width direction (perpendicular to the figure), the longitudinal direction and the vertical direction of the tunnel 205 are denoted as the x, y and z directions, respectively.

An image displayed on the LED display apparatus 204 is projected by the cylindrical lens 203 onto the hologram screen 202. The image diffracted and reflected by the hologram screen 202 is reconstructed and imaged on a virtual display plane 208. When an image 209 is viewed from a car in the tunnel 205, it is seen as if a sign is hung at a position downwardly spaced apart from a ceiling plane 206 of the tunnel 205. However, this is only a display on the virtual display plane 208, and there is no object actually existing on the display plane 208. Therefore, there is no chance for a car collision.

The virtual display plane 208 is a plane or a curved surface which is virtually provided in a space. The light from reflected by the surface of the hologram screen 202 can be deflected in a direction toward the road surface or in a direction toward the ceiling plane 206, whereby the reflected light will not be directly incident upon the driver's eye. The reflected light is useful as illumination light for illuminating the road surface or the ceiling plane.

A reason why the optical display apparatus of the present embodiment has such a function will be described below.

In FIG. 44, an image displayed on the LED display apparatus 204 is formed on the hologram screen 202 by the cylindrical lens 203. The image displayed on the LED display apparatus 204 is inverted in the vertical direction and in the horizontal direction, and the generatrix of the cylindrical lens 203 is placed parallel to the x direction. Herein, the respective components are arranged so that only the z component of the image is focused on the hologram screen 202. In other words, the respective components are arranged by the function of the cylindrical lens 203 so that a line or outline contained in the image which extends along the x direction, for example, appears to be most clear on the hologram screen 202. As a result, when a normal projection screen is placed at the position of the hologram screen 202, an image will be viewed where only the line or outline extending along the x direction is clear while the line or outline extending along the z direction is blurred, as illustrated in FIG. 45. FIG. 45 is a schematic illustration showing how a circular image and a square image imaged by the cylindrical lens 203 will appear on a normal projection screen being placed at the position of the hologram screen 202.

Next, a function of the hologram screen 202 will be described.

FIGS. 46A and 46B are a plan view and a side view, respectively, illustrating a structure with only the hologram screen 202 and the LED display apparatus 204 of the optical display apparatus 201. In the absence of the cylindrical lens 203, the hologram screen 202 has a function of imaging the light from point A on the LED display apparatus 204 to point B on the virtual display plane 208.

The hologram screen 202 having such a function can be produced by, for example, an exposure optical system illustrated in FIG. 47. In particular, a laser beam 211 focused by a lens 210 becomes diffused light after passing through a pin hole 212 placed at the position of point A, and is incident upon a hologram dry plate 213, which will later be the hologram screen 202, from the right side of the figure. On the other hand, a laser beam 214 converging to point B is incident upon the hologram dry plate 213 from the left side of the figure, i.e., from the opposite side to the laser beam 211. The hologram screen 202 having such a function is provided by recording an interference pattern of the two laser beams on the hologram dry plate 213.

When the cylindrical lens 203 is arranged within the optical path, and an image is projected as illustrated in FIG. 45 in which only the z component (i.e., the line or outline extending along the x direction) of the image is clear and the x component (i.e., the line or outline extending along the z direction) is blurred, the hologram screen 202 exhibits the following function.

FIGS. 48A and 48B are a plan view and a side view, respectively, illustrating how a light beam travels though the respective components of the optical display apparatus 201.

First, for the x component of the image, since it is not effected by the cylindrical lens 203, as illustrated in FIG. 48A, the image at point A displayed on the LED display apparatus 204 can be considered as being projected onto the hologram screen 202 as it is. Therefore, only the x component (i.e., the line or outline extending along the z direction) is sharply imaged on the virtual display plane 208 by the function of the hologram screen 202 as the light coming from point A being imaged at point B in FIG. 45.

The z component of the image, on the other hand, appears to be most clear on the hologram screen 202 by the function of the cylindrical lens 203 as described above. This is illustrated in FIG. 48B, where the image at point A displayed on the LED display apparatus 204 is formed at point C on the hologram screen 202. Light output from point A once spreads out in the z direction and passes through the cylindrical lens 203 so that only the z component thereof converges to point C with a certain convergence angle. Therefore, after being diffracted and reflected by the hologram screen 202, the light is projected onto the virtual display plane 208 as divergent light having a small divergence angle along the z direction.

Strictly speaking, the respective light beams contained in the divergent light have slightly different wavelength components. That is, the emission distribution of the display apparatus has a width of several ten nm, and the light is split by the hologram screen 202 while being diffracted and reflected at different angles for the respective wavelengths.

It has been described above how the image displayed on the LED display apparatus 204 travels to be projected and imaged on the virtual display plane 208 separately for the x component and the z component. Next, how the image is consequently viewed by the eyes of an observer 215 will be described.

FIGS. 49A and 49B are a plan view and a side view, respectively, illustrating only part of the light beams illustrated in FIGS. 48A and 48B after the hologram screen 202, and illustrating the path of the light beams to the pupils of the observer 215 who is viewing the image at a position spaced apart from the virtual display plane 208.

As illustrated in FIG. 49A, similar light beams as those obtained when light comes from the single point B on the virtual display plane 208 are incident upon the left and right eyes of the observer 215. This indicates that the x component of the image appears to be a sharp line or outline on the virtual display plane 208. The above-described image is viewed by the observer 215 within the range indicated by two broken lines.

As illustrated in FIG. 49B, similar light beams as those obtained when light comes from the single point C on the hologram screen 202 are incident upon the respective eyes of the observer 215. This indicates that the z component of the image appears to be a sharp line or outline on the hologram screen 202. The above-described image is viewed by the observer 215 within the range indicated by two broken lines.

It would appear that it would be difficult for human eyes to recognize the x and z components as one image when they appear differently as described above. However, in fact, it is not difficult.

A three-dimensional feeling or a depth feeling is perceived because human eyes generally have a binocular parallax in the horizontal direction. Herein, a binocular parallax refers to a phenomenon that the image of a single object being viewed is projected onto different positions in the respective fields of view of the right eye and the left eye, or to the positional difference. For example, assuming, for simplicity, a case where a vertically extending long straight line is viewed by both eyes, both the right eye and the left eye can recognize it as a vertically extending long straight line. At the same time, because the image is projected onto different positions in the eyes for the respective eyes due to the binocular parallax, it is empirically possible to determine approximately how far the long straight line is located in the horizontal direction.

For the vertical direction, on the other hand, such a binocular parallax does not occur because the human eyes are located at the same height. As a result, it is relatively difficult to perceive the three-dimensional feeling or the depth feeling. For example, assuming, for simplicity, a case where a laterally extending long straight line is viewed by both eyes, both the right eye and the left eye can recognize it as a laterally extending long straight line. However, no parallax occurs because the image is projected onto the same position for both eyes. Therefore, it is not possible to definitely determine how far the long straight line is located in the vertical direction. For example, this corresponds to a case where a person attempting to jump up to a high horizontal bar might hesitate to jump for a moment because they cannot grasp the distance to the horizontal bar which appears to extend in the horizontal direction in the background sky.

Importantly, the binocular parallax in the horizontal direction is the most dominating factor for the three-dimensional feeling or the depth feeling. Based on this, how the x and z components of the above-described optical display apparatus of the present invention appear will be discussed.

What is shown in FIG. 49A is the fact that the sharp line or outline of the x component of the image is viewed by each of the left and right eyes of the observer 215 on the virtual display plane 208. Using the above figure of speech, this corresponds to how the vertically extending long straight line appears. Since the binocular parallax occurs for the respective left and right eyes of the observer 215, it is recognized that the image is located just on the virtual display plane 208.

On the other hand, what is shown in FIG. 49B is the fact that the sharp line or outline of the z component of the image is viewed by each of the left and right eyes of the observer 215 on the hologram screen 202. Using the above figure of speech, this corresponds to how the laterally extending long straight line appears. Since no binocular parallax occurs for the respective left and right eyes of the observer 215, the position of the image cannot clearly be determined.

Therefore, the sharp line or outline of the x component is the primary factor for the binocular parallax, and is the dominating factor for the recognition of a position. As a result, the image appears to the observer's eyes as if it were floating at the position of the virtual display plane 208.

Although it has been omitted in the above description, the relative installation angle among the hologram screen 202, the cylindrical lens 203 and the LED display apparatus 204 is intentionally inclined. This is done so that a matrix array of pixels, which are normally formed on the LED display apparatus 204 equidistantly in the vertical direction and in the lateral direction, are clearly imaged on the hologram screen 202 without being distorted. This is a technique called "front rising" which is employed when photographing architecture. In particular, when architecture such as a tall building is photographed by an ordinary camera while looking up, it is photographed while the shape of the building, which is originally rectangular, becomes a trapezoid as illustrated in FIG. 50. The front rising method is used for correcting such a distortion in the shape and taking a photograph with the entire object being focused.

A procedure of the front rising method is illustrated in FIGS. 51A to 51D. Herein, reference numeral 216 denotes a film surface, and 217 a shooting lens.

Figure 51A:
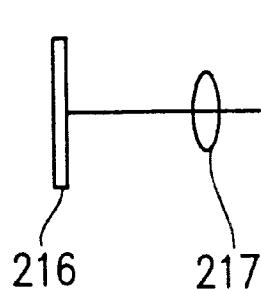
Figure 51B:
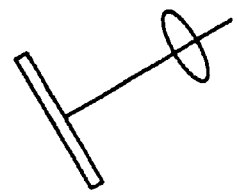
Figure 51C:
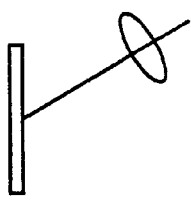
Figure 51D:
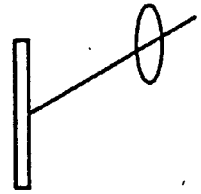

In particular, the camera is first directed from the normal position (FIG. 51A) toward the object (FIG. 51B), and then only the film surface 216 is inclined in the direction parallel to the object (FIG. 51C). Then, the above-described distortion of the object is corrected. Next, the shooting lens 217 is inclined toward the direction parallel to the object (FIG. 51D). Then, the entire object becomes focused. Incidentally, the nomenclature "front rising" comes from the fact that the shooting lens 217 is raised with respect to the film surface 216 as a result of the above-described procedure.

FIG. 52 is a diagram illustrating only the hologram screen 202, the cylindrical lens 203 and the LED display apparatus 204 of the optical display apparatus 201 of the present embodiment, with the elements being rotated counterclockwise. It can be seen that, considering the LED display apparatus 204 as an object, the cylindrical lens 203 as a shooting lens, and the hologram screen 202 as a film surface, the optical display apparatus 201 of the present embodiment has the same structure as that of the above-described front rising technique.

What is described above is an arrangement of the optical display apparatus 201 which is employed assuming that the LED display apparatus 204 has a matrix arrangement of pixels which are provided equidistantly in the vertical direction and in the lateral direction. However, the arrangement may vary in the case where it is possible to use a display apparatus having a pixel arrangement for correcting a trapezoidal distortion as illustrated in FIG. 50.

FIG. 53 is an arrangement employed when using a display apparatus 218 which originally has a pixel arrangement of a vertically inverted trapezoid for correcting the trapezoidal distortion.

The respective planes (indicated as straight lines in the figure) on which the hologram screen 202, the cylindrical lens 203 and the display apparatus 218 are respectively arranged so that the extension lines thereof meet together at a single point. This is called a Scheimpflug condition and is well known in the art of photography. When this condition is satisfied, the entire image displayed on the display apparatus 218 is clearly projected onto the hologram screen 202.

According to the present invention, the color slightly varies among the light beams in the z direction, but the change in color among those received by a pupil is small, and thus they appear to have a single color. In the above description of the method for producing the hologram screen 202, only a method using a single color laser is described. However, it is possible to display a color image by performing multiple exposure with red, blue and green lasers using a similar method.

Moreover, while the cylindrical lens 203 is used in the present embodiment, the present invention is not limited thereto. Any other structure may alternatively be used as long as it clearly projects and images the z component of an image on the hologram screen 202 as described above. For example, an anamorphic optical system having different focal distances for the vertical and lateral directions or a combination of a normal projection lens and a cylindrical lens may be used. Particularly, when using a lens or a mirror in which the focal distance in the x direction can be varied, it is possible to easily change the position along the depth direction where the image is viewed. For example, when a varifocal lens 301 having a power only in the x direction is arranged as illustrated in FIGS. 54A and 54B, the position of the virtual display plane 208 where the image is formed is moved back and forth without changing the position of the LED display apparatus 204. It is also possible to employ an arrangement where the optical path is folded by using a varifocal mirror in place of the varifocal lens 301.

While an LED display apparatus is used as an image display apparatus in the present embodiment, the present invention is not limited thereto but may employ any image display apparatus capable of displaying a bright image. For example, it is possible to use an image display apparatus comprising: a display device selected from an LED, a CRT, a polymer dispersed type liquid crystal panel and an organic EL panel; and a polarization switching device. As the polarization switching device, an arrangement including a ferroelectric liquid crystal panel may be used.

As described above, with the optical display apparatus of the present invention, an image displayed on the LED display apparatus 204 is reconstructed and imaged on the virtual display plane 208. However, this is only a display on the virtual display plane 208, and there is no object actually existing on the virtual display plane 208. Therefore, there is no chance for a car collision. Moreover, since the height of the overall apparatus can be set to be low, it is possible to provide a display apparatus with which a small space can be efficiently utilized.

Moreover, while the optical display apparatus of the present invention has been primarily described with respect to an application for a traffic sign in a tunnel, the present invention is not limited thereto. Another optical display apparatus in a form similar to that described above in the present embodiment can easily be used as a projection type display. Utilizing the characteristic that an image appears as if it were floating apart from the screen surface toward the viewer, various applications may be possible in the field of games, amusement, etc.

In FIG. 47, the laser beam 214 converging to point B is directed to be incident upon the hologram dry plate 213 from the left side of the figure when producing the hologram screen 202. However, it may be replaced with a laser beam 219 which is divergent light coming from point E which is located on the left side of the hologram dry plate 213, as illustrated in FIG. 55. A hologram screen 220 produced in this manner is arranged as illustrated in FIG. 56. Since the elements except for the hologram screen 220 are not changed at all, the elements are arranged as described above so that an image displayed on the LED display apparatus 204 is projected and imaged by the cylindrical lens 203, whereby the line or outline contained in the image which extends along the x direction, for example, is most clear on the hologram screen 220.

On the other hand, the x component of the image is not effected by the cylindrical lens 203. Therefore, it may be considered that the image displayed on the LED display apparatus 204 is projected onto the hologram screen 220 as it is. Therefore, by the function of the hologram screen 220, only the x component (i.e., the line or outline extending along the z direction) is sharply imaged on a virtual display plane 221, which is newly formed at the position where a point image E as a false image on the left side of the hologram screen 220 was located. Since a clear image of the x component is viewed by the observer on the virtual display plane 221 beyond the hologram screen 220, an image is recognized as if it were floating at this position as in the above description.

While such an optical display apparatus can be used as a traffic sign as in the above description, a more suitable field of application is a head-up display. In the most commonly known application, it is arranged on the dashboard of a car so as to display traffic information, speed information, navigation information, etc., which are required for driving the car, beyond the windshield and above the bonnet. An exemplary arrangement for use in such an application is illustrated in FIG. 57. In this case, other than an LED display apparatus, a CRT, a liquid crystal display apparatus, a fluorescent display tube, an organic EL, and the like, may be used as the display apparatus 204. Moreover, the hologram screen 220 is produced through an interference of divergent light as in the case of producing the hologram screen 220 described above. The hologram screen 220 may be provided on the windshield. Moreover, the projection optical system may be a cylindrical lens, an anamorphic optical system, or a combination of a normal projection lens and a cylindrical lens, as described above.

(Embodiment 20)

According to the present invention, it is possible to project a two-dimensional image at a position spaced apart from the screen. By applying the principle, it is also possible to provide a display apparatus for providing a three-dimensional image. This will be described in detail below.

When a person views a three-dimensional object, an image of the object viewed by the right eye and that viewed by the left eye are slightly different from each other. Based on this subtle difference called a binocular parallax, the person recognizes the three-dimensional structure and the depth of the object. Many three-dimensional display apparatuses have been proposed in the art which utilize this principle, where the display apparatus is controlled to alternately display a right-eye image and a left-eye image, thereby independently showing the right eye and the left eye the respective images, so that a three-dimensional image is recognized.

Generally, when viewing a three-dimensional image, a person is likely to get a tired feeling and, in some cases, may even feel sick as when a person has car sickness. Such a physiological phenomenon, though it depends on individuals, has been found to be a problem associated with a three-dimensional image. There has been a research and development for solving the problem.

By applying the above-described three-dimensional image display principle to the display apparatus of the present invention, it is possible to provide a new three-dimensional display apparatus which solves such problems. The arrangement is schematically shown in FIG. 58. Specifically, reference numeral 420 denotes a hologram screen, 402 a spatial light modulation device, and 403 a projection optical system. A three-dimensional image 406 is observed by an observer 415 wearing polarization glasses 404.

Herein, the spatial light modulation device 402 may be any image display apparatus capable of switching the polarization direction of the displayed image, and may be those capable of switching the direction of linearly-polarized light, those capable of switching the rotary direction of circularly-polarized light, or the like. As the spatial light modulation device 402, those operating at 120 Hz or more are commonly available, with which a three-dimensional image can be displayed based on the binocular parallax by switching images from one to another at a speed such that the switching cannot be recognized by human eyes. The spatial light modulation device 402 may alternatively be provided by using such a device as the polarization switching device in combination with a non-polarization type display device, e.g., a CRT, an organic EL, a polymer dispersed type liquid crystal panel, etc.

Moreover, as the simplest arrangement for the projection optical system 403, a cylindrical lens may be used as already described above. However, the projection optical system 403 is not limited thereto, but may be any system which clearly projects and images the z component of the image on the hologram screen 420. For example, an anamorphic optical system having different focal distances for the vertical and lateral directions or a combination of a normal projection lens and a cylindrical lens may be used. As described above, when using a lens or a mirror in which the focal distance in the x direction can be varied, it is possible to easily change the position along the depth direction where the image is viewed. For example, when a varifocal lens having a power only in the x direction is arranged as illustrated in FIGS. 54A and 54B, the position of the virtual display plane where the image is formed is moved back and forth without changing the position of the LED display apparatus. It is also possible to employ an arrangement where the optical path is folded by using a varifocal mirror in place of the varifocal lens.

The respective orientations of the polarizing plates of the polarization glasses 404 are arranged to be orthogonal to each other, so that images, which are switched from one to another by the above-described spatial light modulation device 402, can be independently recognized by the right eye and the left eye by wearing the polarization glasses 404.

A feature of the three-dimensional display apparatus of the present invention is that the screen surface and the position where the image is observed can be separated from each other, while the distance therebetween can be varied. This is what makes it possible to solve the above-described problems such as the tired feeling. In particular, since the image is not fixed on the screen surface, the focus of the eye is adjusted to the actual image, but not to the screen. Moreover, since the position of the image can be changed, it is possible to adjust the focus of the eye and the angle of convergence to where the actual image is being viewed, thereby allowing for a natural three-dimensional display.

(Embodiment 21)

As described above, one feature of the optical display apparatus of the present invention that is not seen in conventional apparatuses is that the optical display apparatus whose basic arrangement has been shown in each embodiment may be used as one display unit, while a plurality of such units can be arranged on an arrangement plane so as to synthesize and display reconstructed images from the respective units on the virtual display plane.

FIG. 59A and 59B are a side view and a front view, respectively, of an exemplary optical display apparatus in which three display units 233 are arranged side by side.

An image 225 formed on a virtual display plane 224 differs for the respective display units, and in the illustrated example, each display unit reconstructs and displays one of the characters "A", "B" and "C". When the respective display units are closely arranged together side by side, as illustrated in the figure, the characters are aligned together so that they can be recognized as one word.

Alternatively, as illustrated in FIG. 60, a single large pattern may be displayed while being divided into three patterns 270, 271 and 272, which are synthesized together on the virtual display plane.

Thus, in the case where the display units are arranged side by side as viewed from the observer, the display width can be widened in the horizontal direction by synthesizing the respective reconstructed images on the virtual display plane.

Moreover, an arrangement which sufficiently exhibits the feature of the optical display apparatus of the present invention is one in which a plurality of display units are arranged along a depth direction of the image as viewed from the observer, so that the images from the respective display units are synthesized on the virtual display plane.

FIG. 61 is a side view illustrating a structure of an optical display apparatus 226 in which a plurality of display units are arranged in a depth direction of an image. In this embodiment, the optical display apparatus 226 of the present invention is used as a traffic sign in a tunnel. Specifically, in FIG. 61, reference numeral 226 denotes an optical display apparatus of the present embodiment, and 227 to 229 display units, and the display units 227 to 229 are aligned with one another on a ceiling plane 231 of a tunnel 230.

A hologram screen of each of the display units 227 to 229 is produced by the producing optical system illustrated in FIG. 62A to 62C. Each of these optical systems is basically the same as that illustrated in FIG. 47. However, they differ from one another on the point at which an incident laser beam as convergent light is focused.

FIG. 62A illustrates an optical system for producing a hologram screen used in the display unit 227, and a laser beam 232 is incident so as to converge to point F. FIG. 62B illustrates an optical system for producing a hologram screen used in the display unit 228, and a laser beam 233 is incident so as to converge to point G. FIG. 62C illustrates an optical system for producing a hologram screen used in the display unit 229, and a laser beam 234 is incident so as to converge to point H.

As illustrated in FIG. 61, an image 235 of the display unit 227 is formed in the vicinity of a virtual display plane 236. Similarly, an image 237 of the display unit 228 and an image 239 of the display unit 229 are formed in the vicinity of a virtual display plane 238 and a virtual display plane 240, respectively.

Elementary patterns 242, 243 and 244, as illustrated in FIG. 63B, which are obtained by dividing an original picture pattern 241 of a traffic sign indicating a speed limit, as illustrated in FIG. 63A, are displayed on the display units 227, 228 and 229, respectively. In particular, an elementary pattern 242 for the lower approximately ⅓ portion obtained by dividing the original picture pattern 241 is displayed as the image 235 on the display unit 227. Similarly, an elementary pattern 243 for the middle approximately ⅓ portion is displayed as the image 237 on the display unit 228, and an elementary pattern 244 for the upper approximately ⅓ portion is displayed as the image 239 on the display unit 229.

Then, the reconstructed image 235, 237 and 239 as viewed from the front side thereof are synthesized into a single image, as illustrated in FIG. 63C, which is viewed from a car running through the tunnel 230 as if it were a traffic sign indicating a speed limit hung from the ceiling plane 231 of the tunnel 230. However, this is only a display on the virtual display plane, and there is no object actually existing on the display plane. Therefore, there is no chance for a car collision.

An advantage of this structure is that it is possible to reduce the height of the display unit by a rate of approximately 1/N, where N denotes the number of display units provided. Thus, the cross section for which a tunnel is to be dug through can be reduced by employing an optical display apparatus having such an extremely flat structure. This provides a substantial reduction in the construction cost.

As described above, the optical display apparatus using the hologram of the present invention has an extremely high industrial value because it allows, for the first time, one to use a light source such as a fluorescent lamp which is inexpensive and has a long life.

However, the light source for utilizing the feature of the optical display apparatus of the present invention is not limited to a fluorescent lamp, but may be any elongated linear light source. In addition to the combination of a lamp with a vertically elongated opening, and the straight tube fluorescent lamp, as described above, a one-dimensional array of small electric bulbs, a one-dimensional array of semiconductor lasers or LEDs, an organic EL in which the light emitting section is linearly shaped, a light source including a linear optical output section which is provided by guiding light from a light source by using light guiding means such as an optical fiber, and the like, can easily be used as the linear light source. Furthermore, various alternatives can be used. For example, it is possible to provide a pseudo-linear light source by combining a point light source with a cylindrical mirror or with a polygon mirror. It is also preferable to use a decentered mirror to reduce the size. Alternatively, it is possible to form a linear light source by using light beams which are linearly focused by a mirror or a lens. With this structure, it is possible to provide a virtual linear light source having a high brightness at a position near the hologram. Alternatively, it is possible to allow a two-dimensional display apparatus such as a CRT to function as a linear light source by displaying a vertical elongated bright line thereon. If the position where the bright line is displayed is successively moved, the reconstruction position also moves in response thereto, whereby it is possible to produce an effect that the reconstructed image is viewed as moving. Other than this, similar effects can be provided by using a movable linear light source.

Regarding the emission characteristics of the light source, the light source to be used may have a continuous emission distribution or independent emission peaks corresponding to the three primary colors. Alternatively, a linear light source may be provided by combining independent light sources corresponding to the three primary colors. In this way, it is possible to turn on/off the light sources of the respective colors, thereby allowing for an extremely effective display where a reconstructed image of a particular color is displayed or not displayed.

In FIG. 8, when the hologram 2 is reversed by 180° about an axis orthogonal to the figure plane, the virtual display plane on which the reconstructed image is formed is moved to the other side of the hologram 2, i.e., to the other side of the ceiling plane 7 in FIG. 8, whereby the reconstructed image is formed on the other side of the hologram 2. The optical display apparatus of the present invention can produce such a display of a reconstructed image. However, in such a case, the obtained reconstructed image is reversed. Therefore, when displaying a reconstructed image with such an arrangement, it is necessary to previously set the pattern mask so as to face toward the hologram dry plate when producing the hologram 2.

When the reference light is formed by directing a plurality of beams to overlap with one another in the direction orthogonal to the longitudinal direction of the slit, it is possible to widen the viewing range without using a linear light source during the reconstruction. In such a case, the illumination light source may be a point light source. However, positions where the reconstructed image is observed are inherently discrete. Therefore, as the view point is moved in the vertical direction, a position where the reconstructed image can be viewed and a position where it is difficult to view the reconstructed image will alternately occur. This condition varies depending upon how much the plurality of beams used when producing the hologram overlap with one another. In the case where the plurality of beams are arranged to be adjacent to one another, the reconstructed image is observed without interruption even when the view point is moved. This reference light arrangement is effective not only when the object light is formed by combining a slit and diffused light, but also when a cylindrical lens is further combined therewith, when a reconstructed image of a transmission-type hologram is used as object light, or when the object light is provided by diffused light diffusing in one direction.

Alternatively, the viewing range can be widened by exposing the hologram while arranging a one-dimensional diffuser such as a lenticular lens sheet to be adjacent to the hologram dry plate, without using a linear light source during the reconstruction. In such a case, the illumination light source maybe a point light source. However, positions where the reconstructed image is observed are inherently discrete. Therefore, as the view point is moved in the vertical direction, a position where the reconstructed image can be viewed and a position where it is difficult to view the reconstructed image will alternately occur. This condition varies depending upon the specification of the lenticular lens sheet. By selecting a lenticular lens sheet having a fine pitch, the reconstructed image is observed without interruption even when the view point is moved.

The reconstruction display plane is not limited to a single plane, but may be formed by a plurality of planes or a curved surface. Moreover, as already described in some of the embodiments above, a three-dimensional object may be used as the object. However, when a three-dimensional object is used as the object with the hologram producing optical system illustrated in FIGS. 10, 11A and 11B, it is necessary to rearrange the optical system so that the reflected light from the object, which is generated by irradiating the three-dimensional object with laser light, passes through a slit placed between the object and the hologram dry plate. Also in such a case, while the light having passed through a slit becomes the object light, the laser light and the object light will not be aligned with the optical axis.

A duplicate of the hologram 2 can easily be produced. For example, the information recorded on the hologram 2 can be transferred and duplicated onto a hologram dry plate by closely attaching together the hologram 2 and an unexposed hologram dry plate, preferably via a refractive index matching solution, and by directing laser light to be incident thereupon from the hologram dry plate side at an appropriate angle.

In the above-described embodiments, an optical traffic sign and a traffic information display board have been mainly described as applications of the present invention. However, the present invention is not at all limited to such applications, but may also display general character information, advertising bill, etc. Similarly, the location where the hologram is installed is not limited to the inside of a tunnel, but a significant effect is also provided when it is installed in a building, an elevator, an underground town, a train station, or the like. Moreover, it is also possible to employ an arrangement such that non-diffracted light which is not diffracted by the hologram is used for ambient illumination.

Furthermore, the position where the hologram is installed is not limited to the ceiling, but it is also effective to install the hologram on a wall surface, a floor, or the like. For example, by installing a hologram on a floor surface of a hall so that it is reconstructed by a fluorescent lamp for illumination which has been provided on the ceiling so as to display as a reconstructed image an indication indicating an arrow, a position, etc., the hologram functions as a guide sign. Particularly, it can easily be viewed when it is arranged so that the reconstructed image is displayed while floating apart from the floor surface by several ten cm. Alternatively, such a display may be used as means to stop a passer-by since it attracts people's attention.

(Embodiment 22)

With the optical display apparatus using a hologram based on the principle of the present invention, it is possible to present a space to the observer by displaying an indication indicating an arrow or a location as a reconstructed image. As an exemplary application of this feature, a system for visualizing and presenting to a user a position through which a non-contact type card is to be passed will be described in the present embodiment.

In the case of a railroad station, for example, automatic ticket gate systems currently installed are mainly those of the type which magnetically reads information recorded on a pass. However, it has been proposed to replace them in the future with those of a type which reads information of a pass carried by a user by means of an electric wave, or the like, in a non-contact manner. This aims to replace the existing ticketing system, where the pass is supposed to be inserted into a machine, to improve the ticketing efficiency and realize a smoother flow of people by allowing a user to pass through the gate while holding a non-contact type card pass in its hand.

A point about which to be concerned is whether the user can effectively pass the pass through a predetermined communication area (e.g., an area where a signal is read by a radio wave) which is prescribed in a space spaced apart from a card reader. If the user cannot accomplish this well and thus has to repeat the reading operation, it will rather stagnate the flow of people through the ticket gate.

The problem of effectively passing a card through the communication area is inherent to the non-contact type card system because, with a conventional reader, the user is only required to insert the card into the slot, and the positioning of the card for the reading operation is automatically done by the machine. Therefore, the user bears no burden for the card to be properly read. With the non-contact type card system, on the other hand, the communication area is spatially spread out, and it is an essential condition to bring the card into the optimal communication area and to keep the card presented within the communication area for a period of time which is required for reading the information thereon. The user is responsible for all of such tasks.

In order to reliably read the card without imposing a burden on the user under such circumstances, it is considered as an effective measure to visualize a position (area) through which the non-contact type card should be passed. With the optical display apparatus of the present invention, it is possible to display an indication such as an arrow in the form of a clear color image obtained by reconstructing a hologram in a communication area which is spaced apart from the card reader, whereby it is possible to reliably present a position where the card should be put for the user passing by the position.

Moreover, users passing through a ticket gate are generally in a hurry. Therefore, a display where the communication area is seen only when the user is passing by the area does not provide the intended function. This is because the action of moving the card to the optimal position after the display is seen imposes a burden on the user. Thus, in order to reliably inform the user of the position of the communication area, the display should be such that the user can generally grasp the position of the communication area as the user approaches the ticket machine. The optical display apparatus of the present invention effectively functions for this purpose.

For example, as described above in connection with Embodiment 3, with the optical display apparatus of the present invention, the display viewing range can be widened back and forth by adjusting the arrangement of the light source. By using this function, it is possible to create a situation where the user sees something when the user is still away from the ticket gate. Therefore, the user can prepare to present the card under the guidance of what is seen. As the user approaches the ticket gate, the display starts to appear clearer, whereby the user can certainly see where to put the pass. When the user actually passes the ticket gate, the user can pass by while holding the card at an appropriate height and position, thereby allowing for a reliable information reading operation.

The above-described "situation where the user sees something" may be provided by any display which attracts a person's attention, e.g., as the user walks toward the presented position, the position appears blinking or appears to change in color. The feature of the present invention, i.e., a hologram produced by a plurality of reference light beams alternately appears and disappears as the viewing position changes, can be effectively used for this purpose. Alternatively, this can be realized by providing the optical display apparatus while avoiding an arrangement in which the change in color is small.

Regarding the viewing range, it is preferable that the range is set to be wide in the front side while the range is such that the presented position can still be seen when the user looks back after passing by the position. This can also be realized by defining the display viewing range by adjusting the arrangement of the light source as described above in connection with Embodiment 3.

Since the user's height differs between individuals, the position preferably appears bright even when the viewing height changes. This can be realized by increasing the degree of diffusion of the diffuser used when producing the hologram while elongating the slit, or by increasing the width of the one-dimensional diffuser and the degree of diffusion thereof.

Incidentally, Japanese Laid-Open Publication No. 9-6935 relating to a wireless card processing apparatus describes that a three-dimensional stereoscopic image is displayed by a hologram projection apparatus in which an area substantially equal to the communication area is hatched. However, use of the method proposed by the present invention is essential to actually realize such a function.

While a non-contact type card system is described above as an example, the optical display apparatus of the present invention can also be combined with other information communication apparatuses, e.g., a POS system. In such a case, an optical display system to be provided has an optical display apparatus which three-dimensionally displays the communication area of the information communication apparatus. Preferably, the display area of the optical display apparatus and the communication area of the information communication apparatus are matched with each other. The information communication apparatus may have an arrangement for communicating information in one way (either reception or transmission) or an arrangement for performing a two-way interactive communication (reception and transmission).

Industrial Applicability

With the above-described arrangement, the present invention displays a reconstructed hologram image, whereby an insubstantial hologram reconstructed image can be displayed on an insubstantial plane which is virtually provided in a space. Moreover, the display apparatus itself is arranged in a flat area which is extremely close to the wall surface of the installation site, and thus has a small protruding portion, thereby eliminating the problems associated with the conventional display apparatus such as an increase in the size of the display apparatus, an increase in the installation area (occupied area), or an accidental collision with the display apparatus.

Moreover, according to the present invention, it is possible to use a fluorescent lamp as a reconstruction light source, whereby the reconstructed light source is available anytime and anywhere. Thus, by producing a hologram on a light-weight flexible substrate, it is possible to realize a display apparatus which can easily be carried around.

Furthermore, by applying this principle, a novel display, such as a head-up display or a three-dimensional display apparatus, is realized in which an image is observed at a position spaced apart from the screen surface.

For example, when the optical display apparatus of the present invention is used in a non-contact type card system, a spatially spread communication area can be clearly presented to the user, whereby it is possible to more reliably and effectively provide the function inherent to the non-contact type card system.

What is claimed is:

1. An optical display apparatus, comprising:
   an image display apparatus for displaying an image including at least one point light source;
   a hologram screen arranged at a position different from the point light source for diffracting and reflecting light from the point light source; and
   an imaging optical system arranged to adjust a focus in one direction of the image displayed by the image display apparatus so that the point light source is focused to a line on the hologram screen,
   wherein the image displayed by the image display apparatus is diffracted and reimaged on a virtual display plane.

2. An optical display apparatus according to claim 1, wherein the virtual display plane is located between the hologram screen and an observer viewing said reimaged image on the virtual display plane.

3. An optical display apparatus according to claim 1, wherein the hologram screen is located between the virtual display plane and an observer viewing said reimaged image on the virtual display plane.

4. An optical display apparatus according to claim 1, wherein:
   the one direction is a vertical direction; and
   the imaging optical system includes a cylindrical lens and further includes a varifocal lens having a power only in a horizontal direction.

5. An optical display apparatus according to claim 1, further comprising polarization glasses whose polarization transmission directions for respective eyes are orthogonal to each other.

6. An optical display system having a plurality of display units arranged in a lateral direction, wherein each of the plurality of display units is an optical display apparatus according to claim 1.

7. An optical display system having a plurality of display units arranged in a depth direction, wherein each of the plurality of display units is an optical display apparatus according to claim 1.

8. An optical display apparatus according to claim 1, wherein the image display apparatus includes:
   a display device; and
   a polarization switching device.

9. An optical display apparatus according to claim 8, wherein the polarization switching device includes a ferroelectric liquid crystal panel.

10. An optical display apparatus according to claim 8, further comprising polarization glasses for viewing said reimaged image on the virtual display plane, the polarization glasses having polarization transmission directions for respective eyes which are orthogonal to each other.

11. The optical display apparatus according to claim 1, wherein the one direction is a vertical direction.

12. The optical display apparatus according to claim 1, wherein the imaging optical system includes a cylindrical lens.

13. The optical display apparatus according to claim 1, wherein the image display apparatus includes an LED.

14. The optical display apparatus according to claim 1, wherein the image display apparatus includes a CRT.

15. The optical display apparatus according to claim 1, wherein the image display apparatus includes a polymer dispersed liquid crystal panel.

16. The optical display apparatus according to claim 1, wherein the image display apparatus includes an organic EL panel.

\* \* \* \* \*